US009506628B1

(12) United States Patent
Merewether et al.

(10) Patent No.: US 9,506,628 B1
(45) Date of Patent: Nov. 29, 2016

(54) SEMICONDUCTOR LIGHTING DEVICES AND METHODS

(75) Inventors: Ray Merewether, La Jolla, CA (US); Mark S. Olsson, La Jolla, CA (US); Jon E. Simmons, Poway, CA (US); John R. Sanderson, IV, Poway, CA (US); Aaron J. Steiner, San Diego, CA (US)

(73) Assignee: DEEPSEA POWER & LIGHTING, INC., San Diego, CA (US)

(*) Notice: Subject to any disclaimer, the term of this patent is extended or adjusted under 35 U.S.C. 154(b) by 1089 days.

(21) Appl. No.: 13/482,969

(22) Filed: May 29, 2012

Related U.S. Application Data

(60) Provisional application No. 61/491,191, filed on May 28, 2011, provisional application No. 61/596,204, filed on Feb. 7, 2012, provisional application No. 61/596,709, filed on Feb. 8, 2012.

(51) Int. Cl.
*B60Q 3/04* (2006.01)
*F21V 15/01* (2006.01)

(52) U.S. Cl.
CPC .................................... *F21V 15/01* (2013.01)

(58) Field of Classification Search
CPC ....... F21V 15/01; F21V 31/00; F21V 31/005
USPC .......................................................... 362/362
See application file for complete search history.

(56) References Cited

U.S. PATENT DOCUMENTS

| | | | | |
|---|---|---|---|---|
| 3,457,399 | A * | 7/1969 | Milroy | 362/267 |
| 4,996,635 | A * | 2/1991 | Olsson | F21V 15/01 362/158 |
| 5,535,107 | A * | 7/1996 | Prok | 362/158 |
| 6,086,218 | A * | 7/2000 | Robertson | 362/157 |
| 6,131,651 | A * | 10/2000 | Richey, III | 165/185 |
| 7,883,244 | B2 | 2/2011 | Hsu et al. | |
| 8,069,875 | B2 * | 12/2011 | Mashiko | 137/512 |
| 2001/0020416 | A1 * | 9/2001 | Yoshikawa et al. | 95/45 |
| 2005/0123161 | A1 * | 6/2005 | Polany et al. | 381/334 |
| 2005/0168996 | A1 * | 8/2005 | Koegler et al. | 362/341 |
| 2005/0190553 | A1 * | 9/2005 | Lynch et al. | 362/227 |
| 2008/0130268 | A1 * | 6/2008 | Johnson et al. | 362/103 |
| 2009/0122570 | A1 * | 5/2009 | Hsu et al. | 362/545 |
| 2011/0051423 | A1 * | 3/2011 | Hand | F21K 9/00 362/294 |

* cited by examiner

*Primary Examiner* — Bryon T Gyllstrom
(74) *Attorney, Agent, or Firm* — Steven C. Tietsworth, Esq.

(57) ABSTRACT

Lighting devices using selectively permeable barrier elements, graphite sheet materials, and/or browning agent destroyers/sequestering agents are disclosed. In one embodiment a lighting device may include a body or housing with a selectively permeable barrier element, such as a silicone membrane or o-ring to allow diffusion of contaminants from one or more interior volumes to the exterior environment. Contaminants may be mitigated through use of a sequestering agent/browning agent destroyer. Heat conduction between elements of the housing, such as to aid removal of heat generated from a lighting element such as an LED, may be improved through use of graphite materials, such as PGS sheets between housing elements.

26 Claims, 47 Drawing Sheets

Example Lighting Element

*Example Outgassing Process*

*Example Browning Phosphor Failure Mechanism*

*Example Embodiment of Lighting Element Using Sequestering Agent and/or Browning Agent Destroyer Elements to Control Browning*

Example Embodiment of Lighting Element Using Sequestering Agents and/or Browning Agent Destroyers to Control Browning Sequestering Agent and/or Browning Agent Destroyer Material Into Luminaire Example Embodiment Including Sequestering Agent and/or Browning Agent Destroyer Into Reflector Element

*Example LED Device with Browning*

Example LED Lighting Apparatus with Sequestering Agent and/or Browning Agent Destroyer Disposed in Proximity to a Reflector Cross-Section of Example Embodiment of Lighting Device Using Graphite Thermal Seal & Sequestering Agents and/or Browning Agent Destroyers to Control Browning

*Detail of Example Embodiment of Metal Clad Circuit Board Element and Pyrolytic Graphite Sheet (PGS) for Sealing and Heat Transfer*

Detail of Opposite Side of Example Embodiment Shown in FIG. 11A

1

*Detail of Example Embodiment of PGS*

*Detail of Example Embodiment of Underwater Light*

*Detail of Example Embodiment of Underwater Light Assembly Housing/Body With LEDs and Related Assemblies Removed*

1300

*Isometric View of Underwater Light Embodiment Shown in FIGs. 13A & 13B*

Cross-Section of Alternate Embodiment of Lighting Device Using Graphite Thermal Seal & Sequestering Agents and/or Browning Agent Destroyers to Control Browning

*Example Round Graphite Sheet (e.g. PGS) and Associated Conductivity Axes*

*Example Square Graphite Sheet (e.g. PGS) and Associated Conductivity Axes*

*Example Surface Features on Mating Surface to Enhance Z-Axis Conductivity with Graphite Thermal Sealing Material (not to scale)*

Example Conductor Surface with Conductive Particles and/or Embedded Conductive Particles (e.g., Diamond Dust) in Graphite Material Example Surface Features on Mating Surface and Thermally Conductive Particles to Enhance Z-Axis Conductivity with Graphite Thermal Sealing Material (not to scale)

SEMICONDUCTOR LIGHTING DEVICES AND METHODS

CROSS-REFERENCE TO RELATED APPLICATIONS

This application claims priority under 35 U.S.C. §119(e) to U.S. Provisional Patent Application Ser. No. 61/491,191, filed May 28, 2011, entitled SEMICONDUCTOR LIGHTING DEVICES AND METHODS, to U.S. Provisional Patent Application Ser. No. 61/596,204, filed Feb. 7, 2012, entitled SEMICONDUCTOR LIGHTING DEVICES AND METHODS, and to U.S. Provisional Patent Application Ser. No. 61/596,709, filed Feb. 8, 2012, entitled SEMICONDUCTOR LIGHTING DEVICES AND METHODS. The content of each of these applications is incorporated by reference herein in its entirety for all purposes.

FIELD

This disclosure relates generally to lighting assemblies, devices, and operating methods for extension of light output and/or operational life. More specifically, but not exclusively, the present disclosure relates to semiconductor lighting devices including integrated sequestering agents and/or browning agent destroyers along with graphite materials and/or selectively permeable barriers to allow contaminant diffusion out of the lighting devices.

BACKGROUND

Semiconductor-based lighting devices, such as lighting devices using Light Emitting Diodes (LEDs), have been used for various lighting applications for a number of years. However, in many applications, the lighting devices may suffer from loss of output luminance during operation, which may occur rapidly. These decreases in output may occur long before the normal life expectancy of the semiconductor and/or other elements of the lighting device. Efforts have been made by various manufacturers to understand these failures, however, a viable solution has not to date been discovered.

SUMMARY

This disclosure relates generally to lighting assemblies, devices, and operating methods for extension of light output and/or operational life. More specifically, but not exclusively, the present disclosure relates to semiconductor lighting devices including integrated sequestering agents and/or browning agent destroyers along with graphite materials and/or selectively permeable barriers to allow contaminant diffusion out of the lighting devices.

For example, in one aspect the disclosure relates to a lighting device. The lighting device may include, for example, a housing enclosing one or more interior volumes. The lighting device may further include one or more electronic circuit elements disposed in the one or more interior volumes, and a selectively permeable barrier element disposed in the housing having a first area exposed to one of the interior volumes and a second area exposed to a gas or liquid volume exterior to the housing to allow diffusion of browning contaminants from the one of the interior volumes to the gas or liquid volume exterior to the housing.

In another aspect the disclosure relates to a lighting device. The lighting device may include, for example, a body or housing, a semiconductor lighting element disposed within an interior volume of the housing, and a sequestering agent and/or a browning agent destroyer disposed in the interior volume. The lighting device may further include a silicone material. The sequestering agent and/or browning agent destroyer may be disposed on or within the silicone element.

In another aspect, the disclosure relates to a submersible light. The submersible light may include, for example, a housing, a transparent pressure bearing window positioned at a forward end of the housing, a window supporting structure mounted in the housing behind the transparent window, a water-tight seal between the window and the housing, a circuit element configured and positioned within the housing behind the window supporting structure to bear at least some of the pressure applied to the transparent window by ambient water on the exterior side of the window, at least one solid state light source mounted on the circuit element behind the transparent window, a sequestering agent and/or a browning agent destroyer disposed behind the window, and a graphite material configured to seal two surfaces of the light to enhance thermal conductivity from the circuit element to the housing.

In another aspect, the disclosure relates to a submersible LED light. The light may include, for example, a light head made of a thermally conductive material, a metal core printed circuit board (PCB) thermally coupled to the light head, a plurality of LEDs mounted on the MCPCB, a transparent window mounted in the light head, extending across the MCPCB and spaced from the LEDs, the window being sealed around a periphery thereof to the light head, A multilayer stack of spacers made of a high compressive strength material positioned between the window and the MCPCB for engaging the window and carrying loads exerted by the window, and a sequestering agent and/or a browning agent destroyer disposed behind the window. The light may further include a graphite material configured to seal a first volume of the light head including the at least one solid state light source and circuit element from a second volume of the light head.

In another aspect, the disclosure relates to methods for manufacturing, testing, and operating lighting devices to implement the above-described functionality and/or extend operating life and/or performance.

Various additional aspects, features, and functions are described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION

Overview

Figure 1:
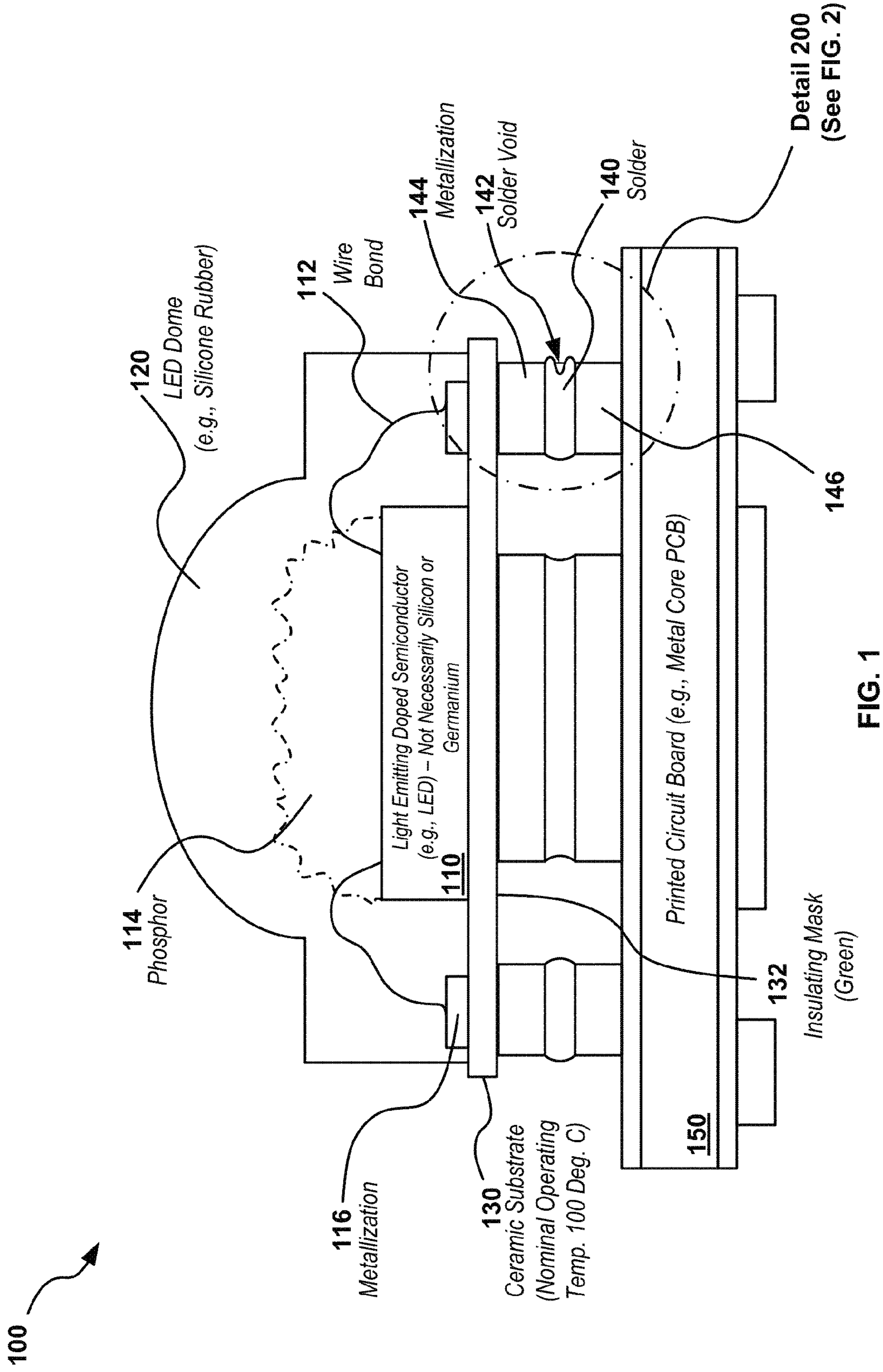
FIG. 1 illustrates an example semiconductor lighting device.

It is noted that as used herein, the term, "exemplary" means "serving as an example, instance, or illustration". Any aspect, detail, function, implementation, and/or embodiment described herein as "exemplary" is not necessarily to be construed as preferred or advantageous over other aspects and/or embodiments.

The following exemplary embodiments are provided for the purpose of illustrating examples of various aspects, details, and functions of embodiments of the present invention; however, the described embodiments are not intended to be in any way limiting. It will be apparent to one of ordinary skill in the art that various aspects may be implemented in other embodiments within the spirit and scope of the present invention.

This disclosure relates generally to lighting assemblies, devices, and operating life extension methods. More specifically, but not exclusively, the disclosure relates to semiconductor lighting devices including integrated sequestering agents and/or browning agent destroyers, such as adsorption and/or absorption materials and/or catalysts or other materials for mitigating browning. Alternately, or in addition, lighting devices may include a selectively permeable barrier element to allow diffusion of contaminants from interior volumes of the light to exterior gases or liquids.

For example, in one aspect the disclosure relates to a lighting device. The lighting device may include, for example, a housing enclosing one or more interior volumes. The lighting device may further include one or more electronic circuit elements disposed in the one or more interior volumes, and a selectively permeable barrier element disposed in the housing having a first area exposed to one of the interior volumes and a second area exposed to a gas or liquid volume exterior to the housing to allow diffusion of browning contaminants from the one of the interior volumes to the gas or liquid volume exterior to the housing.

The one or more electronic circuit elements may include, for example, an LED lighting element. The LED lighting element may be disposed on a metal clad printed circuit board (MCPCB). The one or more electronic circuit elements may include a power circuit for providing electrical power and/or control signals to the LED lighting element. The LED lighting element and the power circuit may be separate circuits on separate circuit element, such as separate PCBs, or may be a single circuit on a single circuit element, such as a single PCB. The LED lighting element may be disposed in a first volume of the one or more interior volumes and the power circuit may be disposed in the same volume or in a second volume of the one or more volumes. The first area of the selectively permeable barrier element may be in contact with the first volume, such as having an area of the selectively permeable barrier element in contact with the first volume. Alternately, or in addition, the first area of the selectively permeable barrier element may be in contact with the second volume, such as by having an area in contact with the second volume. The lighting device may further include one or more additional selectively permeable barrier elements. The one or more additional selectively permeable barrier elements may be in contact with the second volume or other interior volumes of the housing defining interior cavities.

The selectively permeable barrier element may include, for example, a silicone material. The selectively permeable barrier element may be in the form of an o-ring, window, gasket, membrane, or other structure. The selectively permeable barrier element may be positioned between two elements of the housing to further provide sealing, such as in the form of an o-ring or gasket.

The lighting device may further include, for example, a sequestering agent and/or a browning agent destroyer. The sequestering agent/browning agent destroyer may be disposed at least partially in one or more of the interior volumes. The sequestering agent may include a molecular sieve material. The sequestering agent may include an activated charcoal material. The sequestering agent may be a clay mineral material. The browning agent destroyer may be a catalyst material. The catalyst material may include one or more of platinum, palladium, rhodium, cerium, iron, manganese, nickel, and copper material, or other catalyst materials. The sequestering agent may comprise a material for absorbing and containing a gas capable of browning the lighting element and/or a phosphor associated with the lighting element. The sequestering agent and/or browning agent destroyer may be disposed at least partially within the selectively permeable barrier element.

The lighting device may further include, for example, a graphite material for at least partially sealing elements of the lighting device and/or to increase thermal conductivity between mating surfaces. The mating surface may be on a housing element and on a printed circuit board, such as an MCPCB including a semiconductor lighting element, and/or may be on two or more housing elements or other lighting device elements.

The semiconductor lighting elements may be, for example, light emitting diodes (LEDs).

The housing may include, for example, one or more housing elements which may mate to define one or more interior volumes. The housing may include a forward housing element with a forward opening having a first diameter and an aft opening having a second diameter that is larger than the first diameter. The housing may include a transparent, pressure-bearing window positioned inside the forward housing, and having a diameter that is larger than the first diameter and smaller than the second diameter. The housing may include a water-tight seal disposed between the window and a surface of the forward housing. The housing may include a window support structure positioned in the forward housing behind a portion of the window. The housing may include a semiconductor lighting element positioned in the forward housing behind the window. The housing may contain a sequestering agent and/or a browning agent destroyer disposed behind the window. The housing may include a graphite material configured to seal a volume including the semiconductor lighting element from a second volume of the housing.

In another aspect the disclosure relates to a lighting device. The lighting device may include, for example, a body or housing, a semiconductor lighting element disposed within an interior volume of the housing, and a sequestering agent and/or a browning agent destroyer disposed in the interior volume. The lighting device may further include a silicone element. The sequestering agent and/or browning agent destroyer may be disposed on or within the silicone element.

In another aspect, the disclosure relates to a submersible light. The submersible light may include, for example, a housing, a transparent pressure bearing window positioned at a forward end of the housing, a window supporting structure mounted in the housing behind the transparent window, a water-tight seal between the window and the housing, a circuit element configured and positioned within the housing behind the window supporting structure to bear at least some of the pressure applied to the transparent window by ambient water on the exterior side of the window, at least one solid state light source mounted on the circuit element behind the transparent window, a sequestering agent and/or a browning agent destroyer disposed behind the window, and a graphite material configured to seal two surfaces of the light to enhance thermal conductivity from the circuit element to the housing.

In another aspect, the disclosure relates to a submersible LED light. The light may include, for example, a light head made of a thermally conductive material, a metal core printed circuit board (PCB) thermally coupled to the light head, a plurality of LEDs mounted on the MCPCB, a transparent window mounted in the light head, extending across the MCPCB and spaced from the LEDs, the window being sealed around a periphery thereof to the light head, A multilayer stack of spacers made of a high compressive strength material positioned between the window and the MCPCB for engaging the window and carrying loads exerted by the window, and a sequestering agent and/or a browning agent destroyer disposed behind the window. The light may further include a graphite material configured to seal a first volume of the light head including the at least one solid state light source and circuit element from a second volume of the light head.

In another aspect the disclosure relates to a lighting device. The lighting device may be configured to reduce browning and/or premature failure. The lighting device may include, for example, a semiconductor lighting element. The lighting device may include a silicone element, such as a silicone dome or window or selectively permeable barrier. The lighting device may include a sequestering agent and/or browning agent destroyer material disposed in proximity to the silicone element.

The sequestering agent may include, for example, an adsorbent material. Alternately, or in addition, the sequestering agent may include an absorbent material. The absorbent material comprises a silica gel material. The silica gel material may be used to contain captured gases capable of effecting browning. The absorbent material may include a molecular sieve material. The molecular sieve material may include a zeolite material. The zeolite material may include an aluminosilicate zeolite. The absorbent material may include an activated charcoal material. The absorbent material may include a clay mineral material. The sequestering agent may include a chemically reactive binder material. The browning agent destroyer may include a catalyst material. The catalyst material may include a platinum material or other catalyst material.

The semiconductor lighting element may be an LED. The sequestering agent may be used to absorb and contain a gas capable of browning the silicone element. The silicone dome may be a silicone dome of the LED. The sequestering agent and/or browning agent destroyer may be disposed on or within the silicone element or adjacent the silicone element. The semiconductor lighting element, the silicone element, and the sequestering agent and/or browning agent destroyer may be disposed in a sealed structure within one or more internal volumes. The lighting device may include a reflector element to direct output from the LED. The sequestering agent may be disposed on or within the reflector element.

In another aspect, the disclosure relates to a lighting apparatus. The lighting apparatus may include, for example, a plurality of semiconductor lighting elements. Each of the plurality of semiconductor lighting elements may include a semiconductor lighting element and a phosphor element. The lighting apparatus may further include a sequestering agent and/or a browning agent destroyer disposed in proximity to the plurality of semiconductor lighting elements.

The lighting apparatus may further include a reflector element. The sequestering agent and/or browning agent destroyer may be disposed on or within the reflector element. The sequestering agent and/or browning agent destroyer may be disposed within ones of the plurality of semiconductor lighting elements. The lighting apparatus may further include a silicone element. The semiconductor lighting element, the phosphor element, the sequestering agent and/or browning agent, and/or the silicone element may be disposed in a sealed structure within one or more internal volumes.

In another aspect the disclosure relates to a submersible lighting device. The lighting device may include, for example, a housing including a first volume and a second volume, a window in contact with a first volume, one or more semiconductor lighting elements disposed on a printed circuit element at least partially within the first volume, a sequestering agent and/or a browning agent destroyer disposed at least partially in the first volume, and a graphite material configured to seal the first volume from the second volume.

The sequestering agent may include, for example, an adsorbent material and/or an absorbent material. The absorbent material may be a silica gel material. The silica gel material may be disposed to contain captured gases capable of effecting browning. The absorbent material may be a molecular sieve material. The molecular sieve material may be a zeolite material. The zeolite material may be an aluminosilicate zeolite. The absorbent material may be an activated charcoal material. The absorbent material may be a clay mineral material. The sequestering agent may include a chemically reactive binder material. The sequestering agent may be disposed to absorb and contain a gas capable of browning a phosphor element of the lighting device. The sequestering agent may be disposed to absorb and contain a gas capable of browning the silicone element.

The browning agent destroyer may, for example, include a catalyst material. The catalyst material may include one or more of a platinum, palladium, rhodium, cerium, iron, manganese, nickel, and copper material. The sequestering agent and/or browning agent destroyer may be disposed within the silicone element.

The lighting device may include, for example, a silicone element. The semiconductor lighting element may be an LED and the silicone element may be a component of or coupled to the LED. The silicone element may be a silicone dome element of the LED. The sequestering agent and/or browning agent destroyer may be disposed within and/or adjacent the silicone element. The lighting device may include a plurality of LEDs, which may be configured in an array. The LED array may be configured with a flat top surface which may be in contact with and/or compressed with the window. The window may be a sapphire forward optically transparent material. The lighting device may further include a reflector element. The sequestering agent may be disposed within the reflector element.

The lighting device may further include, for example, a phosphor. The phosphor may be disposed at least partially in the first volume. The sequestering agent and/or the browning agent destroyer may be disposed within and/or adjacent the phosphor element.

The graphite material may be, for example, a graphite sheet. The graphite sheet may be a pyrolitic graphite sheet (PGS). The PGS may be positioned between the circuit element, such as a metal core printed circuit board (MCPCB) and a thermally conductive mating surface of the housing. The semiconductor lighting element and/or the sequestering agent and/or browning agent destroyer may be sealed from the second volume at the mating surface. The lighting device may further include a phosphor element. The semiconductor lighting element, the phosphor element, the silicone element, and/or the sequestering agent and/or browning agent may be disposed in a sealed structure and/or volume of the lighting device. The graphite sheet may consist of graphite substantially free of contaminants. The graphite sheet material may not include binder materials, adhesives, or other materials that may emit contaminants. The graphite sheet material may comprise substantially all carbon. The graphite sheet material may be a pyrolitic graphite.

The graphite material may, for example, comprise a graphite sheet and the body or housing may include a first surface in contact with the graphite sheet. The first surface may be configured to increase thermal conductivity between the body and the graphite sheet. The first surface may include surface features and/or be prepared by micromachining, nanofabrication, and/or other processes to create micro or nano-scale surface features to increase thermal conductivity.

The graphite material may comprise a graphite sheet, such as a pyrolitic graphite sheet. The graphite sheet may include and/or may be in contact with thermally conductive particles. The conductive particles may be embedded in the graphite sheet. The conductive particles may be in contact with and/or embedded in a mating surface adjacent to the graphite sheet. The conductive particles may be powdered diamond or other thermally conductive materials. The graphite material may be a graphite sheet including an impregnated powdered diamond material.

The lighting device may have a structural body configured to withstand an external water pressure. The external water pressure may be at least 50 pounds per square inch (PSI). The external water pressure may be at least 1000 PSI.

The graphite material may comprise, for example, a pyrolitic graphite sheet (PGS). The PGS may be positioned between the circuit element and a thermally conductive mating surface of the housing and/or between mating surfaces of housing elements to conduct heat. The graphite sheet may consist of a graphite material substantially free of contaminants. The graphite sheet material may not include binder materials. The graphite sheet material may not include adhesive materials. The graphite sheet material may be substantially all carbon. The graphite material may comprise a graphite sheet and the housing/body may include a first surface in contact with the graphite sheet. The first surface may be formed, machined, etc., to increase thermal conductivity between the body and the graphite sheet. The first and/or other surfaces may be configured to have increased thermal conductivity using a micromachining process. The first and/or other surfaces may include nanostructured features to enhance thermal conductivity. The graphite material may be a pyrolitic graphite sheet and the sheet may include embedded and/or surface particles such as powdered diamond, on the surface layer and/or internal layers or volumes. The graphite sheet may include an impregnated powdered diamond material.

The LEDs may have include a dome and the lighting device may include a window, such as a sapphire window. The dome may be in contact with the sapphire or other window. The LED domes may include a flat top surface in contact with the sapphire. The flat top surface may be a manufactured surface. The plurality of LEDs may be trimmed to form the flat top surfaces. The flat top surfaces may be trimmed on an array of the plurality of LEDs. The window may be compressed against the LEDs. The window may be compressed against the LEDs during assembly of the lighting device. The window may be compressed against the LEDs by water pressure during underwater deployment.

The semiconductor lighting elements may be, for example, LEDs having a dome and the window may comprise sapphire. The dome may be in contact with the sapphire. The LED domes may be silicone rubber or elastomeric domes or domes of other similar or equivalent materials. The LED domes may include a flat top surface in contact with the sapphire. The flat top surface may be a manufactured surface. The LEDs may be trimmed using a cutting element to form the flat top surfaces. The flat top surfaces may be trimmed on an array of the plurality of LEDs. The trimming may be done after the LEDs are mounted on a printed circuit element, such as an MCPCB. The sapphire window may be compressed against the LEDs. The sapphire window may be compressed against the LEDs during assembly of the lighting device. The sapphire window may be compressed against the LEDs by water pressure during underwater deployment.

In another aspect, the disclosure relates to a submersible light. The light may include, for example, a forward housing with a forward opening having a first diameter and an aft opening having a second diameter that is larger than the first diameter. The light may further include a transparent, pressure-bearing window positioned inside the forward housing. The window may have a diameter that is larger than the first diameter and smaller than the second diameter. The light may further include a water-tight seal disposed between the window and a surface of the forward housing and a window support structure positioned in the forward housing behind a portion of the window. The light may further include a circuit element positioned within the forward housing and at least one light source mounted on the circuit element behind the window, which may be an LED. The light may further include a sequestering agent and/or a browning agent destroyer disposed behind the window. The light may further include a graphite material configured to seal a volume including the light source and circuit element from a second volume of the forward housing. The light may further include a pressure support structure positioned in the forward housing. The light may be configured so that some or all pressure applied to an external face of the window is transferred to and carried by the pressure support structure through at least the window support structure.

The sequestering agent may include, for example, an adsorbent material and/or an absorbent material. The absorbent material may be a silica gel material. The silica gel material may be disposed to contain captured gases capable of effecting browning. The absorbent material may be a molecular sieve material. The molecular sieve material may be a zeolite material. The zeolite material may be an aluminosilicate zeolite. The absorbent material may be an activated charcoal material. The absorbent material may be a clay mineral material. The sequestering agent may include a chemically reactive binder material. The sequestering agent may be disposed to absorb and contain a gas capable of browning a phosphor element of the lighting device. The sequestering agent may be disposed to absorb and contain a gas capable of browning the silicone element.

The browning agent destroyer may, for example, include a catalyst material. The catalyst material may include one or more of a platinum, palladium, rhodium, cerium, iron, manganese, nickel, and copper material. The sequesting agent and/or browning agent destroyer may be disposed within the silicone element.

The light may include, for example, a silicone element. The semiconductor lighting element may be an LED, and the silicone element may be of a group of silicone rubbers or silicone elastomers or silicone fluids or greases. The silicone element may be a component of or coupled to the LED. The silicone element may be a silicone dome element of the LED. The sequestering agent and/or browning agent destroyer may be disposed within and/or adjacent the silicone element. The lighting device may include a plurality of LEDs, which may be configured in an array. The LED array may be configured with a flat top surface which may be in contact with and/or compressed with the window. The window may be a sapphire forward optically transparent material. The light may further include a reflector element. The sequestering agent may be disposed within the reflector element.

The light may further include, for example, a phosphor. The phosphor may be disposed at least partially in the first volume. The sequestering agent and/or the browning agent destroyer may be disposed within and/or adjacent the phosphor element.

The graphite material may be, for example, a graphite sheet. The graphite sheet may be a pyrolitic graphite sheet (PGS). The PGS may be positioned between the circuit element, such as a metal core printed circuit board (MCPCB) and a thermally conductive mating surface of the housing. The semiconductor lighting element and/or the sequestering agent and/or browning agent destroyer may be sealed from the second volume at the mating surface. The light may further include a phosphor element. The semiconductor lighting element, the phosphor element, the silicone element, and/or the sequestering agent and/or browning agent may be disposed in a sealed structure and/or volume of the light. The graphite sheet may consist of graphite substantially free of contaminants. The graphite sheet material may not include binder materials, adhesives, or other materials that may emit contaminants. The graphite sheet material may comprise substantially all carbon. The graphite sheet material may be a pyrolitic graphite.

The graphite material may, for example, comprise a graphite sheet and the body or housing may include a first surface in contact with the graphite sheet. The first surface may be configured to increase thermal conductivity between the body and the graphite sheet. The first surface may include surface features and/or be prepared by micromachining, nanofabrication, and/or other processes to create micro or nano-scale surface features to increase thermal conductivity.

The graphite sheet may be, for example, a pyrolitic graphite sheet. The graphite sheet may include and/or may be in contact with thermally conductive particles. The conductive particles may be embedded in the graphite sheet. The conductive particles may be in contact with and/or embedded in a mating surface adjacent to the graphite sheet. The conductive particles may be powdered diamond or other thermally conductive materials. The graphite material may be a graphite sheet including an impregnated powdered diamond material. The graphite sheet may be coated with a fluid or grease to improve sealing. The coating may be lightly applied during assembly or manufacturing. The fluid or grease may be applied to seal hole or cavities between layers of a housing or other internal structure so as to isolate internal volumes of the housing.

The graphite sheet may, for example, be pre-compressed to a substantially nonporous density state. The sheet may be compressed before assembly or manufacturing, may be compressed during the manufacturing process, and/or may be compressed during an initial pressurization cycle, such as during an underwater pressure test during manufacture or during initial use.

The light may have a structural body configured to withstand an external water pressure. The external water pressure may be at least 50 pounds per square inch (PSI). The external water pressure may be at least 1000 PSI.

The semiconductor lighting elements may be, for example, LEDs having a dome and the window may comprise sapphire. The dome may be in contact with the sapphire. The LED domes may be silicone domes. The LED domes may include a flat top surface in contact with the sapphire. The flat top surface may be a manufactured surface. The LEDs may be trimmed using a cutting element to form the flat top surfaces. The flat top surfaces may be trimmed on a array of the plurality of LEDs. The trimming may be done after the LEDs are mounted on a printed circuit element, such as an MCPCB. The sapphire window may be compressed against the LEDs. The sapphire window may be compressed against the LEDs during assembly of the lighting device. The sapphire window may be compressed against the LEDs by water pressure during underwater deployment.

In another aspect, the disclosure relates to a submersible light. The submersible light may include, for example, a housing or body, a transparent pressure bearing window positioned at a forward end of the housing, a window supporting structure mounted in the housing behind the transparent window and a water-tight seal between the window and the housing. The light may further include a circuit element configured and positioned within the housing behind the window supporting structure to bear at least some of the pressure applied to the transparent window by ambient water on the exterior side of the window, at least one solid state light source mounted on the circuit element behind the transparent window. The light may further include a sequestering agent and/or a browning agent destroyer disposed behind the window. The light may further include a graphite material configured to seal a first volume of the housing or body and a volume of the housing or body.

The sequestering agent may include, for example, an adsorbent material and/or an absorbent material. The absorbent material may be a silica gel material. The silica gel material may be disposed to contain captured gases capable of effecting browning. The absorbent material may be a molecular sieve material. The molecular sieve material may be a zeolite material. The zeolite material may be an aluminosilicate zeolite. The absorbent material may be an activated charcoal material. The absorbent material may be a clay mineral material. The sequestering agent may include a chemically reactive binder material. The sequestering agent may be disposed to absorb and contain a gas capable of browning a phosphor element of the lighting device. The sequestering agent may be disposed to absorb and contain a gas capable of browning the silicone element.

The browning agent destroyer may, for example, include a catalyst material. The catalyst material may include one or more of a platinum, palladium, rhodium, cerium, iron, manganese, nickel, and copper material. The sequestering agent and/or browning agent destroyer may be disposed within the silicone element.

The light may include, for example, a silicone element. The semiconductor lighting element may be an LED and the silicone element may be a component of or coupled to the LED. The silicone element may be a silicone dome element of the LED. The sequesting agent and/or browning agent destroyer may be disposed within and/or adjacent the silicone element. The light may include a plurality of LEDs, which may be configured in an array. The LED array may be configured with a flat top surface which may be in contact with and/or compressed with the window. The window may be a sapphire forward optically transparent material. The light may further include a reflector element. The sequestering agent may be disposed within the reflector element.

The light may further include, for example, a phosphor. The phosphor may be disposed at least partially in the first volume. The sequestering agent and/or the browning agent destroyer may be disposed within and/or adjacent the phosphor element.

The graphite material may be, for example, a graphite sheet. The graphite sheet may be a pyrolitic graphite sheet (PGS). The PGS may be positioned between the circuit element, such as a metal core printed circuit board (MCPCB) and a thermally conductive mating surface of the housing. The semiconductor lighting element and/or the sequestering agent and/or browning agent destroyer may be sealed from the second volume at the mating surface. The light may further include a phosphor element. The semiconductor lighting element, the phosphor element, the silicone element, and/or the sequestering agent and/or browning agent may be disposed in a sealed structure and/or volume of the light. The graphite sheet may consist of graphite substantially free of contaminants. The graphite sheet material may not include binder materials, adhesives, or other materials that may emit contaminants. The graphite sheet material may comprise substantially all carbon. The graphite sheet material may be a pyrolitic graphite.

The graphite material may, for example, comprise a graphite sheet and the body or housing may include a first surface in contact with the graphite sheet. The first surface may be configured to increase thermal conductivity between the body and the graphite sheet. The first surface may include surface features and/or be prepared by micromachining, nanofabrication, and/or other processes to create micro or nano-scale surface features to increase thermal conductivity.

The graphite material comprises a graphite sheet, such as a pyrolitic graphite sheet. The graphite sheet may include and/or may be in contact with thermally conductive particles. The conductive particles may be embedded in the graphite sheet. The conductive particles may be in contact with and/or embedded in a mating surface adjacent to the graphite sheet. The conductive particles may be powdered diamond or other conductive materials. The graphite material may be a graphite sheet including an impregnated powdered diamond material.

The light may have a structural body configured to withstand an external water pressure. The external water pressure may be at least 50 pounds per square inch (PSI). The external water pressure may be at least 1000 PSI.

The semiconductor lighting elements may be, for example, LEDs having a dome and the window may comprise sapphire. The dome may be in contact with the sapphire. The LED domes may be silicone domes. The LED domes may include a flat top surface in contact with the sapphire. The flat top surface may be a manufactured surface. The LEDs may be trimmed using a cutting element to form the flat top surfaces. The flat top surfaces may be trimmed on a array of the plurality of LEDs. The trimming may be done after the LEDs are mounted on a printed circuit element, such as an MCPCB. The sapphire window may be compressed against the LEDs. The sapphire window may be compressed against the LEDs during assembly of the lighting device. The sapphire window may be compressed against the LEDs by water pressure during underwater deployment.

In another aspect, the disclosure relates to a submersible LED light fixture. The light fixture may include, for example, a light head made of a thermally conductive material, a metal core printed circuit board (PCB) thermally coupled to the light head, a plurality of semiconductor lighting elements, such as LEDs, mounted on the MCPCB, an optically transparent window mounted in the light head, where the window may extend across the MCPCB and be spaced from the LEDs or in contact with the LEDs. The window may be sealed around a periphery thereof to the light head. The light fixture may further include a multilayer stack of spacers made of a high compressive strength material positioned between the window and the MCPCB for engaging the window and carrying loads exerted by the window. The light fixture may further include a sequestering agent and/or a browning agent destroyer disposed behind the window. The light fixture may further include a graphite material configured to seal a first volume of the housing or body and a volume of the housing or body.

The sequestering agent may include, for example, an adsorbent material and/or an absorbent material. The absorbent material may be a silica gel material. The silica gel material may bedisposed to contain captured gases capable of effecting browning. The absorbent material may be a molecular sieve material. The molecular sieve material may be a zeolite material. The zeolite material may be an aluminosilicate zeolite. The absorbent material may be an activated charcoal material. The absorbent material may be a clay mineral material. The sequestering agent may include a chemically reactive binder material. The sequestering agent may be disposed to absorb and contain a gas capable of browning a phosphor element of the light fixture. The sequestering agent may be disposed to absorb and contain a gas capable of browning the silicone element.

The browning agent destroyer may, for example, include a catalyst material. The catalyst material may include one or more of a platinum, palladium, rhodium, cerium, iron, manganese, nickel, and copper material. The sequestering agent and/or browning agent destroyer may be disposed within the silicone element.

The light fixture may include, for example, a silicone element. The semiconductor lighting element may be an LED and the silicone element may be a component of or coupled to the LED. The silicone element may be a silicone dome element of the LED. The sequestering agent and/or browning agent destroyer may be disposed within and/or adjacent the silicone element. The lighting device may include a plurality of LEDs, which may be configured in an array. The LED array may be configured with a flat top surface which may be in contact with and/or compressed with the window. The window may be a sapphire forward optically transparent material. The light fixture may further include a reflector element. The sequestering agent may be disposed within the reflector element.

The light fixture may further include, for example, a phosphor. The phosphor may be disposed at least partially in the first volume. The sequestering agent and/or the browning agent destroyer may be disposed within and/or adjacent the phosphor element.

The graphite material may be, for example, a graphite sheet. The graphite sheet may be a pyrolitic graphite sheet (PGS). The PGS may be positioned between the circuit element, such as a metal core printed circuit board (MCPCB) and a thermally conductive mating surface of the housing. The semiconductor lighting element and/or the sequestering agent and/or browning agent destroyer may be sealed from the second volume at the mating surface. The light fixture may further include a phosphor element. The semiconductor lighting element, the phosphor element, the silicone element, and/or the sequestering agent and/or browning agent may be disposed in a sealed structure and/or volume of the light fixture. The graphite sheet may consist of graphite substantially free of contaminants. The graphite sheet material may not include binder materials, adhesives, or other materials that may emit contaminants. The graphite sheet material may comprise substantially all carbon. The graphite sheet material may be a pyrolitic graphite.

The graphite material may, for example, comprise a graphite sheet and the body or housing may include a first surface in contact with the graphite sheet. The first surface may be configured to increase thermal conductivity between the body and the graphite sheet. The first surface may include surface features and/or be prepared by micromachining, nanofabrication, and/or other processes to create micro or nano-scale surface features to increase thermal conductivity.

The graphite material comprises a graphite sheet, such as a pyrolitic graphite sheet. The graphite sheet may include and/or may be in contact with thermally conductive particles. The conductive particles may be embedded in the graphite sheet. The conductive particles may be in contact with and/or embedded in a mating surface adjacent to the graphite sheet. The conductive particles may be powdered diamond or other thermally conductive materials. The graphite material may be a graphite sheet including an impregnated powdered diamond material.

The light fixture may have a structural body configured to withstand an external water pressure. The external water pressure may be at least 50 pounds per square inch (PSI). The external water pressure may be at least 1000 PSI.

The semiconductor lighting elements may be, for example, LEDs having a dome and the window may comprise sapphire. The dome may be in contact with the sapphire. The LED domes may be silicone domes. The LED domes may include a flat top surface in contact with the sapphire. The flat top surface may be a manufactured surface. The LEDs may be trimmed using a cutting element to form the flat top surfaces. The flat top surfaces may be trimmed on a array of the plurality of LEDs. The trimming may be done after the LEDs are mounted on a printed circuit element, such as an MCPCB. The sapphire window may be compressed against the LEDs. The sapphire window may be compressed against the LEDs during assembly of the light fixture. The sapphire window may be compressed against the LEDs by water pressure during underwater deployment.

Example Embodiments

Various additional aspects, features, and functions are described below in conjunction with the embodiments illustrated in the appended drawing figures. In addition, details of embodiments of underwater lighting apparatus and devices that may be used in combination with the disclosure herein are described in co-assigned applications including U.S. Provisional Patent Application Ser. No. 61/491,191, filed May 28, 2011, entitled SEMICONDUCTOR LIGHTING DEVICES & METHODS, U.S. Provisional Patent Application Ser. No. 61/536,512, filed Sep. 19, 2011, entitled LIGHT FIXTURE WITH INTERNALLY LOADED MULTILAYER STACK FOR PRESSURE TRANSFER, U.S. Utility patent application Ser. No. 12/844,759, filed Jul. 27, 2010, entitled SUBMERSIBLE LED LIGHT FIXTURE WITH MULTILAYER STACK FOR PRESSURE TRANSFER, and U.S. Utility patent application Ser. No. 12/700, 170, filed Feb. 4, 2010, entitled LED LIGHTING FIXTURES WITH ENHANCED HEAD DISSIPATION. The content of each of these applications is incorporated by reference herein in its entirety.

Lighting devices using semiconductor lighting elements have been used in the art for various lighting applications. Example devices include a semiconductor element for generating light output in visible light wavelength, or, in some cases, in Infra-Red (IR) and/or Ultraviolet (UV) wavelengths, as well as shorter wavelengths, such as in the form of Light Emitting Diodes (LEDs). For purposes of brevity, such lighting devices may also be referred to herein as "LED devices."

In a typical LED device, the output wavelength range of the semiconductor element (also referred to herein as an "LED element" or "LED") is fixed, and the output of the LED device is determined by action of another element of the LED device, such as a phosphor element which is illuminated by the light emitted from the LED element and emits other light which may be at different wavelengths. For example, an LED element may emit photons in the range of 450-460 nanometers (nm), which are absorbed by phosphors, with the phosphors then emitting output light at different wavelengths, such as longer wavelengths.

It has been observed that in operation LED devices may fail, sometimes in a rapid fashion. For example, it has been observed that LED devices operating at rated power, well below the expected mean failure time, may suffer from rapid light output drops. This phenomenon has been referred to as "browning," and may include browning or darkening of elements of the LED device which may decrease opacity of the LED device, however, other failure mechanisms may also be implicated in browning of lighting elements, as further described below.

In order to better describe the operation and failure of a typical LED device, attention is now directed to FIG. 1, which illustrates an exemplary LED device configuration 100. Device 100 includes an output lens or dome structure, such as dome 120, which may be fabricated from a silicone rubber material (e.g., an elastomer, polymer, or other inert synthetic material including silicone) or other transparent material, such as a non-silicone plastic material. Other elements of LED Device 100 (not specifically shown) may also be fabricated from silicone or other plastic materials. A light emitting element or LED element 110 may be mounted below the dome 120 and may be partially, or more typically fully, enclosed by the dome and a substrate 130, which may be a ceramic material to withstand heating of the LED element and conduct heat away. In a typical operating mode, temperatures of 100 Degrees C. or higher may occur.

A phosphor element 114 may be positioned above the LED element 110 to generate output light in a desired wavelength range based on photos emitted from the LED element. The LED element is typically connected to electrical power via a wire bond 112 (or other connection, such as direct solder connection to a pad, etc.) supplied from an electronic circuit element including power and/or control circuitry. A metallization terminal 116 may be used to couple the electrical power over the substrate to the wire bond (or other connection mechanism).

Additional electrical connections may include other metallic or conductive elements, which may be soldered together. For example, a conductor 144 may be coupled to other conducting elements, such as conductor 146, via a soldered connection 140. As further illustrated in FIG. 2, connection flaws, such as solder voids or other flaws, may contribute to browning as discussed subsequently. Materials that emit contaminants, such as circuit elements, soldering fluxes, plastic or rubber materials, or other materials, may cause or contribute to browning. Other elements of a typical LED device may include additional printed circuit boards, such as PCB 150. The various circuit boards, wires and other connectors and conductors, and other elements, such as seals, coating, reflectors, mounting hardware, and the like may include organic compounds or other compounds that can generate or "outgas" potentially harmful contaminants as gases or vapors that contribute to browning. For example, substrate 130 may include an insulating mask of a plastic material, such as insulating mask 132 or other elements, which may emit harmful gases.

As noted previously, a decrease in light output from an LED device, also denoted herein as browning, may occur in a rapid, unpredictable fashion. This has been observed by companies involved in both component design and production, such as LED element manufacturers, as well as product integrators, such as companies making lighting system comprised of one or more LED elements along with other components. Considerable effort has been expended by LED manufacturers to address this problem, which can be both expensive (by incurring replacement costs for devices that fail prematurely), as well as difficult to perform. For example, one application of interest to the assignee of the instant application is underwater lighting or lighting in wet or damp environments, where LED devices such as device 100 as shown in FIG. 1 are integrated into lighting systems for use on underwater or aerial platforms, vehicles, etc. In this environment, it may be very problematic to incur lighting failure and difficult to replace failed elements. Therefore, it is desirable to be able to avoid or at least control browning-type failures.

Research done by DeepSea Power and Light, Inc., assignee of the present invention, has suggested that browning failures are caused by multiple failure mechanisms. For example, while darkening of transparent elements of LED devices may result in some loss of light output, it appears that this may be only partially responsible for the aggregate light output loss. The darkening may be a result of breakdown of silicone materials in the elastomeric dome structure, as well as in other elements of LED Devices. Moreover, it is believed that initial breakdown of silicone or other materials may result in a chain-reaction failure where damaged molecules absorb more photons and further contribute to additional creation of molecules that further contribute to breakdown. The damage associated with browning may be caused at least in part by the presence of small organic molecules, in the form of "poisoning" gases, which are in contact with and/or absorbed within elements of lighting devices. For example, these may be gases that can be chemically broken by light emitted from semiconductor devices (e.g., light in the 455 nm range), and which may not be able to freely migrate through sealing mechanisms within lighting devices, such as O-rings or gaskets of materials such as Viton™.

Consequently, it may be desirable to maintain a high degree of cleanliness in manufacturing and handling of lighting device elements and assemblies to reduce the initial presence of poisoning gases; however, other mechanisms for emission of small organic molecules, such as from plastic components, may still be inherent in the various lighting device components. In addition, in some cases other sources of poisoning may be present. For example, it may be possible that water can contribute to poisoning processes to some degree in some applications.

Although damage to silicone elastomer structures of LED devices, such as damage to silicone dome 120, is implicated as a partial cause of browning, it is believed that additional browning effects may be associated with damage or "poisoning" of the phosphor elements. In this failure mechanism, the phosphor elements may be damaged by gases emitted from other elements of the LED devices, such as from solder voids 142, and/or by other contaminant gas emissions from plastics or other materials.

Figure 2:
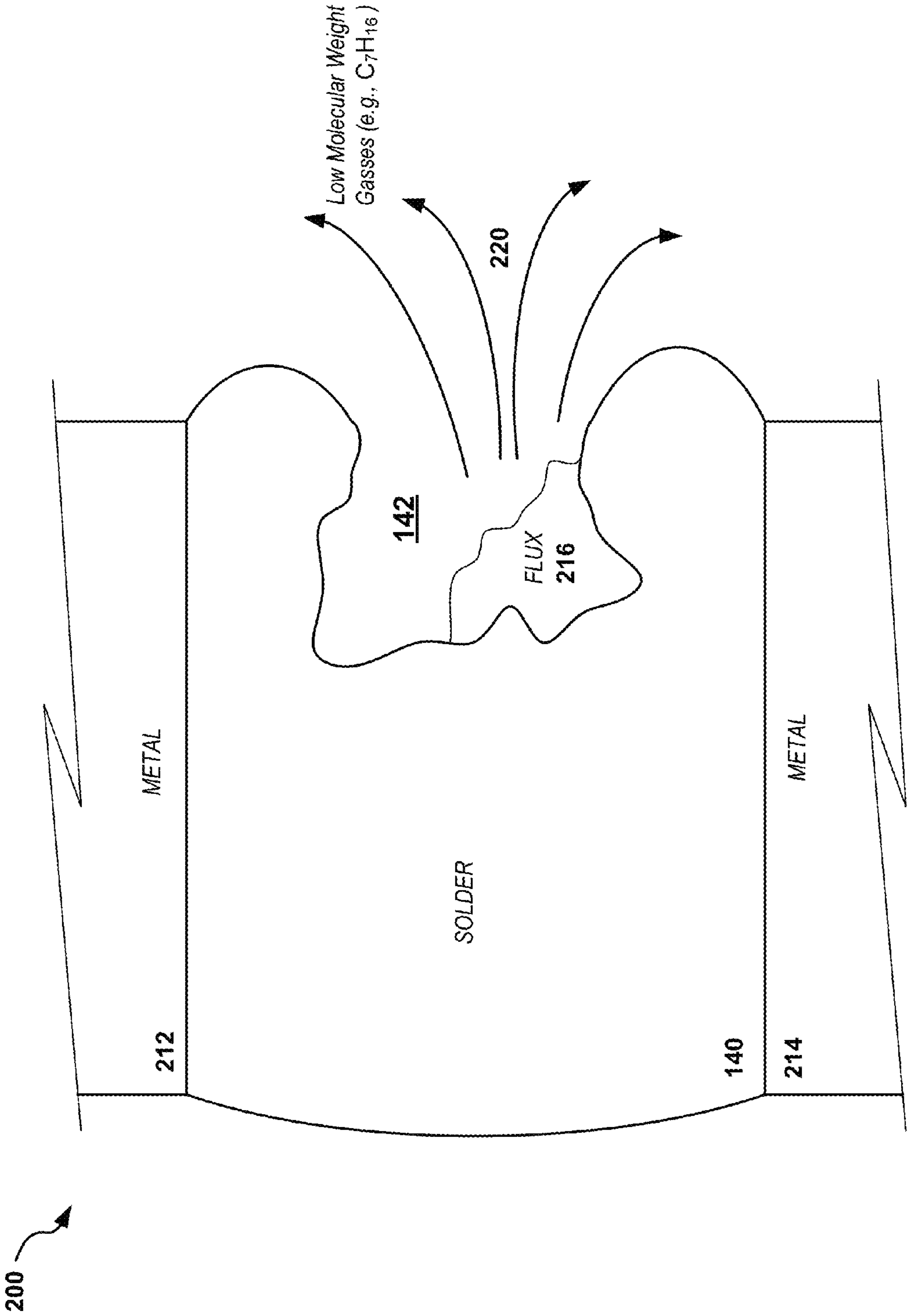
FIG. 2 illustrates an example solder void in a lighting device such as shown in FIG. 1.

FIG. 2 illustrates a potential failure mechanism associated with a solder void such as void 142. In area 200, a solder joint 140, between metal connector elements 212 and 214, may have a void or other structural defect. For example, solder flux 216 may be present in the void. During operation, gases 220 may be emitted from the void area. These gases may be, for example, low molecular weight gases such as Hexane, Octane, Urea, etc. These gases may then interact with other LED device elements, such as silicone elastomer elements, phosphor elements, and/or other elements to decrease light output. In addition, other failure mechanisms may occur as a result of or in consequence with "poisoning" of an internal volume of a lighting device. For example, the LED element temperature may increase in conjunction with browning, which may decrease light output and/or change photon wavelength, further decreasing LED device output.

Figure 3:
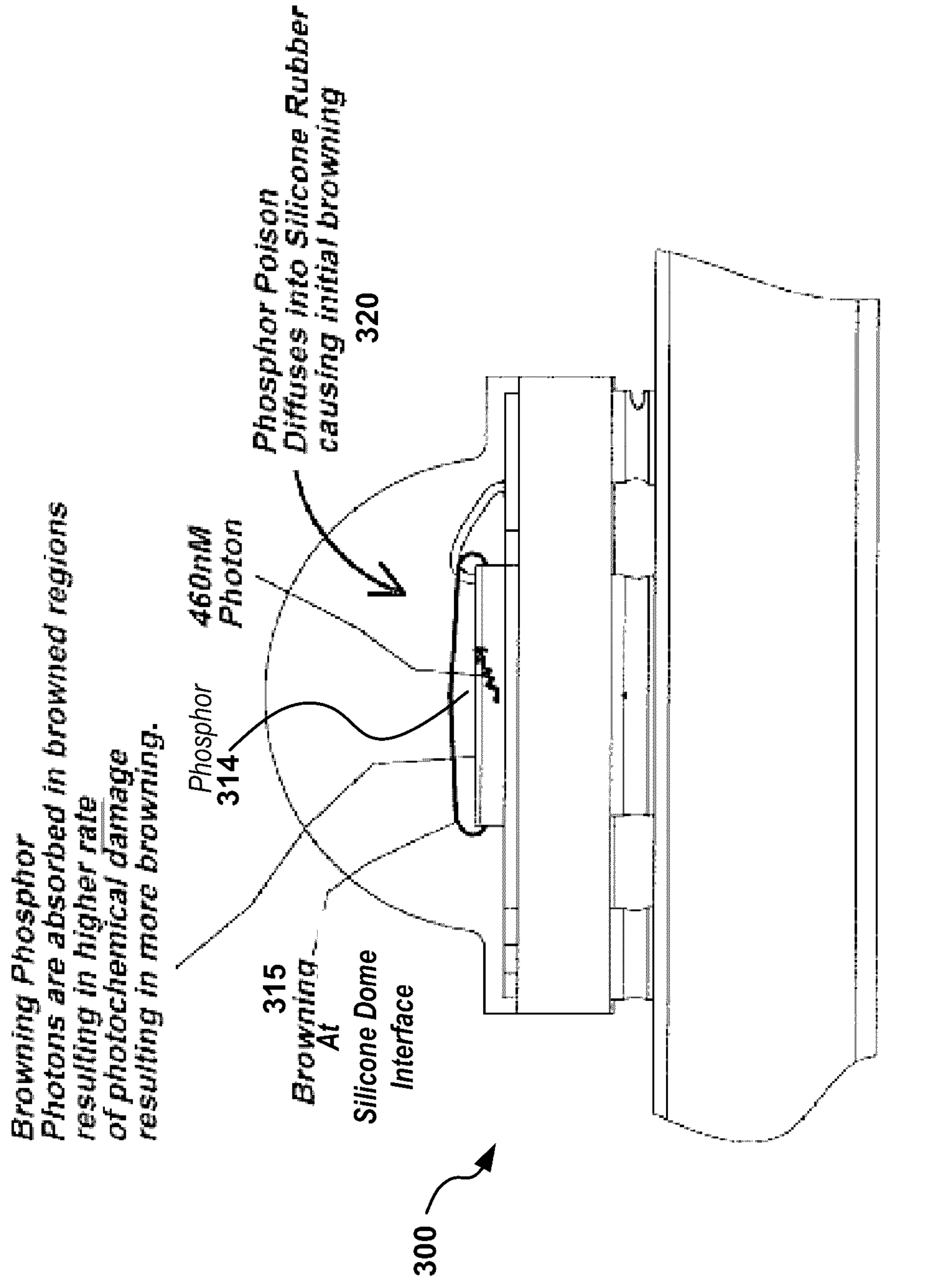
FIG. 3 illustrates an example browning process in a semiconductor lighting device.

FIG. 3 illustrates an example of a chain reaction failure of a phosphor element in an LED device 300, which may be similar to device 100 as shown in FIG. 1. In this failure mode, damage caused to phosphor 314 such as by outgassing, such as from a defect as shown in FIG. 2, initially results in browning of areas of the phosphor. Photons emitted from the LED element are then absorbed in the browned regions, resulting in a higher rate of photochemical reaction and damage, thereby accelerating browning. Additional browning may occur in silicone elements such as at the silicone dome 315 to phosphor 314 interface, silicone rubber dome 320, and/or other elements (not shown) of the lighting device.

Considerable efforts by different companies in the lighting systems and components fields have failed to identify suitable materials and material configurations to solve the browning problem. However, research and study of the problem by DeepSea Power and Light, Inc., assignee of the instant application, has demonstrated that use of sequestering agents, such as adsorbents, absorbents, and/or chemically reactive binders, and/or browning agent destroyers, such as catalysts (for example, platinum or other catalytic materials such as platinum, palladium (as an oxidation catalyst), rhodium (as a reduction catalyst), cerium, iron, manganese, nickel and/or copper), may provide a way to both prevent or limit browning as well as fully or partially repair LED devices damaged by browning failure mechanisms such as those described previously herein. In various embodiments, sequestering agents, either integrated within LED device elements, combined with LED device elements, and/or disposed in proximity to LED device elements, such as in one or more interior volumes of a lighting device, may improve lighting system performance by controlling, limiting, and/or repairing various browning effects.

Appropriate materials may include molecular sieve materials, such as zeolites in an exemplary embodiment, or other molecular sieves. These materials have the ability to absorb gases emitted from LED device elements and contain them. It is believed that previously studied materials have failed because of their inability to contain captured materials. For example, some materials which have been previously studied may release absorbed gases upon heating or during other conditions. However, materials such as zeolites have designed pore structures that molecules can diffuse into. Once diffused in, however, these materials contain the gases much more completely than previously studied materials.

One example brand of materials that may be useful for such applications is Tri-Sorb® "Zeolite," however, other molecular sieve materials, clay minerals, or other materials capable of capturing and containing small, outgassed molecules, may also be used. Examples of zeolite structures and related information, such as nomenclature and information related to pore shapes and sizes, may be found in the book "Atlas of Zeolite Structure Types," by Meier et al., August 1996, Excerpta Medica, the content of which is incorporated by reference herein. Example clay materials are materials such as those used in the trademarked "Desi Paks" made by SubChemie Inc, based on aluminosilicate clay absorbents.

Some examples that may be used in particular applications include Type 4A molecular sieves that absorb molecules with a critical diameter of less than four Angstroms, such as Carbon Dioxide. Other materials have different molecular absorbency characteristics, which may be denoted by type (e.g., Type 3A absorbs molecules having a critical pore diameter less than three angstroms, such as Helium Hydrogen and Carbon Monoxide, Type 13X for pore diameters less than 10 angstroms, etc.). The specific material used may be tailored to particular gases present in the LED device and which cause browning processes such as those described previously herein.

Tri-Sorb molecular sieve desiccants based on synthetic zeolite (molecular sieve) types 3A, 4A and 13X, Zeolites exhibit crystalline structures with well-defined and uniform pores of 3 Å, 4 Å and 10 Å diameters respectively. Tri-Sorb adsorbs water vapor and gas molecules that fit into the pores. The adsorption capacity of Tri-Sorb is relatively high at low humidity levels and remains almost constant as relative humidity increases. The adsorption rate is also high at high humidity levels. The adsorption capacity of Tri-Sorb as a function of temperature remains relatively constant at constant relative humidity and absolute humidity between 20° C. and 50° C.

Figure 4:
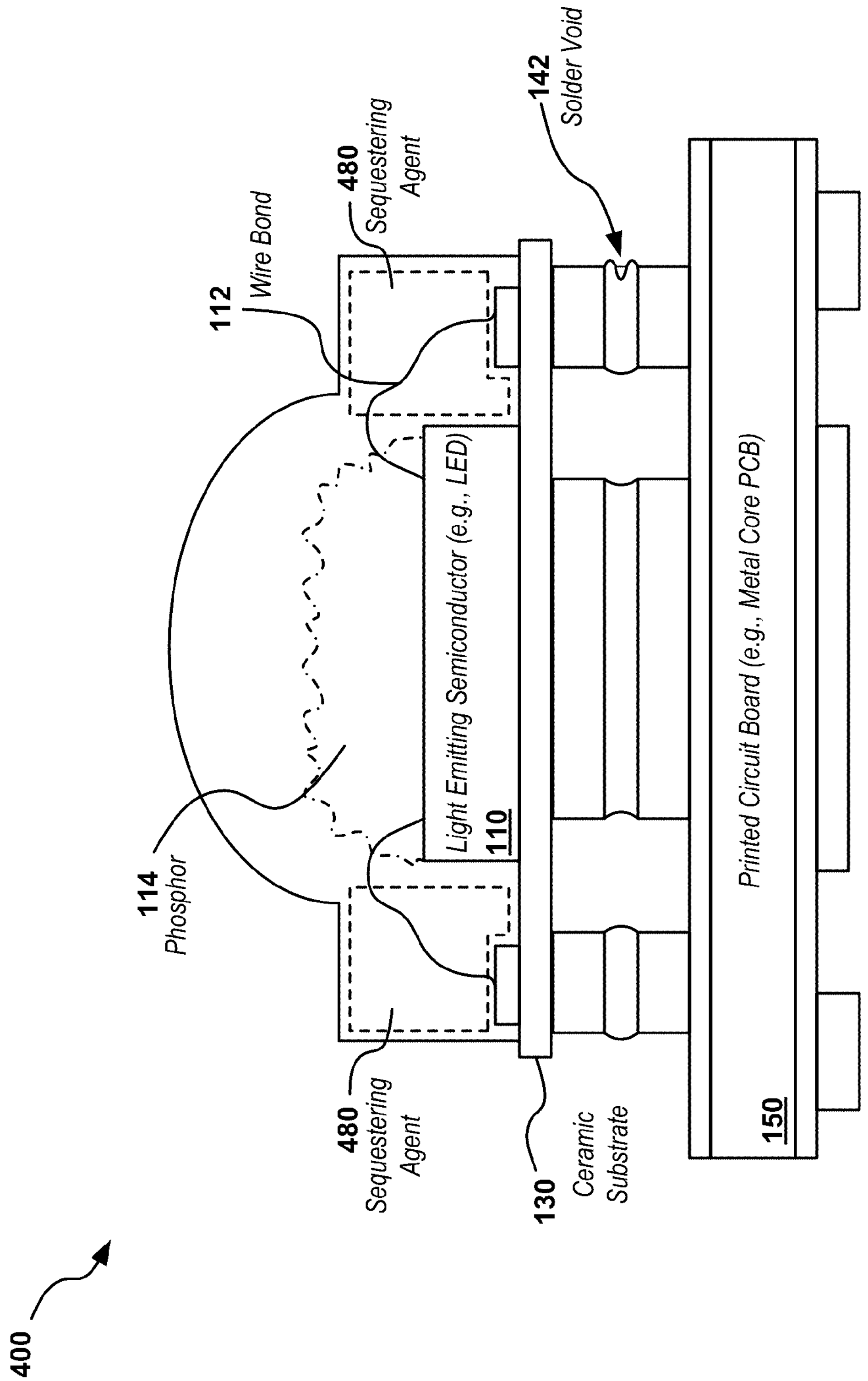
FIG. 4 illustrates details of an embodiment of a lighting device incorporating sequestering agents and/or browning agent destroyer elements in accordance with aspect of the present invention.

FIG. 4 illustrates details of one embodiment of an LED device 400 including a sequestering agent material 480, which may be an absorbent, adsorbent, and/or chemically reactive binder, and/or a browning agent destroyer material. It is noted that, while the material 480 is shown at a particular location with LED device 400, the material 480 may be disposed in other areas in addition to or in place of the areas shown in various embodiments. For example, material 480 may be disposed adjacent to other elements of LED device 400 and/or may be integrated with other elements, such as in one or more interior volumes of the LED device. In one embodiment, a white clay material may be used and positioned as shown or elsewhere in or adjacent to LED device 400. In one embodiment, a reflective white clay material may be used, such as where reflection of light is desirable or necessary for operation. In some embodiments, sequestering agents may be combined with other elements, such as with white pigments such as titanium oxide (e.g., for reflective elements, white pigments, such as titanium dioxide, may cover sequestering materials such as white clay or other materials). Similar techniques may be used with browning agent destroyers.

Figure 5:
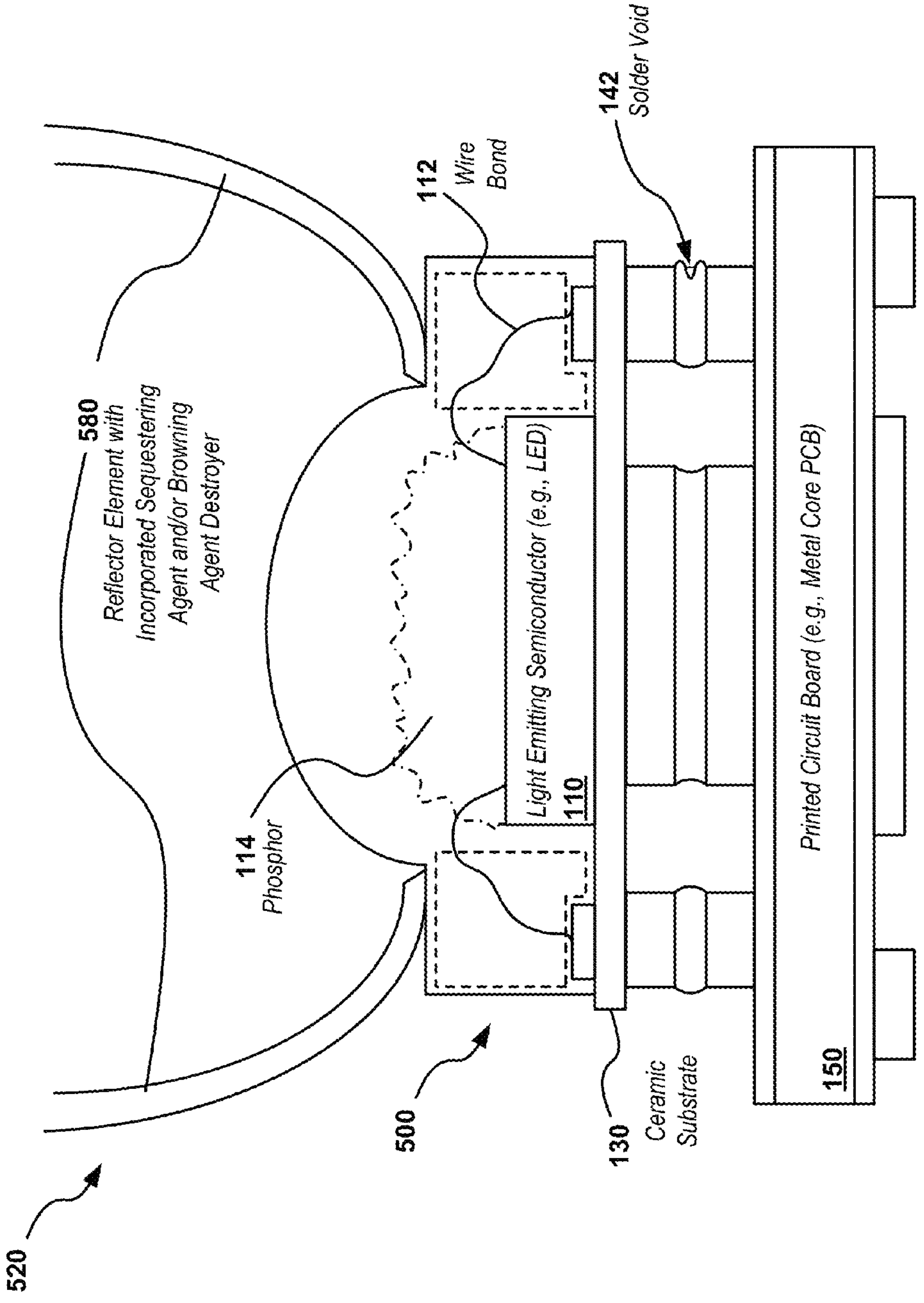
FIG. 5 illustrates details of an embodiment of a lighting device including sequestering agents and/or browning agent destroyers on or in a reflector in accordance with aspect of the present invention.

FIG. 5 illustrates details of another embodiment of an LED device 500. Device 500 may include an adsorbent and/or absorbent material that may be incorporated in a reflector element 580 of an LED lighting apparatus 520 that may include LED device 500. Other elements as shown in FIG. 5 may be the same as or similar to corresponding elements shown in FIG. 1.

Figure 6:
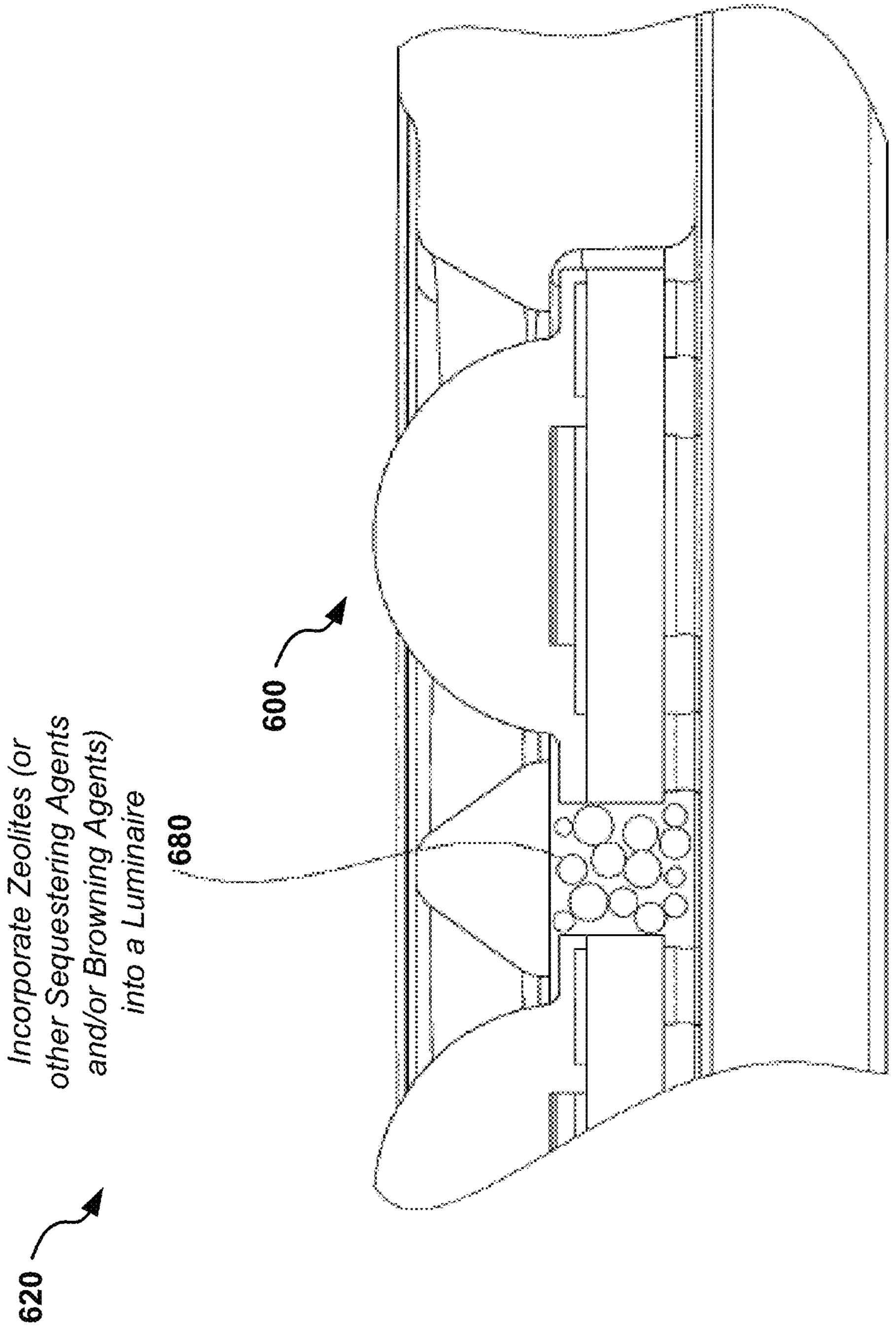
FIG. 6 illustrates details of an embodiment of a lighting device including zeolites in accordance with aspect of the present invention.

FIG. 6 illustrates details of another embodiment of an LED Device 600 including an adsorbent and/or absorbent material, in the form of absorbents, such as Zeolites, in an LED lighting apparatus 620. The zeolites may be incorporated in a cavity or other interior volume of the device, such as in location 680 as shown.

Figure 7:
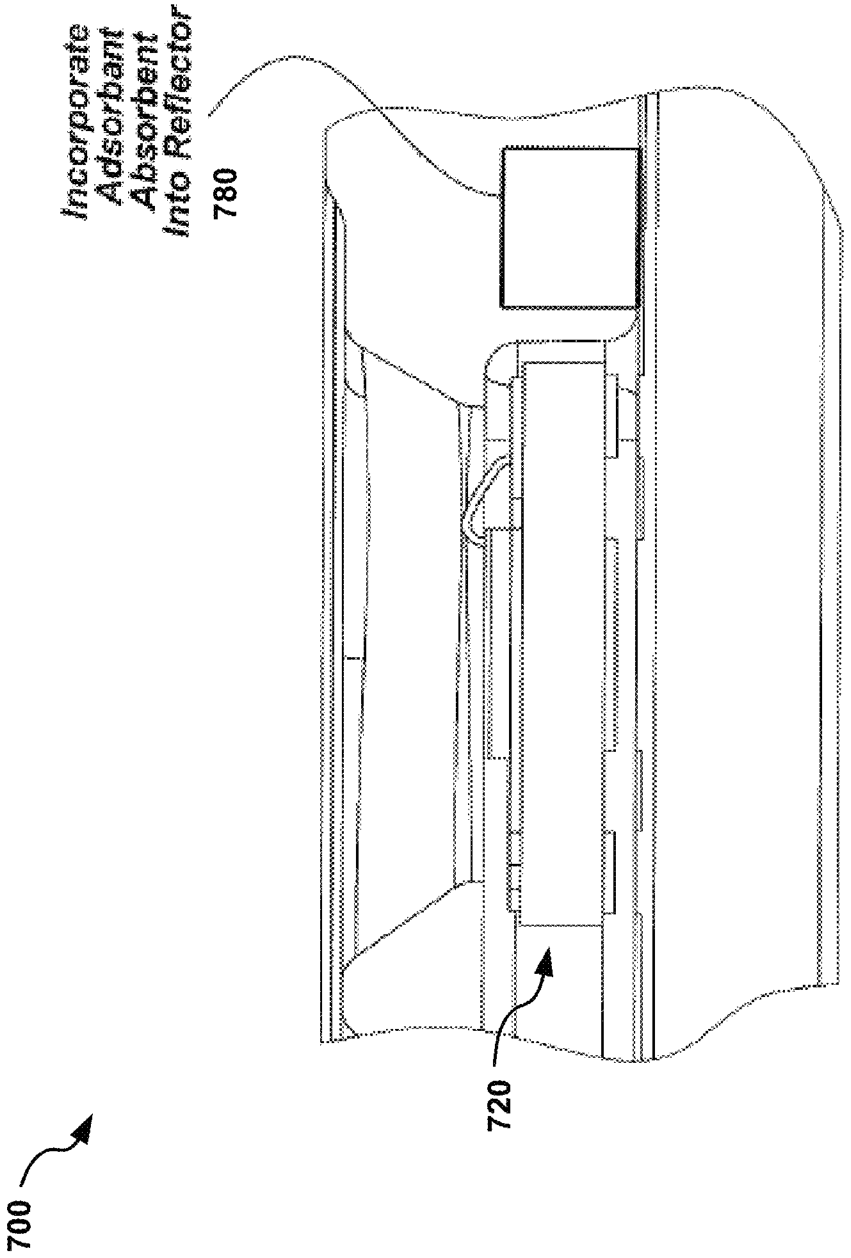
FIG. 7 illustrates details of an embodiment of a lighting device including sequestering agents and/or browning agent destroyers in accordance with aspect of the present invention.

FIG. 7 illustrates details of another embodiment of an LED Device 720 including an adsorbent and/or absorbent material incorporated into a reflector element 780 of an LED lighting apparatus 700.

Figure 8:
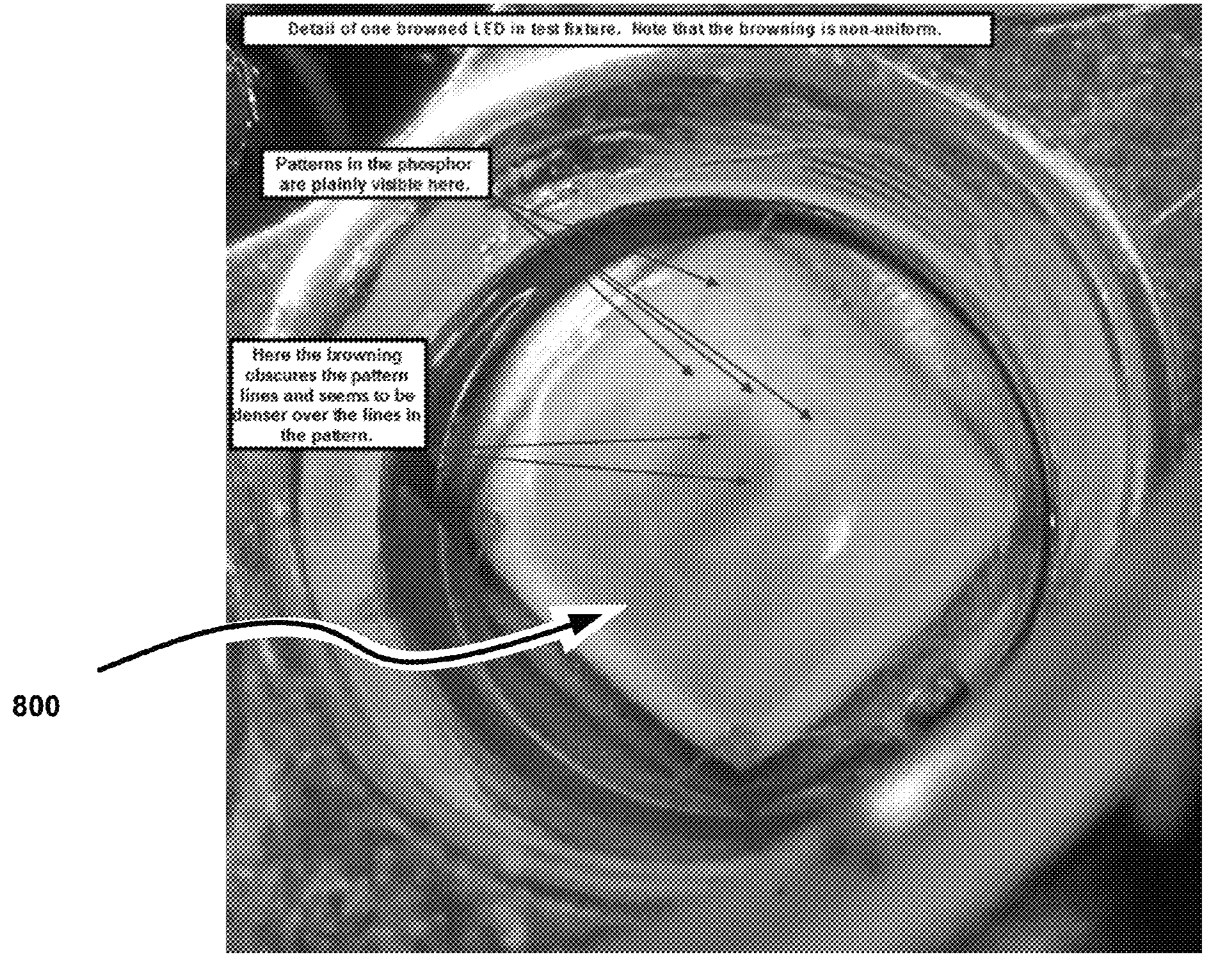
FIG. 8 illustrates details of an example phosphor element with browning.

FIG. 8 is a photograph of an experimental LED Device embodiment 800 with browning. In this example browning failure, the browning is non-uniform and obscures pattern lines, appearing denser over the pattern traces.

Figure 9:
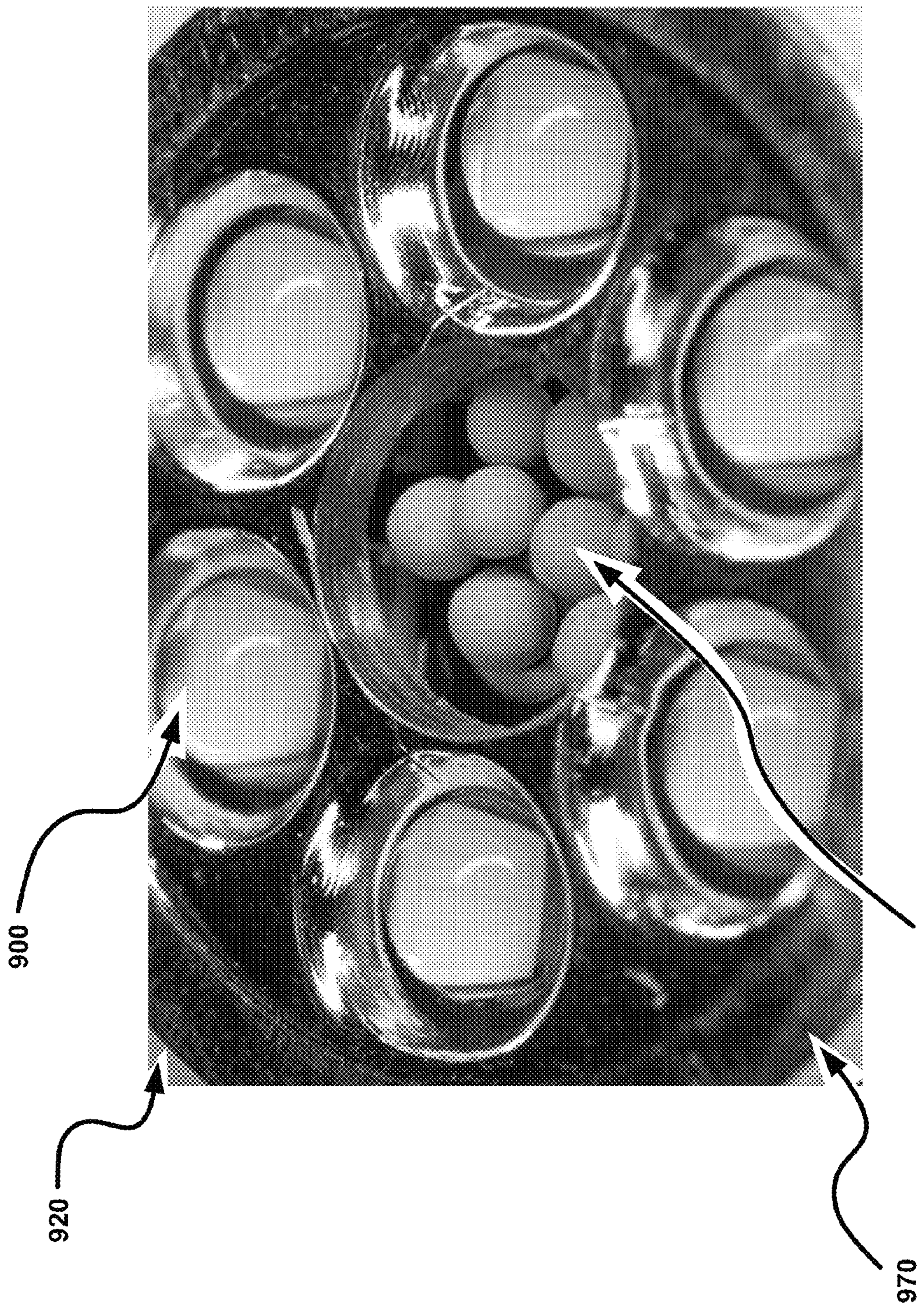
FIG. 9 illustrates details of an embodiment of a multi-element lighting device including a sequestering agent and/or browning agent in accordance with aspects of the present invention.

FIG. 9 is a photograph of an experimental embodiment of an LED Lighting Apparatus 920. Apparatus 920 includes 6 LED Devices 900 disposed within a reflector element 970. Absorbent and/or Absorbent materials 980 are disposed within the lighting apparatus 920, in this example between the LED Devices 900 as shown. However, in various embodiments, the materials 980 may be disposed in other places within an internal volume of the apparatus 920, such as in proximity to LED Devices 900 and/or integral with LED Devices 900.

In some embodiments, LED Devices may be configured to facilitate chemical reactions to chemically bind the browning agent and/or chemically degrade the browning agent to a harmless or less harmful chemical. This may be done through use of selected chemical compounds for binding to targeted contaminant materials such as those described herein.

In various embodiments, sequestering agents and/or browning agent destroyers may be disposed in various ways within elements of semiconductor lighting elements and devices, such as within the LED elements and LED devices described previously. For example, in some embodiments, sequestering agents may be disposed in one or more interior volumes, and may be packaged in or around the LED element, silicone elements (such as the silicone dome), and/or other elements of lighting devices as described previously and/or as illustrated in the accompanying drawings.

In some embodiments, various combinations of sequestering agents/browning agent destroyers may be combined to provide additional functionality. For example, in some embodiments a mixture of zeolites or similar or equivalent materials may be combined with activated charcoal or other similar or equivalent materials. Dust contamination from activated charcoal may be problematic if it is distributed in interior volumes on electronic or optical circuits or components, but may be addressed through use of compression or full or partial sealing of the activated charcoal material, such as in a silicone rubber membrane or other materials. This may be done by, for example, heat sealing or other binding or enclosure methods known or developed in the art.

In some embodiments water soluble solder pastes may be used in place of typical solder pastes having non-water soluble residues or other contaminants to reduce contaminants. For example, Kester or Alpha Metals pastes WS-809 appear to cause browning. This paste includes modified rosins and ethoxylated amines, which may contribute contaminants when enclosed within interior volumes. In general, fluxes have some sort of acid species for scrubbing surfaces (and/or amines) that may cause or contribute to contamination. Limiting or removing these during manufacturing may aid in reducing contaminants.

In embodiments where HiVac silicone grease or similar materials are used, it may be desirable to avoid direct contact between the silicone grease and other silicone elements such as LED domes in order to avoid transfer of contaminants through solid diffusion. HiVac grease and silicone domes may have similar molecular structures and if placed in contact molecules from the HiVac may transfer through the dome to high intensity light elements and cause degradation/browning. High purity silicone rubber materials (which tend to be expensive, for example on the order of $1000/kg) have been observed to cause little to no browning, while low cost materials have been observed to be more likely to brown.

In another aspect, sequestering agents and/or browning agent destroyers may be used in combination with a graphite material, such as a pyrolitic graphite sheet (PGS) in some embodiments. The graphite material may be used in place of or in addition to gels or other sealing materials to isolate internal volumes of a semiconductor lighting device and/or to aid in heat conduction/thermal transfer between elements of the lighting device, such as mating surfaces, circuit boards, and/or other elements used for transferring heat. For example, in embodiments where housing include multiple elements and/or circuit assemblies to define interior volumes and seal them relative to each other, graphite materials, such as pyrolitic graphite sheet (PGS) materials, may be used for sealing of the elements and/or to aid heat conduction therebetween.

Figure 10:
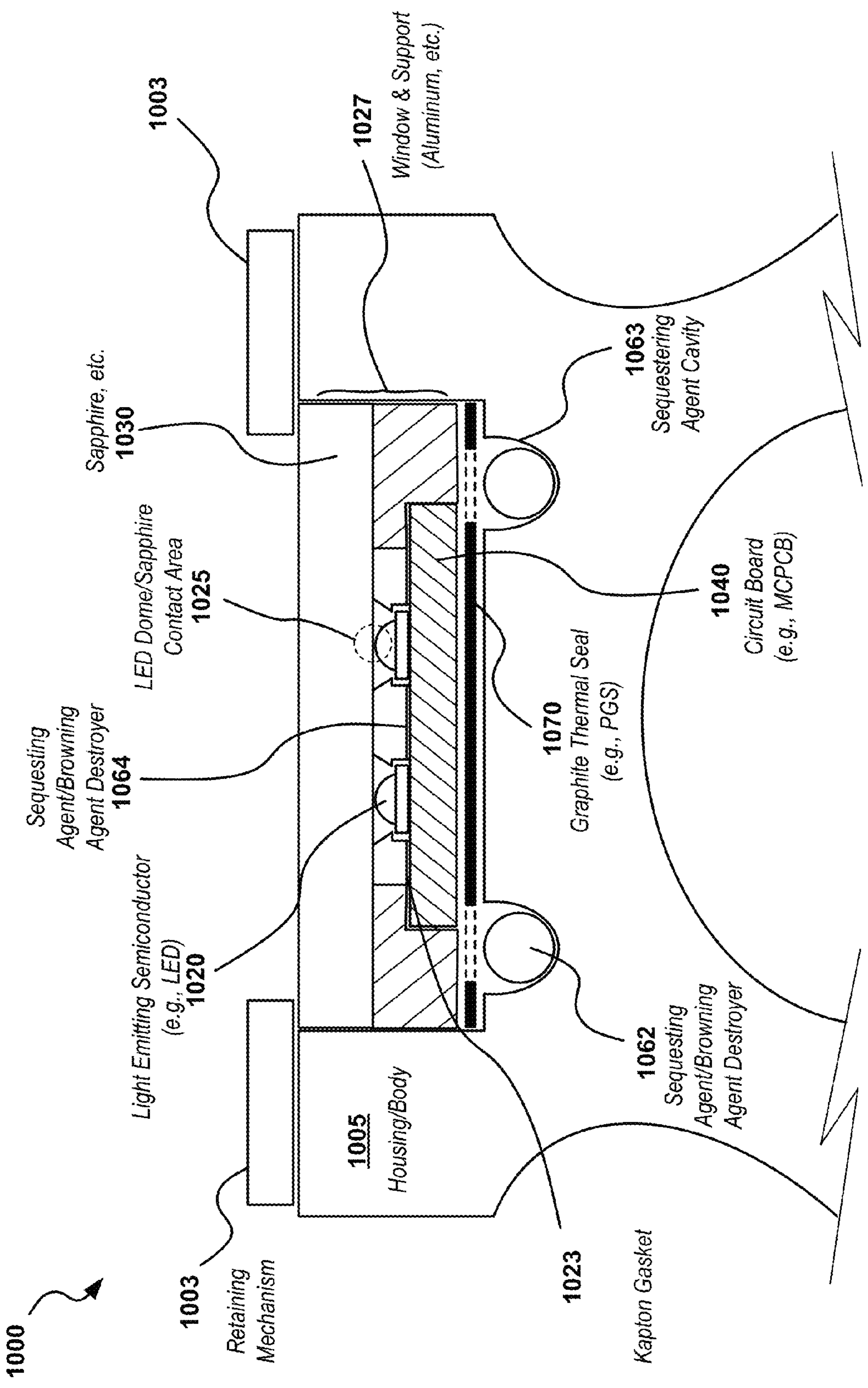
FIG. 10 illustrates details of an embodiment of a lighting device using a graphite material and a sequestering agent and/or browning agent destroyer.

Attention is directed to FIG. 10, which illustrates details on one embodiment 1000 of such a lighting device, in the form of an underwater light configuration, where a graphite sheet 1070 is used for sealing and conduction of heat (generated by LEDs 1020) between a circuit board element 1040 and the housing body 1005 (where the heat may be further dissipated to freshwater or seawater from the body 1005 during underwater operation). Circuit board element 1040 may be a metal core printed circuit board (MCPCB) to facilitate dissipation of heat generated by the LEDs, which can generate considerable heat, especially when high light output LEDs are used.

Figure 12:
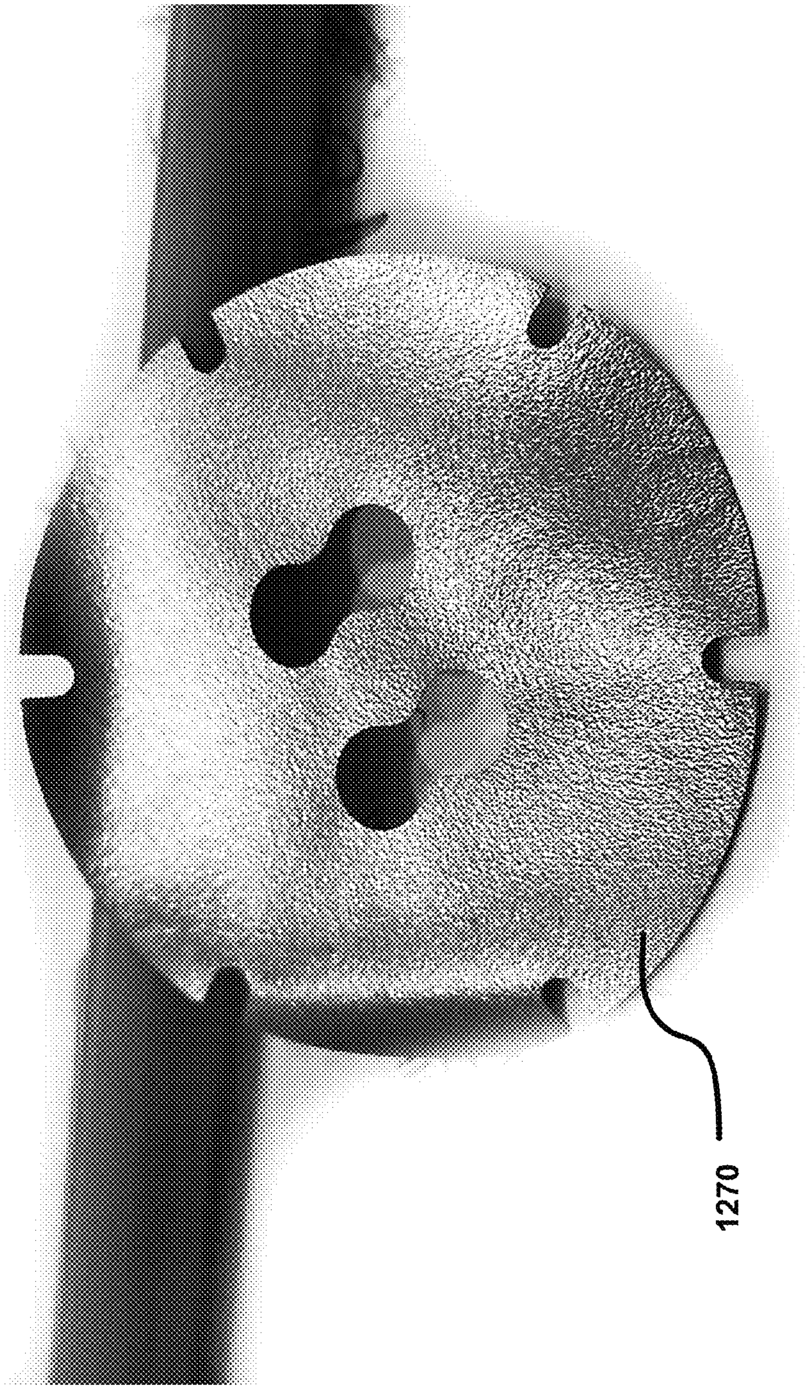
FIG. 12 illustrates one embodiment of a graphite material for heat transfer and/or sealing in the form of a pyrolitic graphite sheet (PGS).

A graphite material 1070, which may be, in an exemplary embodiment, a pyrolitic graphite sheet (PGS) may be used to seal volumes of the lighting device to limit exposure of contaminants to the LEDs from other volumes of the lighting device. Graphite material 1070 may include holes or vents to allow exposure of potential contaminants to sequestering agents/browning agent destroyers 1062 and/or sealing elements, such as silicone o-rings or gaskets, which may be disposed in a cavity 1063 as shown and/or elsewhere in the lighting device such as described previously herein. An example embodiment of such as cavity, defined by an internal volume, is further illustrated in FIG. 13B as cavities 1363, and holes or vents in example graphite sheets are shown in the example embodiment 1270 as shown in FIG. 12.

Additional sequestering agents/browning agent destroyers, such as agents 1064, may be placed as shown in FIG. 10 and/or elsewhere in the device. In particular, these may be located so as to be in contact with contaminants in the air or other gas within internal volumes of the lighting device to neutralize the contaminants. Contaminants may leach out of various elements of the lighting device over time and may be neutralized to limit contact with LEDs or other elements of the lighting device that may be subject to browning.

In some embodiments the LEDs 1020 may be configured to be in contact with a window for delivering light outward from the LEDs, such as a forward optically transparent window component in the form of a sapphire window (or of a glass, plastic, or other transparent material). An example of this is shown in area 1025, where a surface of the LED dome is in contact with the sapphire. A retaining mechanism, such as mechanism 1003 as shown, may be used to secure the sapphire and provide compression between the sapphire and LED domes to enhance contact. The LED domes may be flattened on top to provide additional contact surface area. For example, the domes may be prefabricated with a flat top and/or may have a flat top machined during manufacturing or assembly.

In an exemplary embodiment LED/sapphire contact fabrication may be done using a process where LED elements, such as LEDs 1020, are soldered onto an MCPCB, with a spacer then placed over the assembled LEDs. The spacer may be used to position a cutting tool that is used to trim the LEDs to a predetermined height. The cutting tool may then trim the top of the LED domes to a substantially uniform height. This processing may be advantageously done after assembly of the LEDs on the circuit board to insure uniformity of height of the trimmed LED tops (since LED height may vary due to variations in lead placement in the circuit board, soldering tolerances, and the like). By providing contact between the LEDs and sapphire (or other window element in some embodiments), LED temperatures may be lowered, which may further aid in reducing browning and output light degradation. For example, in example silicone rubber LED dome materials, it has been experimentally determined that browning is a function of temperature and may be a strong function of temperature. Moreover, it has been experimentally determined that LED device browning may be reversible by lowering operating temperature for a period of time.

In addition to affecting browning, providing contact between the LEDs and sapphire elements may enhance light output by, for example, reducing Fresnel surface reflections from outside a silicone rubber dome and from inside the window. For example, sapphire has a high level of Fresnel surface reflection because of its high index of refraction (approximately n=1.78), and therefore contact may reduce losses due to reflection.

Figure 24:
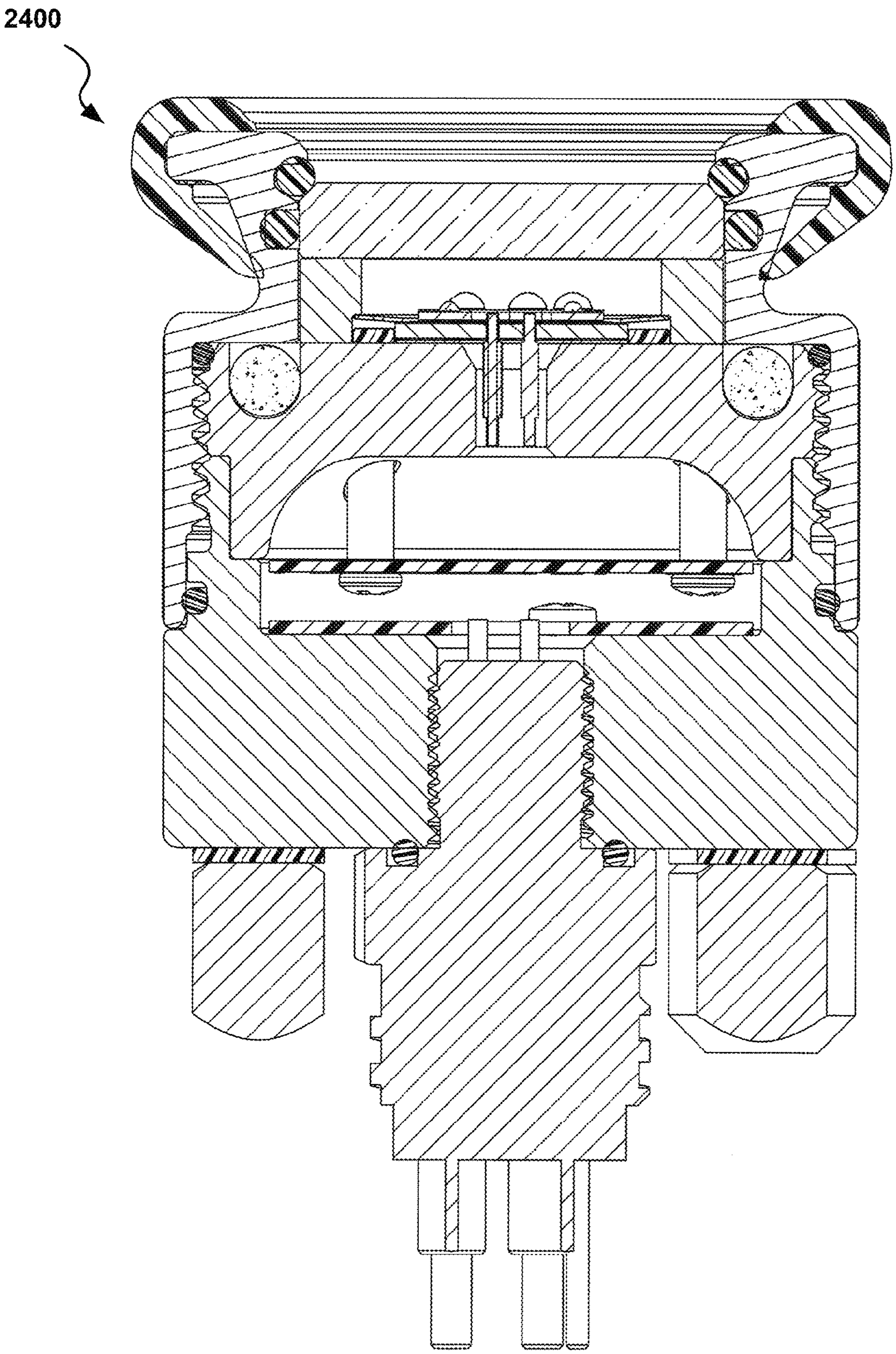
Figure 25:
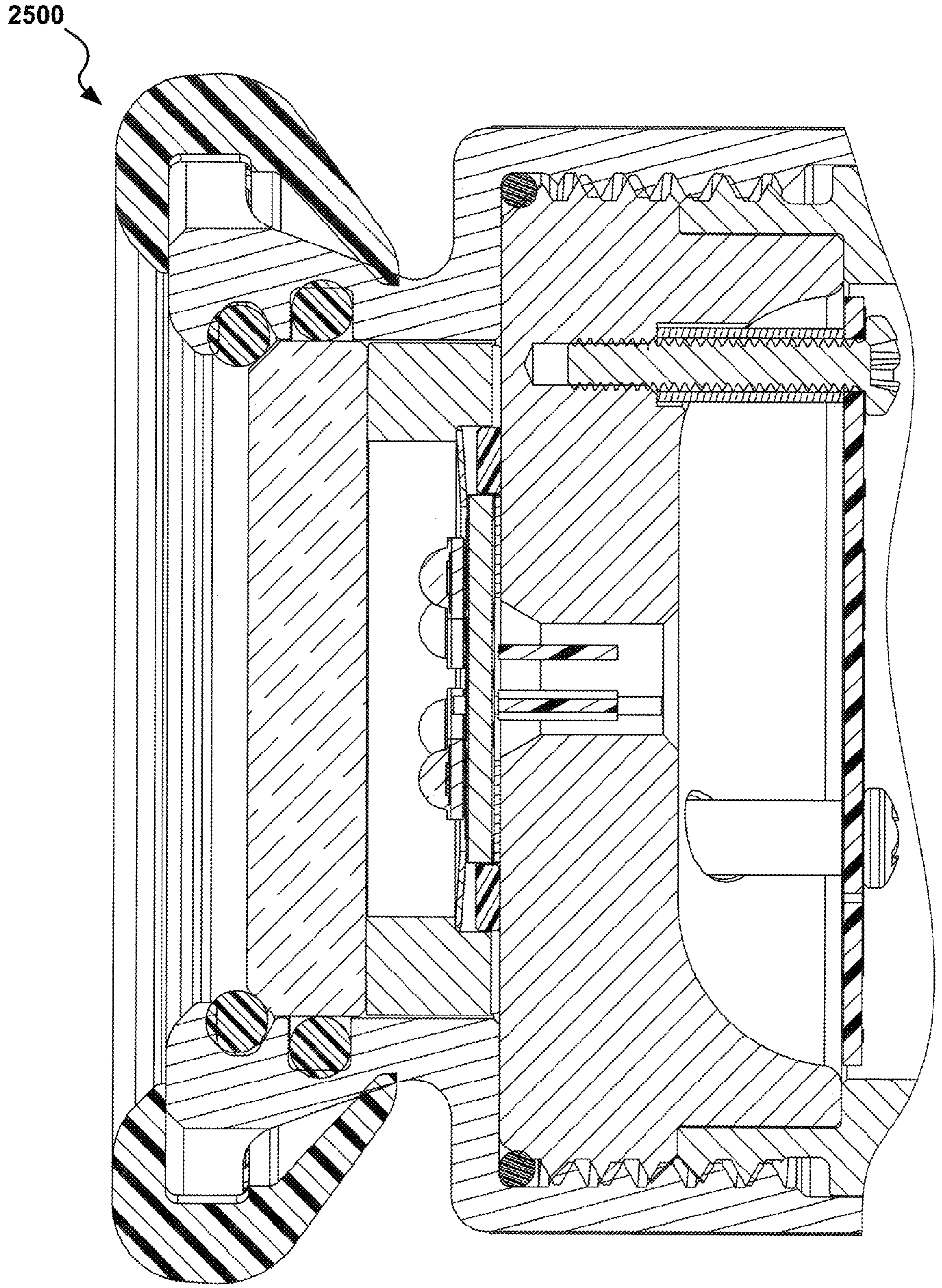

A similar effect may be achieved by using sapphire hemispheres about each LED, with the flat side clamped against the window or by using a sapphire ball lens in trapped contact between the LEDs and the inside of the pressure bearing window. Other variations, such as balls or round-shaped elements with a flat surface may similarly be used. Examples of somewhat similar configurations are described in co-assigned U.S. Utility patent application Ser. No. 11/350,627, filed Feb. 9, 2006, entitled LED ILLUMINATION DEVICES, the content of which is incorporated by reference in its entirety herein. For example, FIG. 24 illustrates such a configuration.

Figure 11A:
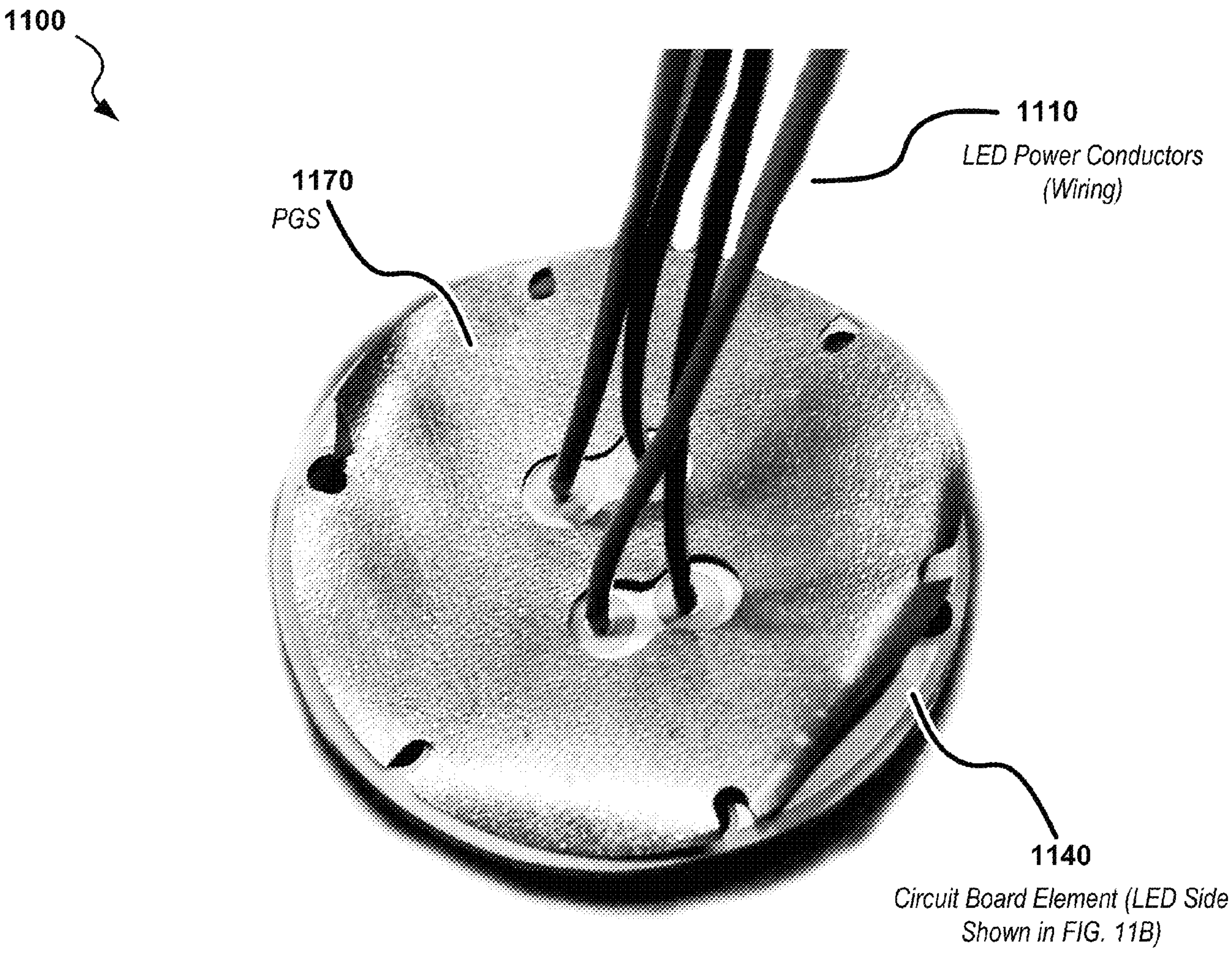
FIGS. 11A-11B illustrates details of an embodiment of a metal printed circuit board element with LEDs and wiring connections along with a graphite sheet for facilitating heat transfer and/or sealing.
Figure 11B:
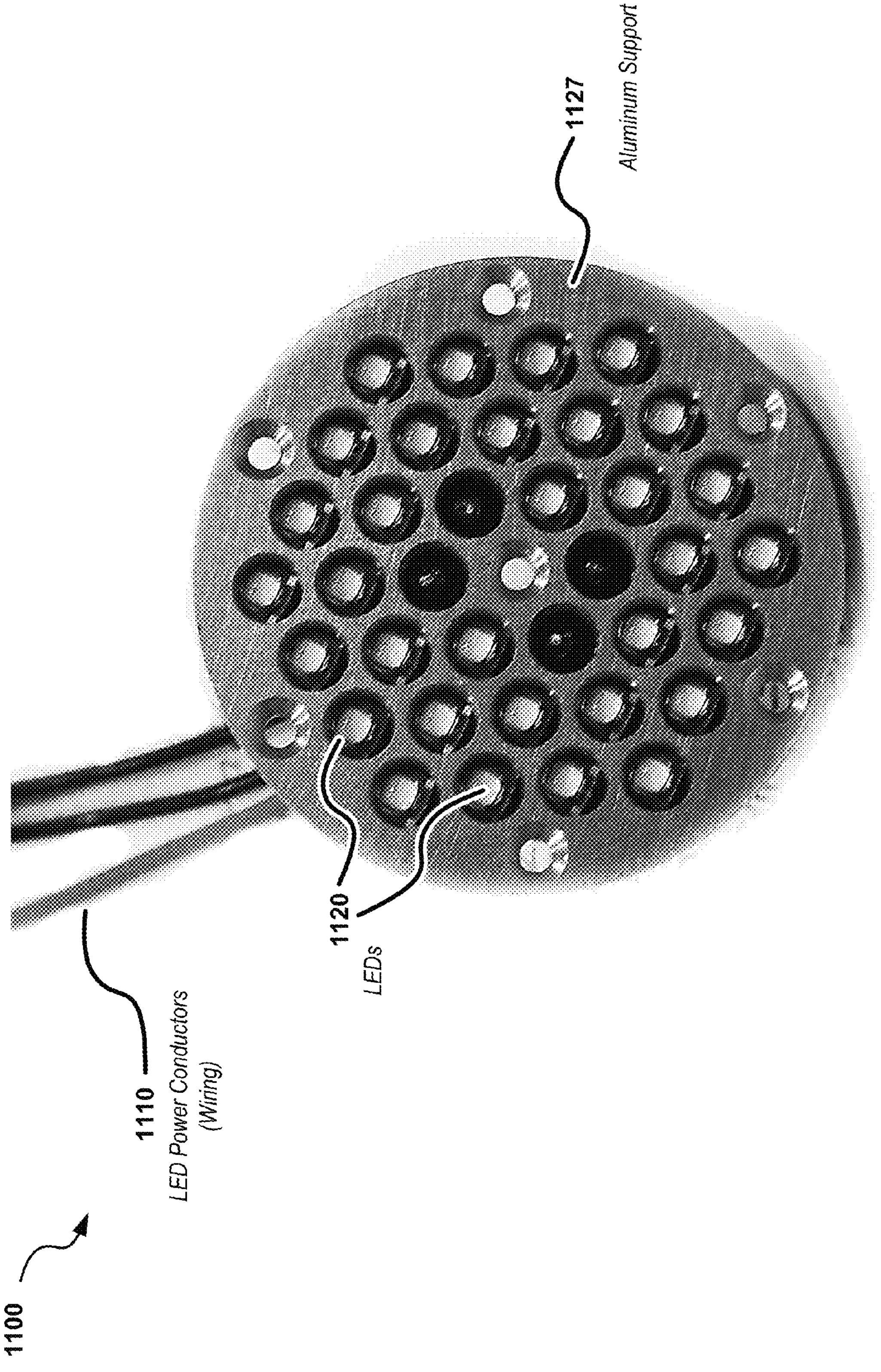

FIGS. 11A & 11B is a photograph of one embodiment 1100 of elements of a light including an MCPCB 1140 along with a pyrolytic graphite sheet (PGS) 1170, LEDs 1120, an aluminum support structure 1127, and LED conductor leads 1110. Isolation of elements such as the insulation on leads 1110, as well as other electronic components, packing, etc., through use of the PGS may advantageously mitigate contamination from leakage of contaminating materials from the insulation and/or other components. FIG. 12 illustrates a photograph of one embodiment 1270 of a PGS with access slots/holes to allow contact of gases with potential contaminants to sequestering agents/browning agent destroyers.

Figure 13A:
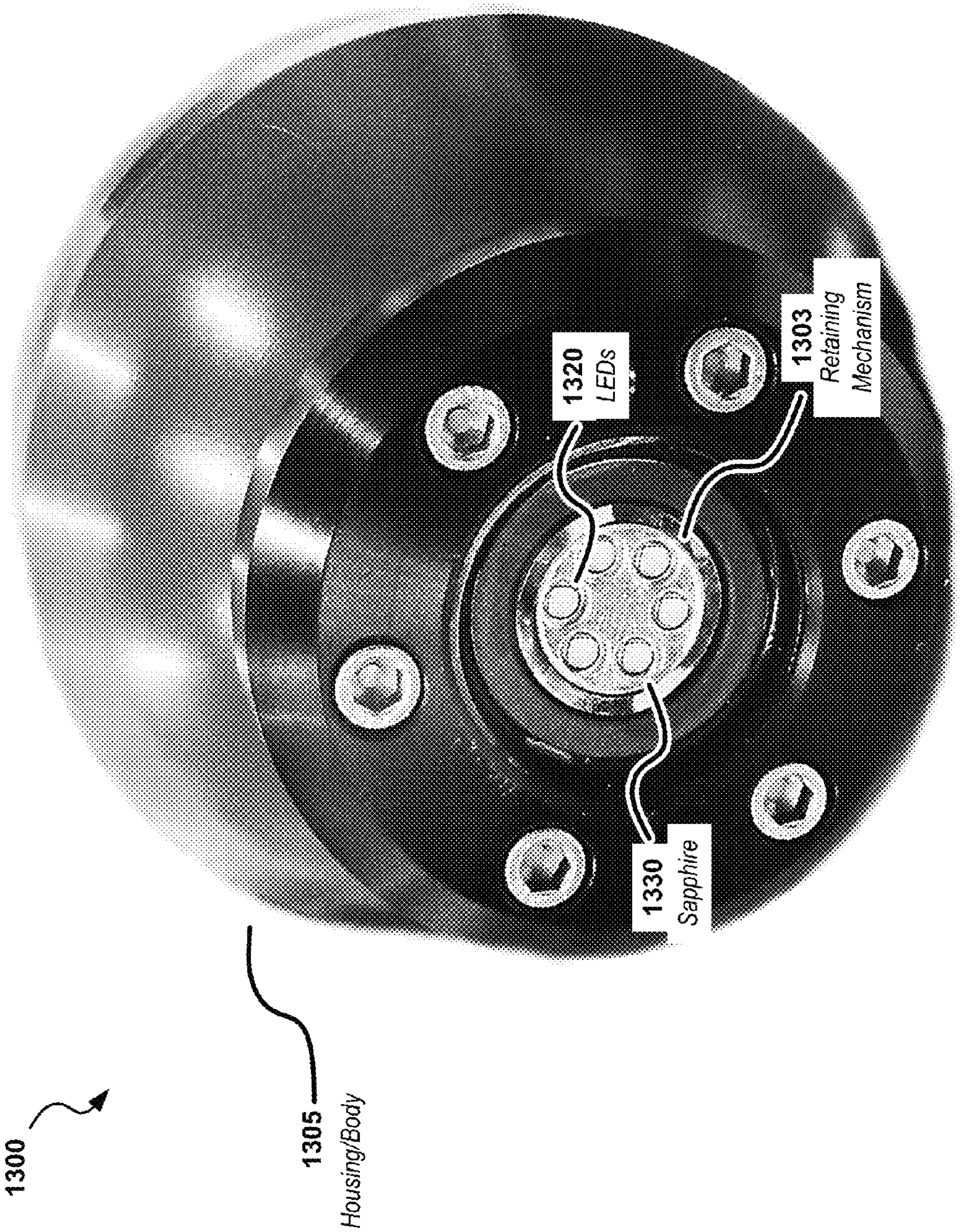
FIGS. 13A-13C illustrate details of one embodiment of an underwater lighting device which may internally include sequestering agents/browning agent destroyers and graphite materials for sealing and/or heat transfer.
Figure 13B:
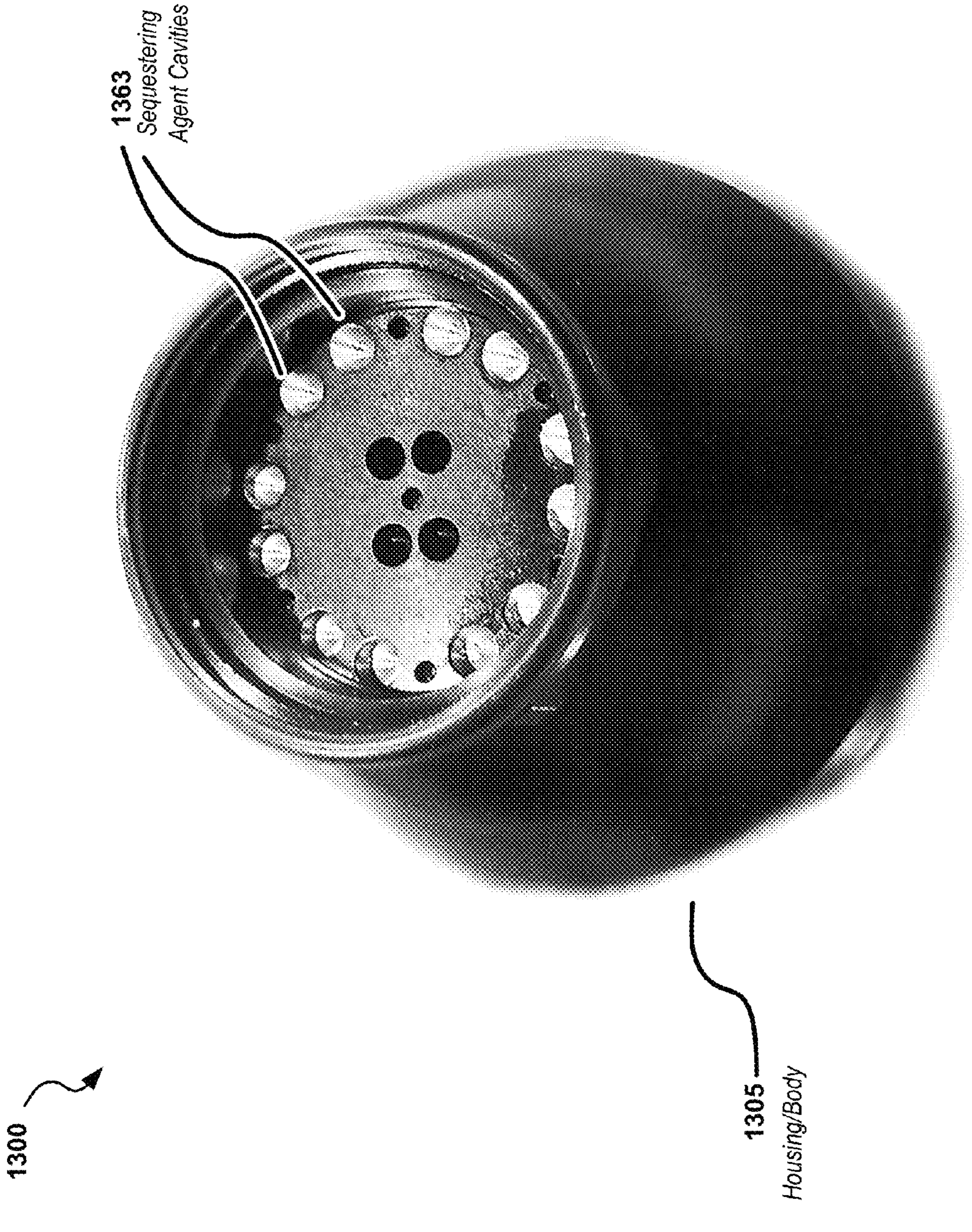
Figure 13C:

FIGS. 13A-13C is a photograph of one embodiment 1300 of an underwater lighting device configured to withstand water pressures such as may be experienced in the deep sea, where pressures may reach thousands of pounds per square inch (PSI). For example, at one mile of depth, the pressure is approximately 2300 PSI, and pressures increase further as depth increases, thereby requiring very high structural integrity to withstand these pressures during operation.

Device 1300 may include, internally, sequestering agents/browning agent destroyers and/or graphite materials, and/or sapphire/LED dome contacts to provide enhanced light output and/or reduce browning or other operational problems while withstanding deep sea water pressures. As shown in FIG. 13A, an optically transparent window 1330 may be in contact with LED elements 1320 of an LED array, and may be held in place in housing/body 1305 and/or compressed with a retaining mechanism, such as ring 1303. FIG. 13B illustrates details of the interior of lighting device embodiment 1300, where cavities 1363 may be used to retain sequestering agents/browning agent destroyers within internal volumes of housing 1305. Graphite materials (not shown in FIG. 13B) may be used to seal certain volumes of the interior of the housing while facilitating heat transfer to the body 1305 and to water in contact with the body. FIG. 13C is a photograph illustrating additional details of underwater lighting device embodiment 1300 in an isometric view.

Figure 14:
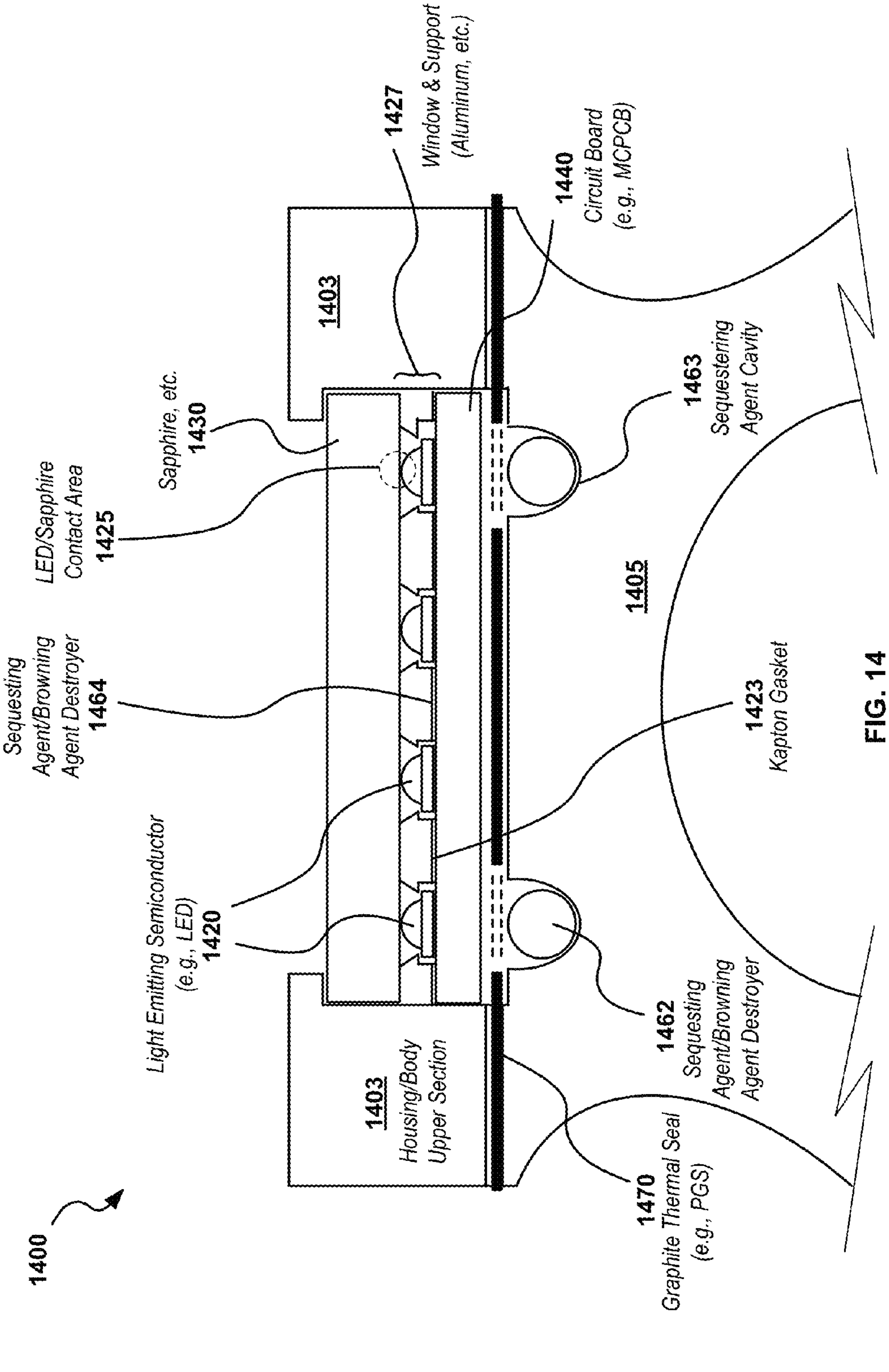
FIG. 14 illustrates details of another embodiment of lighting device using a graphite material and a sequestering agent/browning agent destroyer.

FIG. 14 illustrates another embodiment of a lighting device 1400 which may be configured similarly to device 1000 of FIG. 10, while extending the graphite material 1470 to additional surfaces of the housing or body. In general, the components shown in FIG. 14 are the same or similar to those shown in FIG. 10, however, the body of device 1400 may include additional components, such as upper section 1403 and lower section 1405.

Figure 15:
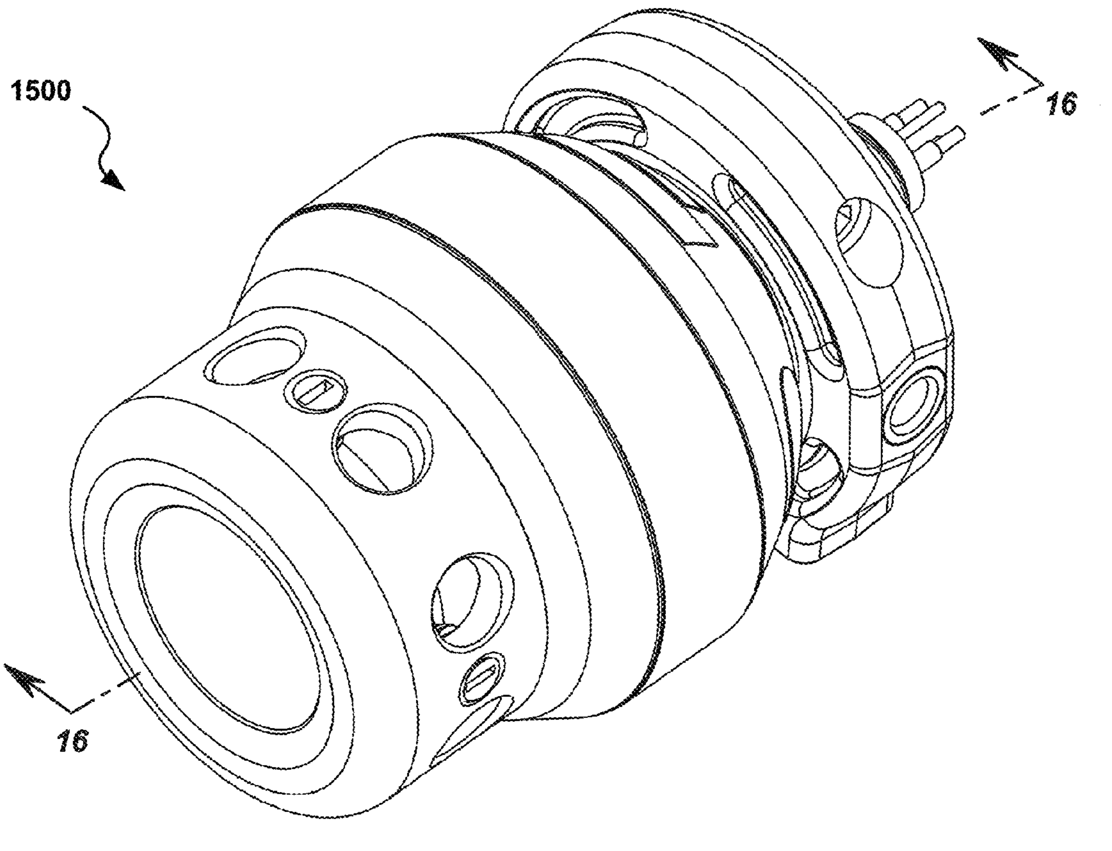
FIGS. 15-31 illustrate details of various embodiments of lighting devices that include sequestering agent/browning agent destroyers and/or graphite materials.
Figure 16:
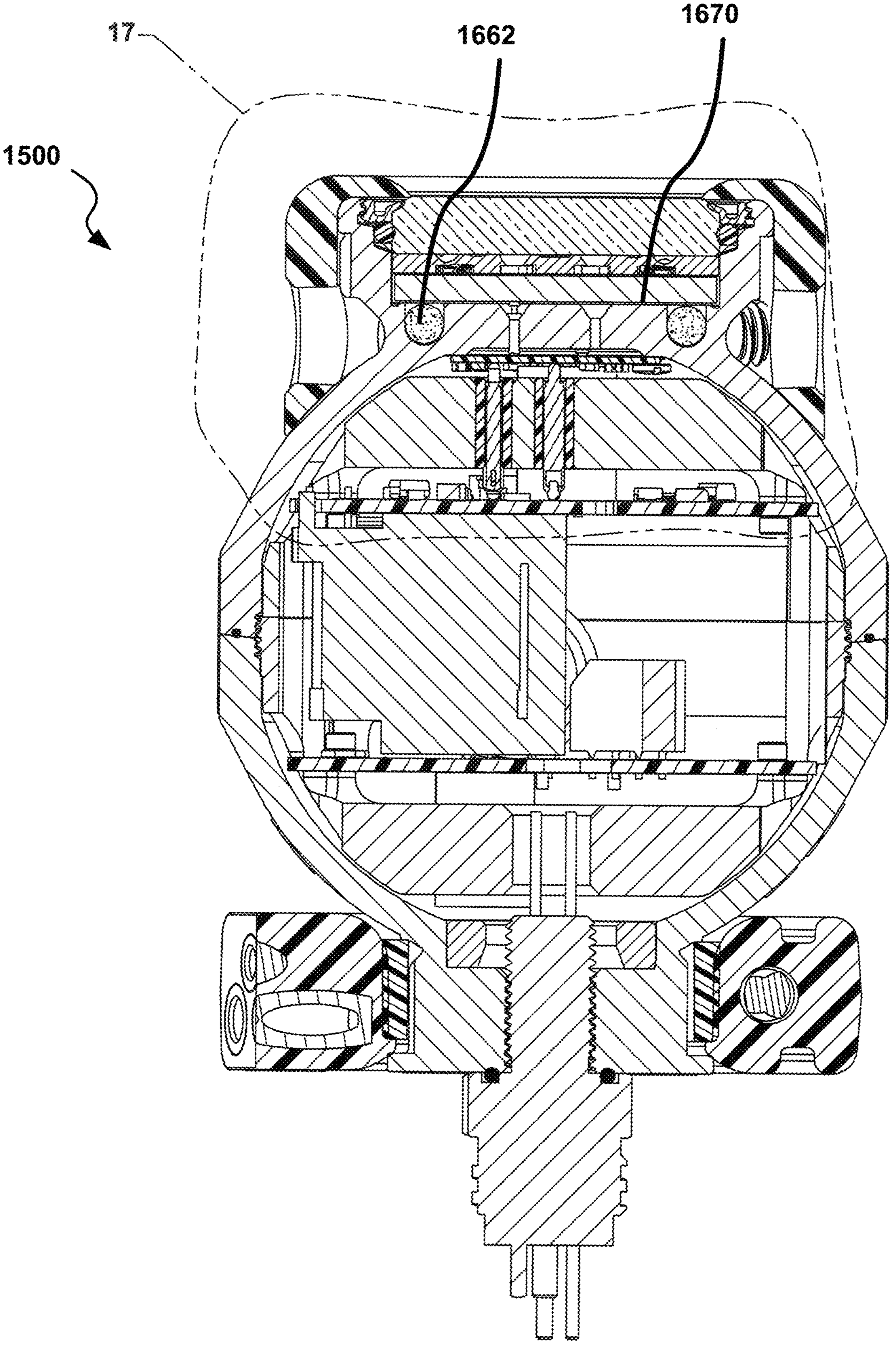
Figure 17:
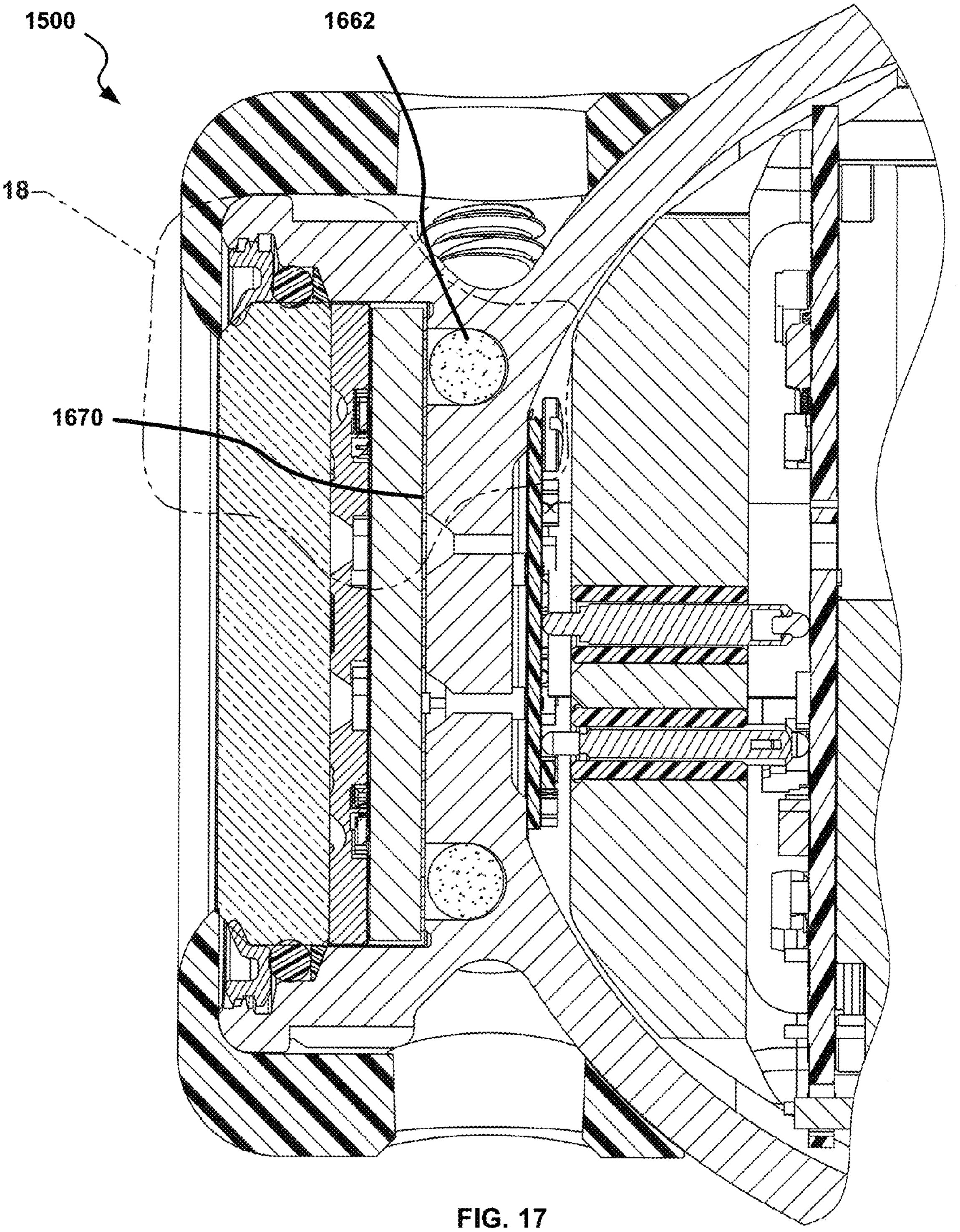
Figure 18:
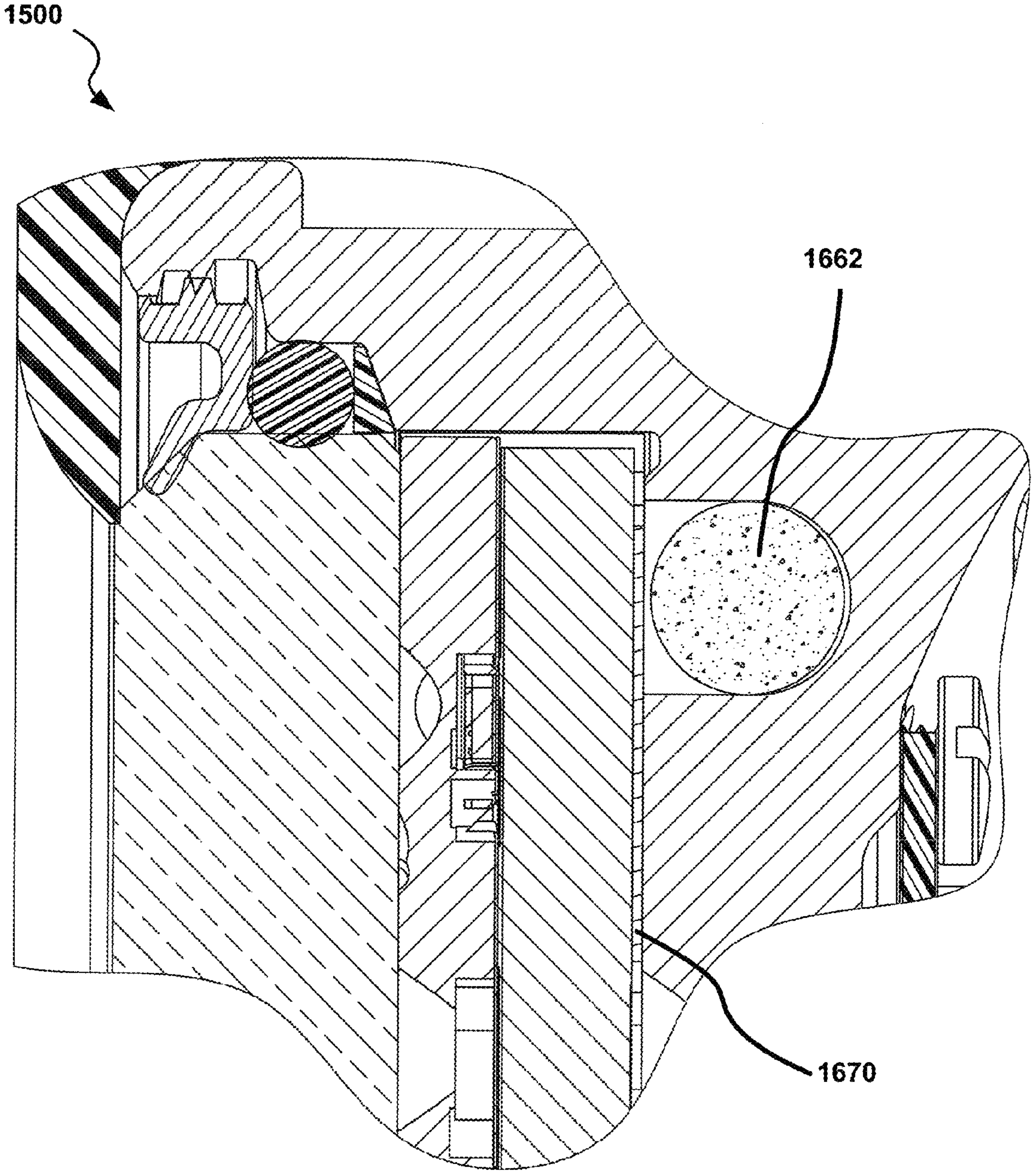

FIG. 15 illustrates details of another embodiment of a lighting device 1500 which may include graphite materials and/or sequestering agents/browning agent destroyers internally. FIGS. 16-18 show additional details of embodiment 1500. For example, device 1500 may include sequestering agents/browning agent destroyers 1662 which may be positioned in the device 1500 as shown. Graphite materials 1670, such as a PGS sheet or other graphite materials, may also be included to facilitate heat transfer and/or seal volumes of the lighting device.

Figure 19:
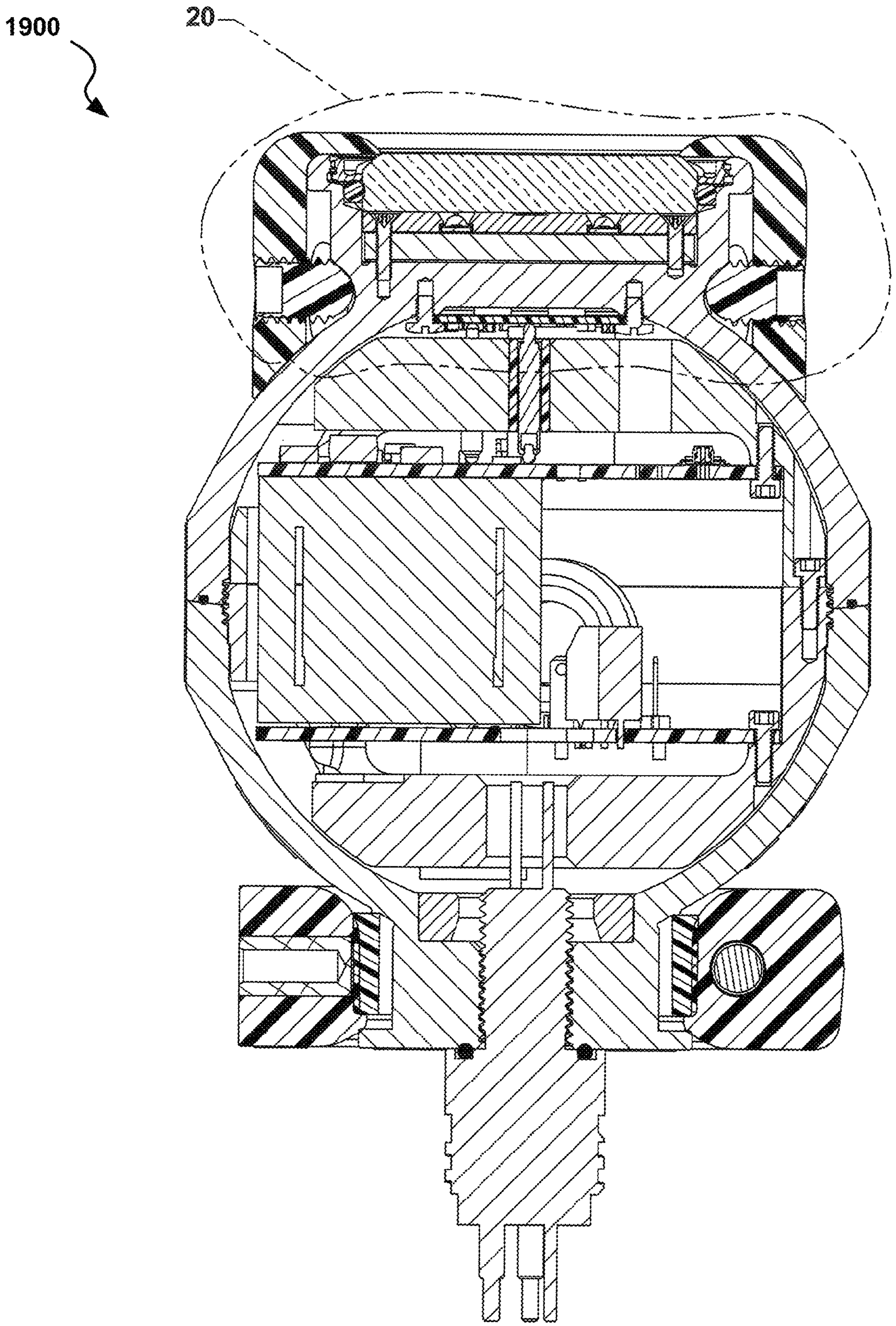
Figure 20:
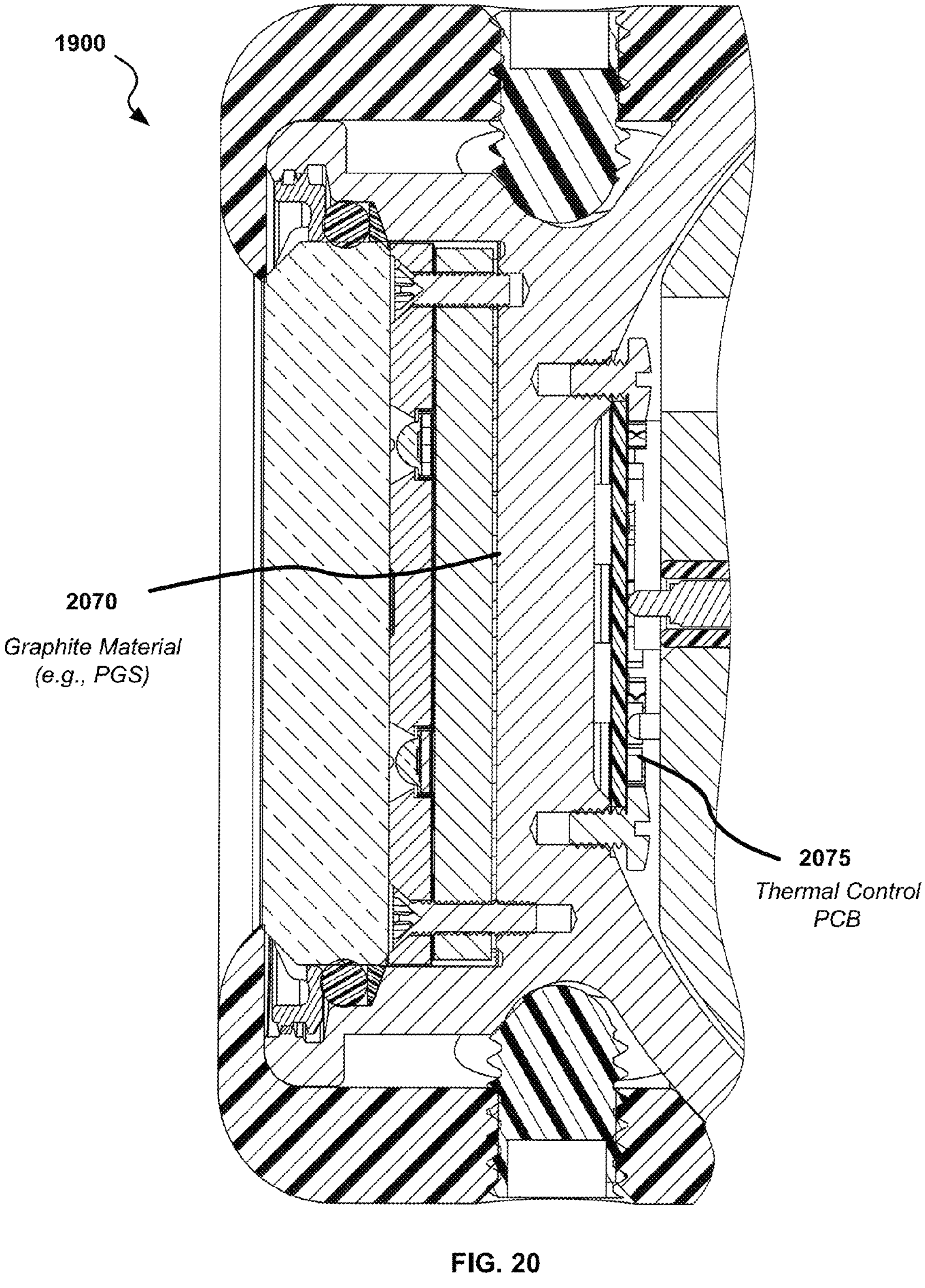

FIGS. 19 & 20 illustrate details of another embodiment 1900 of a lighting device and associated graphite materials 2070 and a thermal control PCB 2075.

Figure 21:
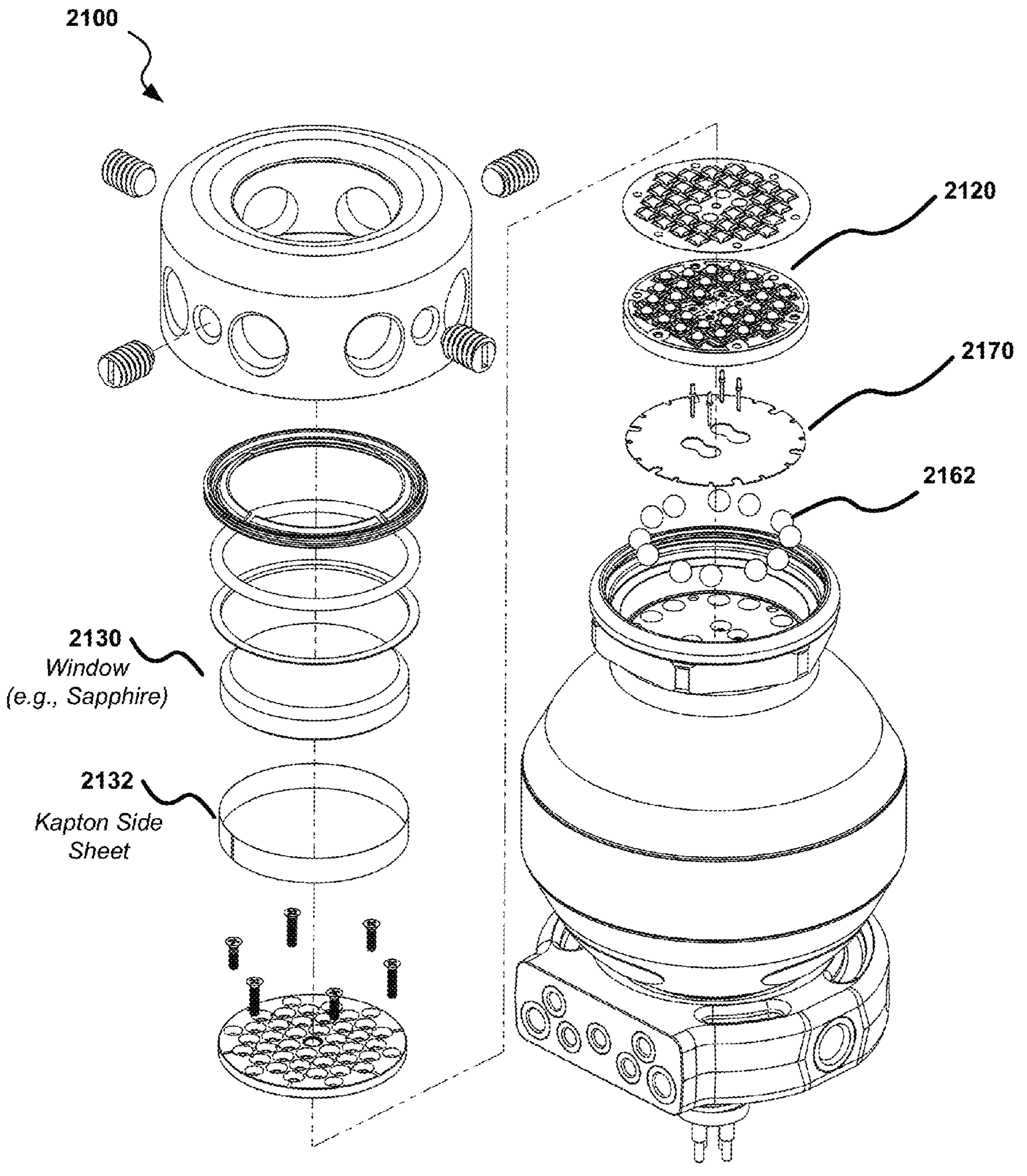
Figure 22:
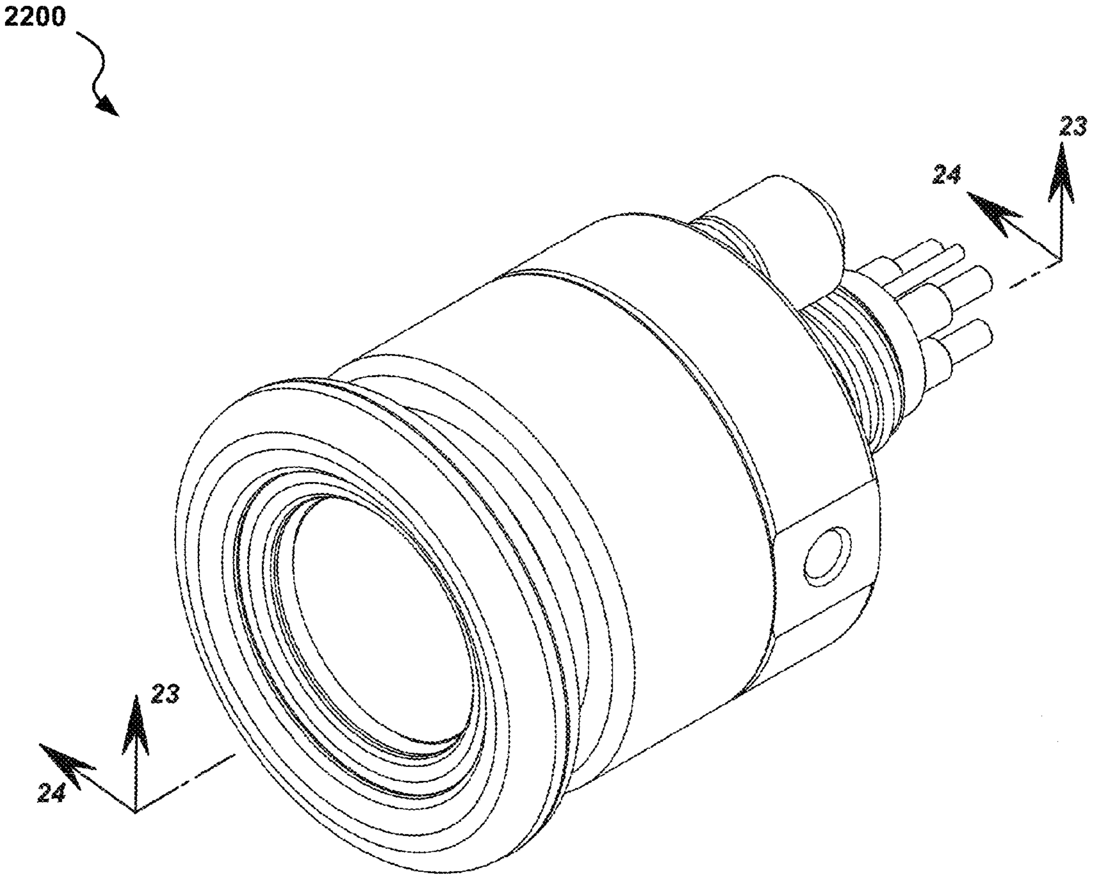
Figure 23:
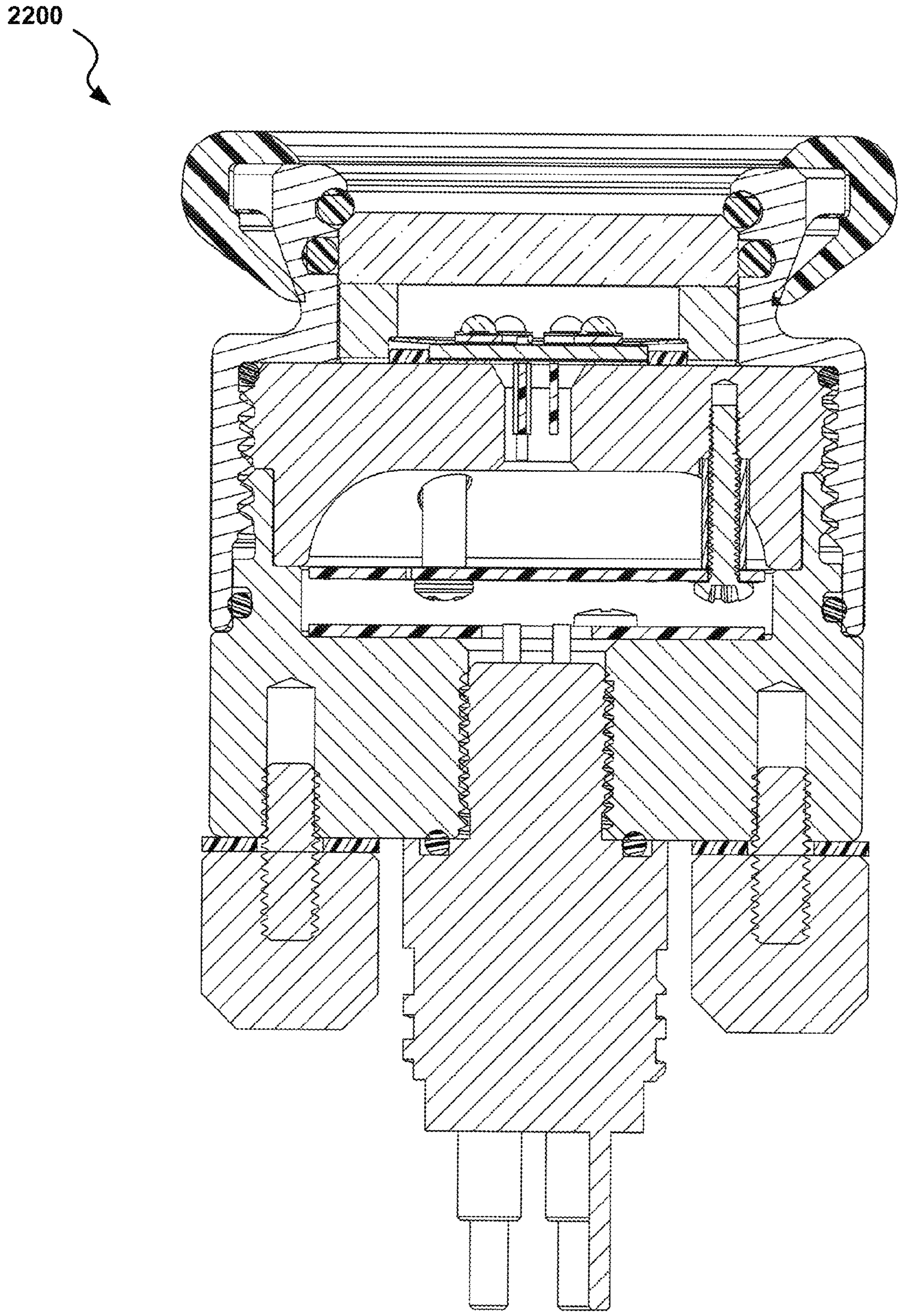

FIG. 21 illustrates an exploded view of an embodiment 2100 of a lighting device. As shown in FIG. 21, lighting device 2100 may include a window 2130, which may be a sapphire window, along with mechanical and structural elements and body elements, which may be assembled as shown. A kapton side sheet 2132 may be used in the window assembly as shown. Internally, sequestering agents/browning agent destroyers 2162 may be disposed in the body. An LED array 2120 may be mounted on a circuit element and may have a graphite material 2170, such as a PGS material, in contact with the circuit element and body, such as is shown.

FIGS. 22-25 illustrates details of embodiments 2200, 2400, & 2500 of a lighting devices which may internally include sequestering agents/browning agent destroyers and/or graphite materials for heat transfer and/or internal volume sealing.

Figure 26:
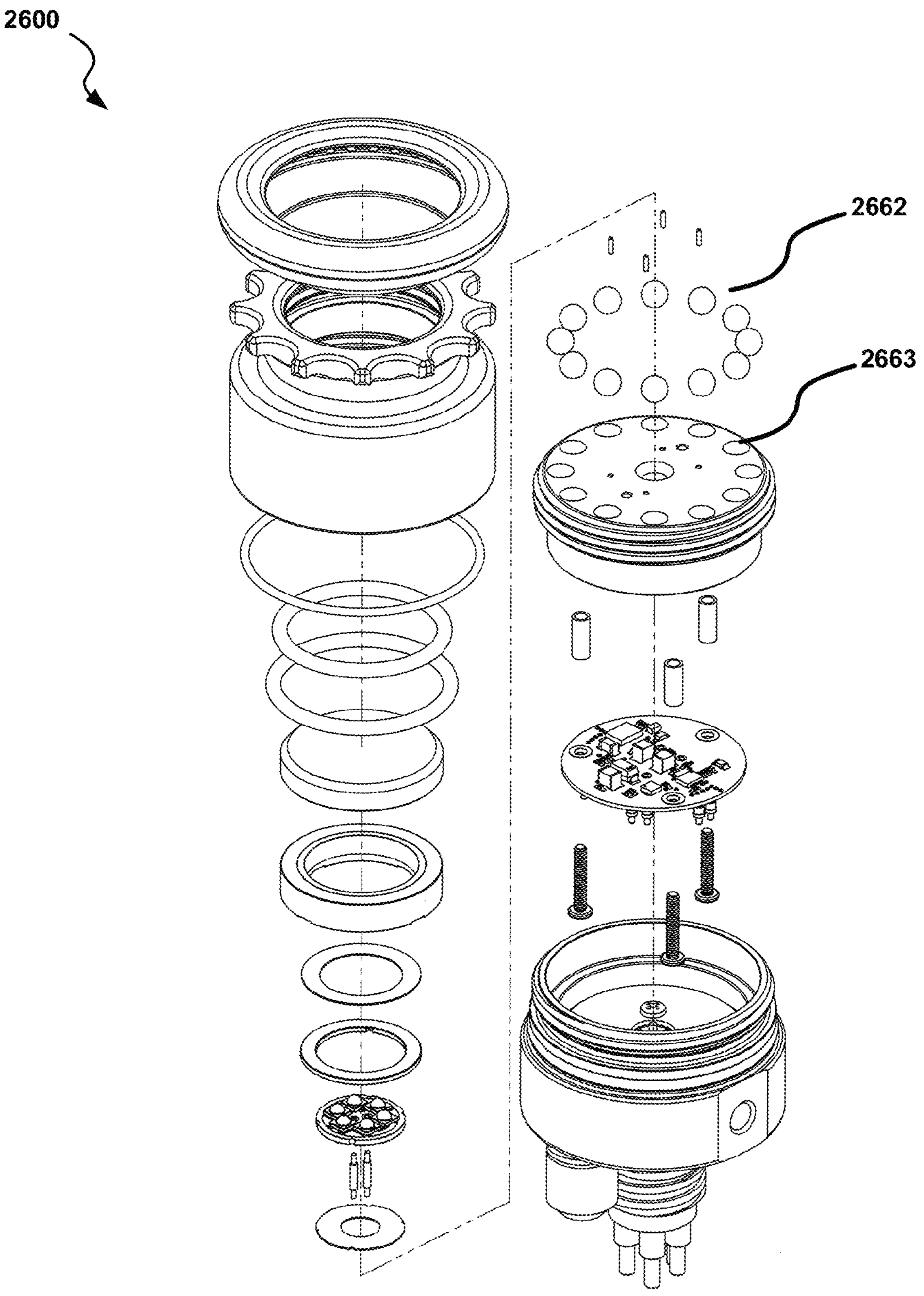

FIG. 26 illustrates exploded views of details of an embodiment 2600 of a lighting device that may include sequestering agents/browning agent destroyers 2662, which may be disposed in cavities 2663 as shown.

Figure 27:
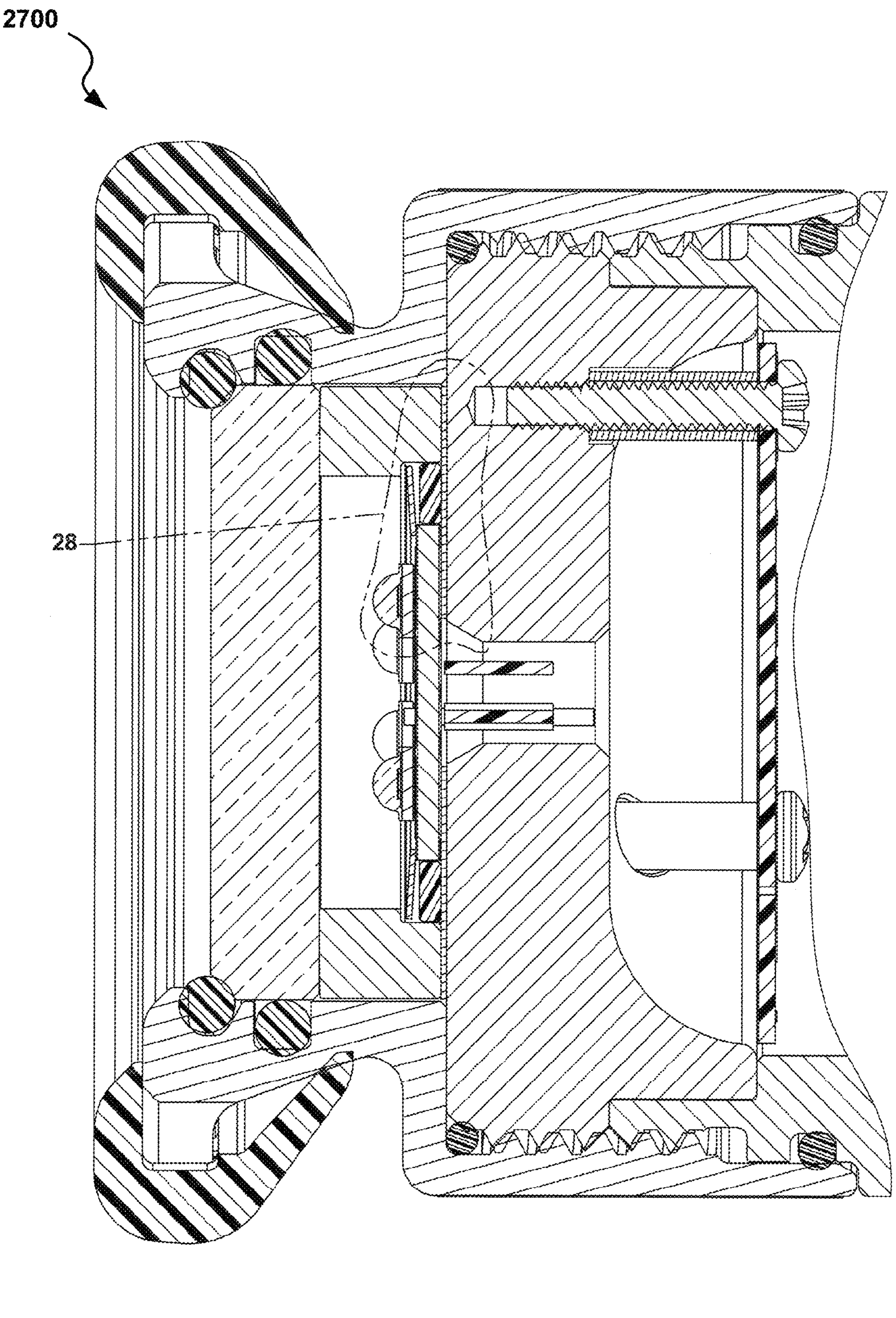
Figure 28:
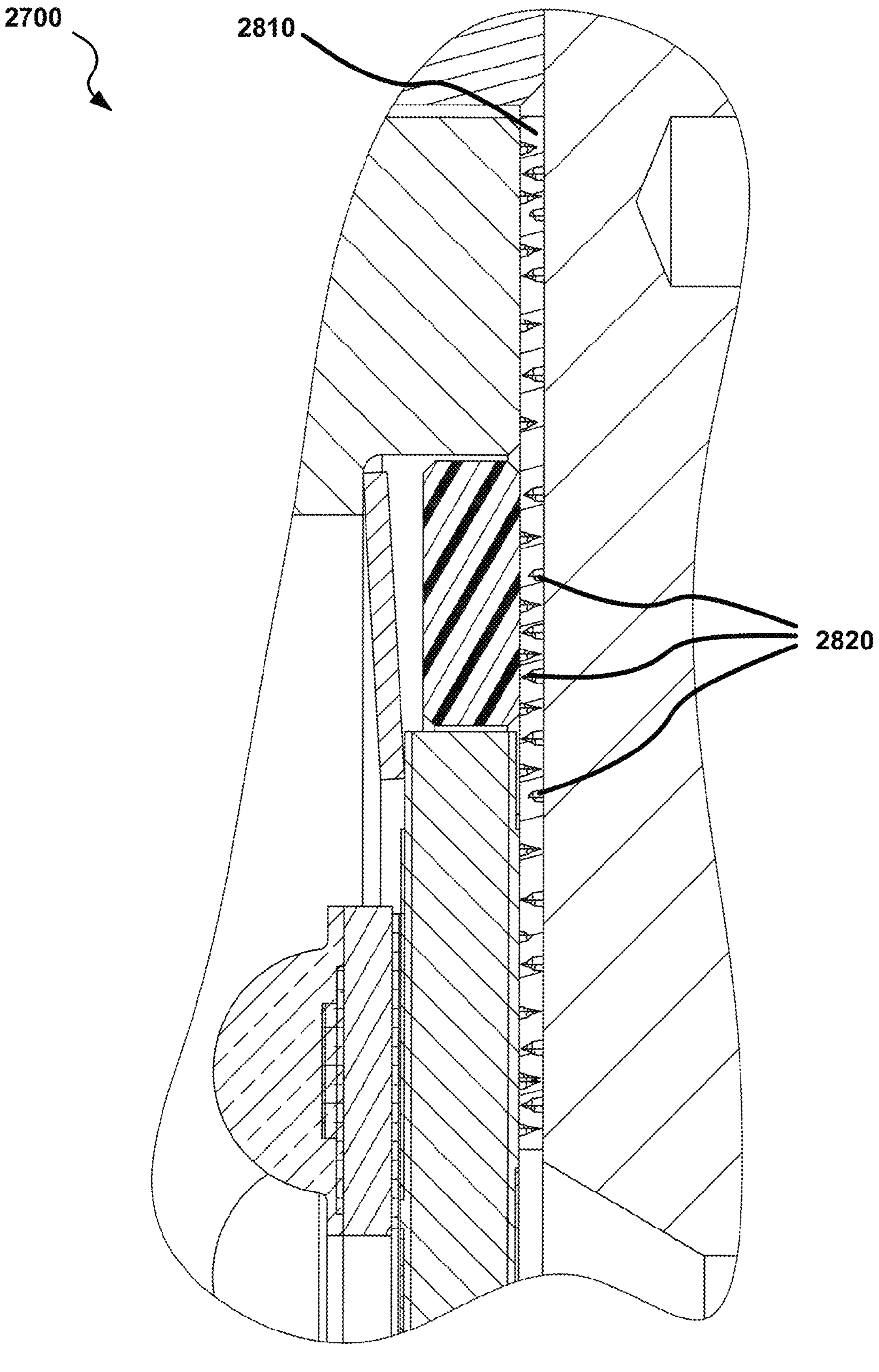

FIGS. 27 & 28 illustrate additional details of a lighting device embodiment 2700 which may internally include sequestering agents/browning agent destroyers and/or graphite materials. As shown in FIG. 28, embodiment 2700 may further include heat transfer spikes or particles 2820, such as diamonds or other conductive materials, which may be embedded in a graphite sheet 2810 for enhancing heat transfer. Further examples are described subsequently with respect to FIGS. 34 and 35.

Figure 29:
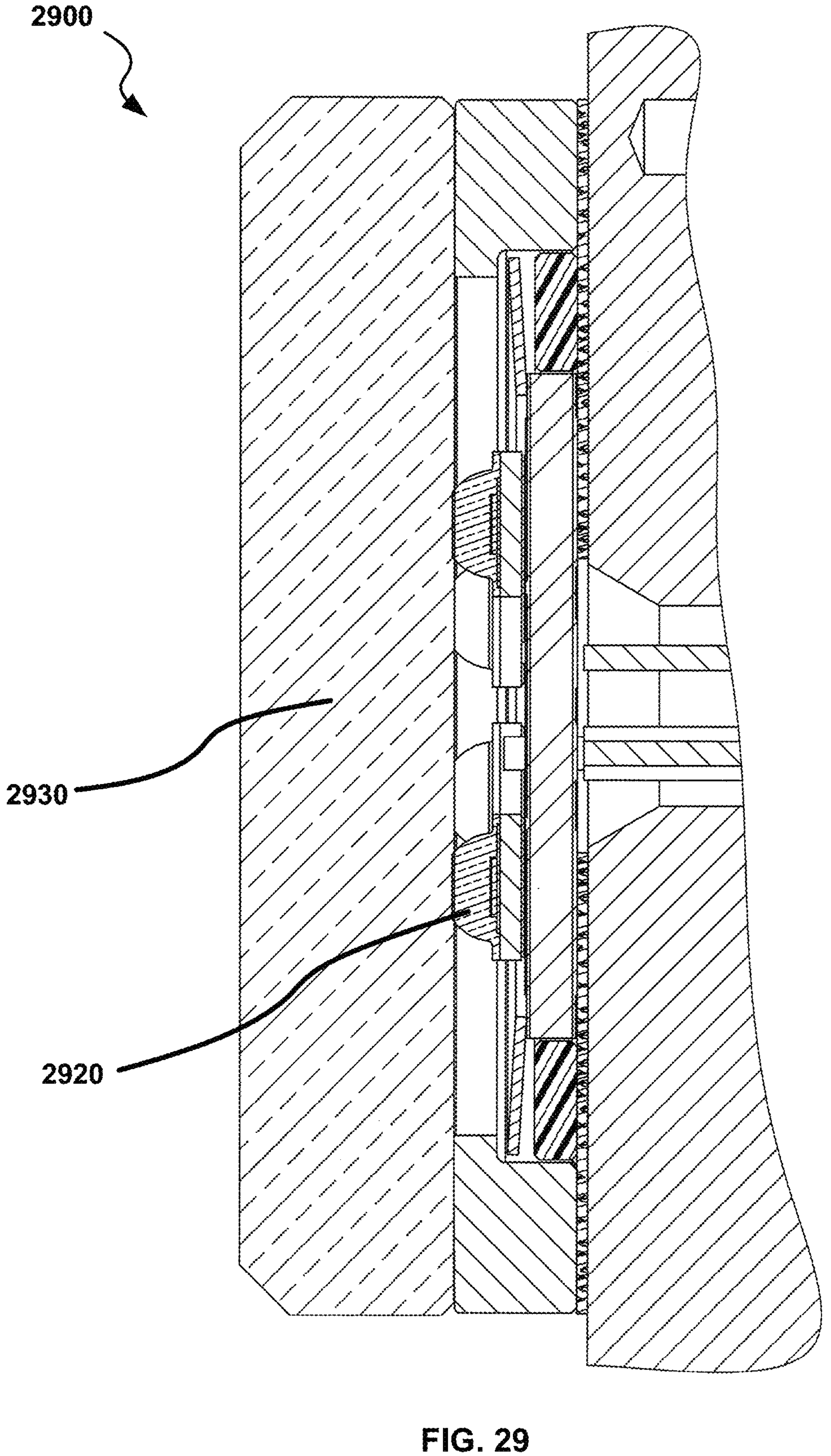

FIG. 29 illustrates additional details of a lighting device embodiment 2900 wherein an optically transparent window 2930 is configured to be in contact with a flat top surface of LED elements 2920, such as silicone LED domes, such as described previously herein.

Figure 30:
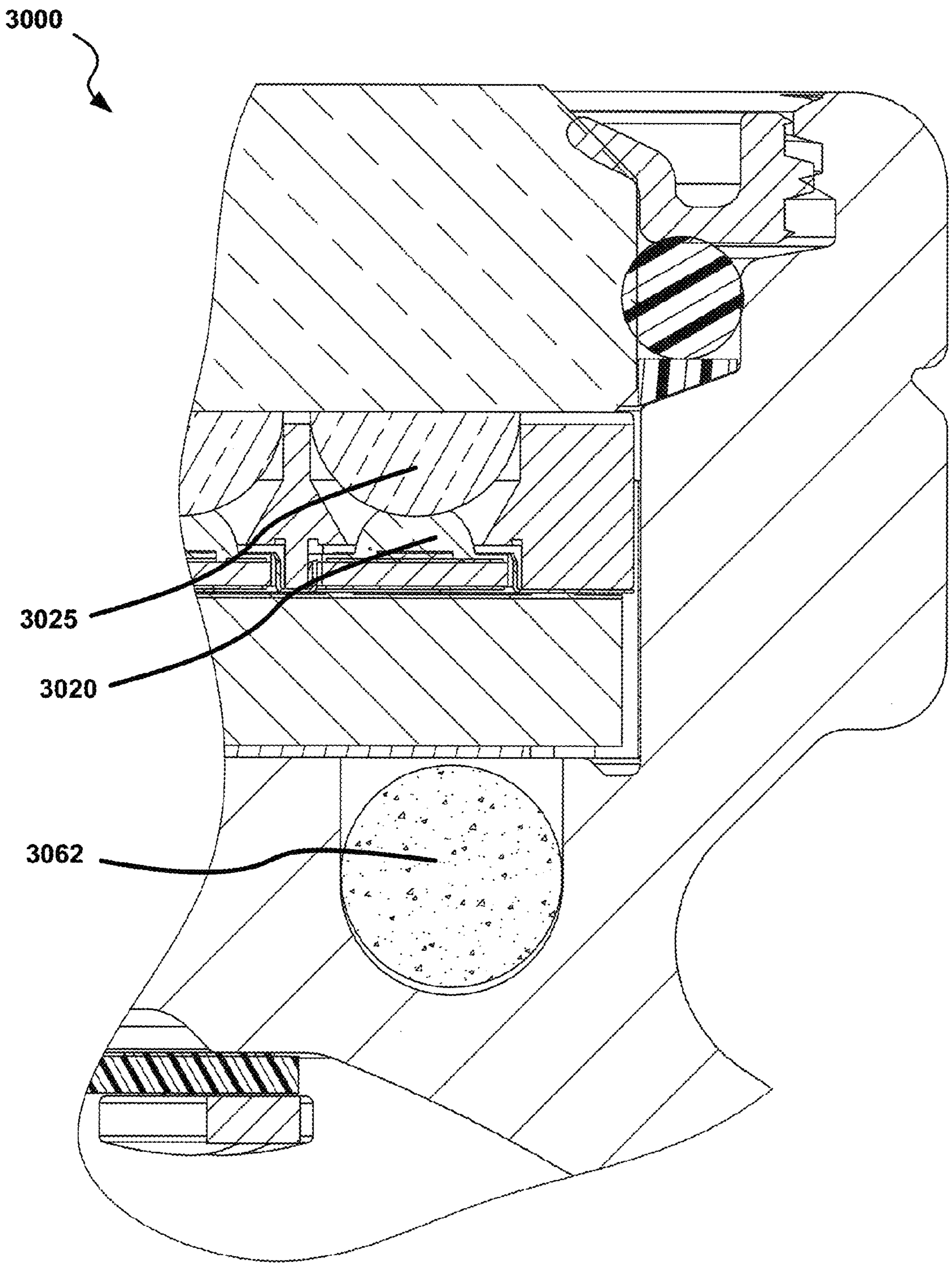
Figure 31:
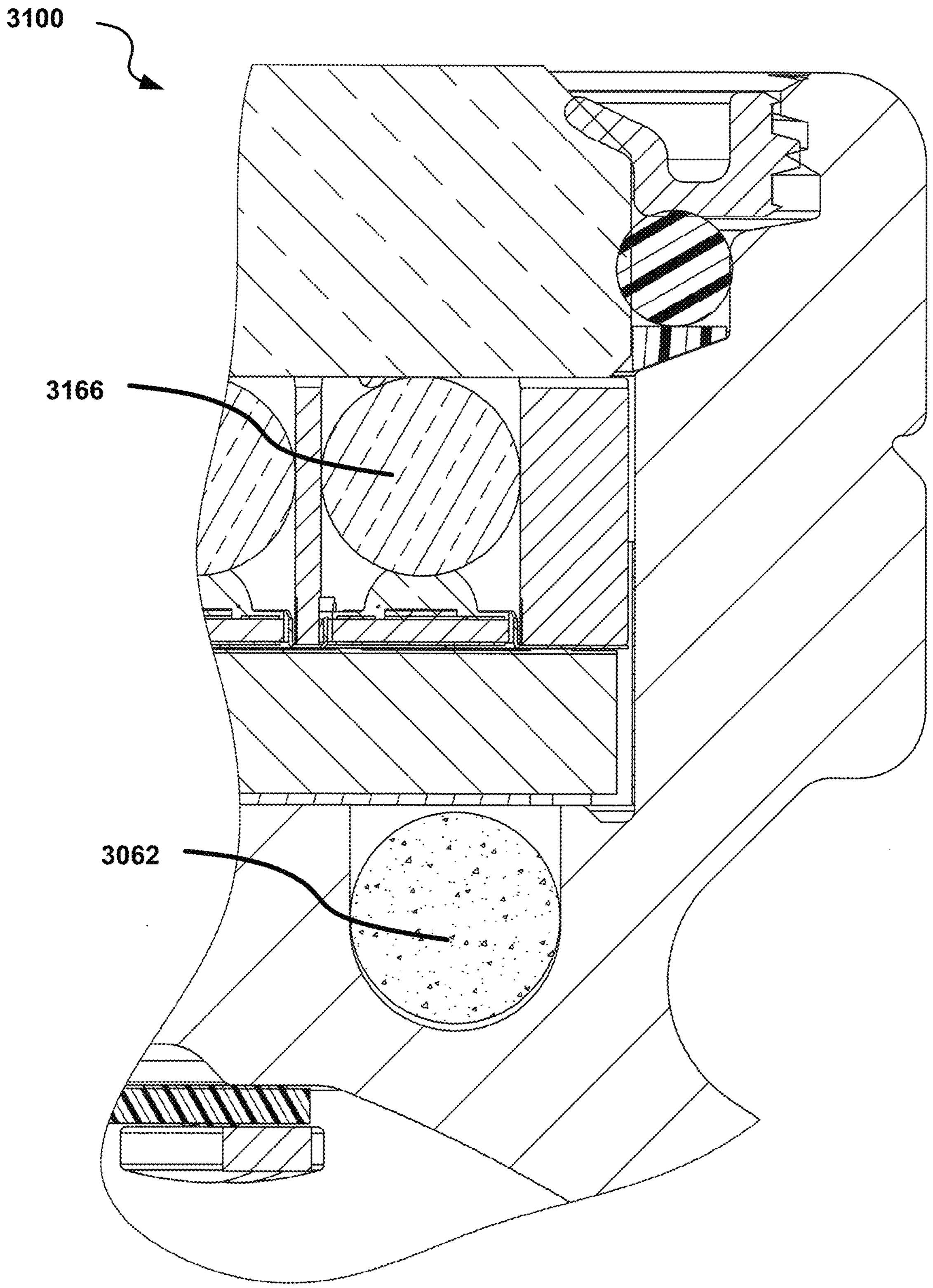

FIGS. 30 & 31 illustrate details of embodiments 3000 & 3100 of lighting devices include rounded elements, such as hemisphere 3025, in contact with a dome of LED 3020 to facilitate optical output improvement and/or reduce browning such as described previously herein. FIG. 31 illustrates a sphere 3166 that may be similarly configured to aid in light output and/or browning reduction. Embodiments 3000 & 3100 may include a sequestering agent/browning agent destroyer 3062 disposed internally in a cavity as shown as well as graphite materials such as PGS (not shown) to aid in sealing and/or heat transfer.

Figure 32A:
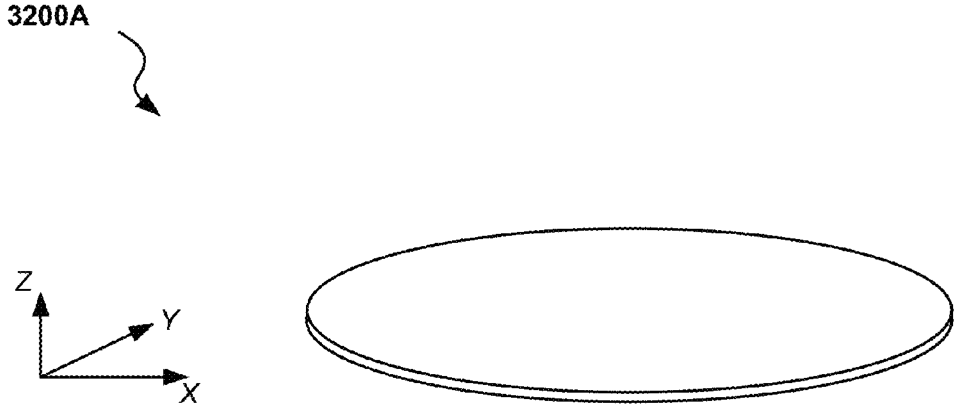
FIGS. 32A and 32B illustrate details of embodiments of graphite materials in PGS form along with associated thermal conductivity axes.
Figure 32B:
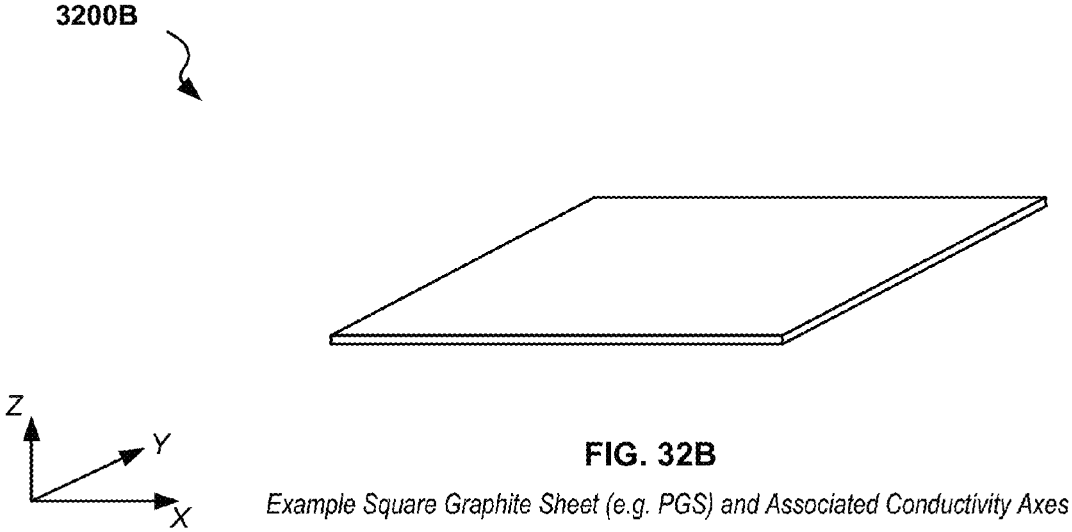

FIGS. 32A & 32B illustrate details of corresponding embodiments 3200A and 3200B of graphite materials in the form of pyrolitic graphite sheets (PGSs). In a typical graphite sheet material, heat conductivity is asymmetric due to atomic structure. Consequently, heat transfer may be larger, and, in some cases, substantially larger (e.g., on the order of 10X or more) in certain axes. For example, in the embodiments shown in FIGS. 32A & 32B, heat conduction may be greater in the X-Y plane than in the Z axis. Consequently, if the PGS is used as a sealing gasket, such as described previously herein, heat conduction between mating surfaces may be less than heat conduction across the gasket. In order to improve heat conduction, the PGS material and/or associated mating surfaces may be modified to improve Z-axis heat conduction.

Figure 33:
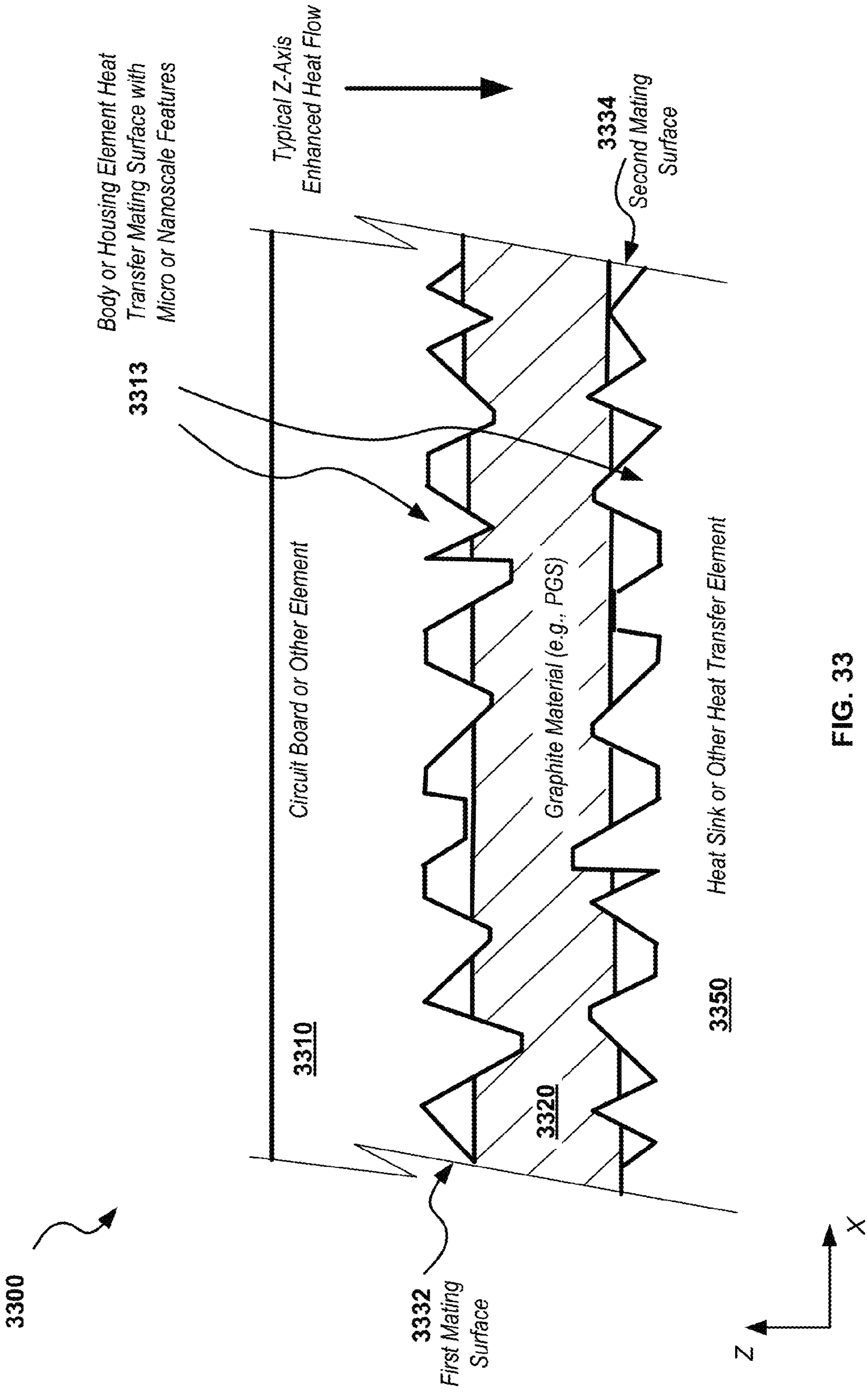
FIG. 33 illustrates details of an embodiment of a sealing and/or heat transfer junction between elements of a lighting element where mating surfaces include micromachined and/or nanostructured features to aid in heat conduction.

One example of such a modification is shown in FIG. 33, which illustrates details of an embodiment 3300 of a heat conduction interface between two elements of a lighting device. The elements may be, for example, a circuit board such as an MCPCB, or other component, and an element of the body of the lighting device or other heat transfer element. For example, a PGS 3320 may be positioned between a circuit board element 3310 and a heat sink or other heat transfer surface of the device body 3350. This configuration results in two mating surfaces, 3332, and 3334, in contact with the graphite material 3320. In order to improve heat conduction in the Z-axis, such as heat conduction away from the MCPCB to dissipate heat generated by the LEDs, the first 3332 and/or second 3334 mating surfaces may be configured with micro or nano-scale features 3313 to contact and/or penetrate portions of the graphite sheet 3320 to aid in Z-axis heat conduction. For example, sharp features as shown may be micro-machined, nanofabricated, or otherwise formed into one or both mating surfaces to partially or, in some cases, fully penetrate the PGS 3320. In general, in order to provide sealing, it may be undesirable to fully penetrate the PGS 3320, however, in some cases the surface may be configured to allow full penetration, particularly if sealing is not necessary in the particular surface mating area(s) and/or if penetration can be done such that some sealing is maintained.

Figure 34:
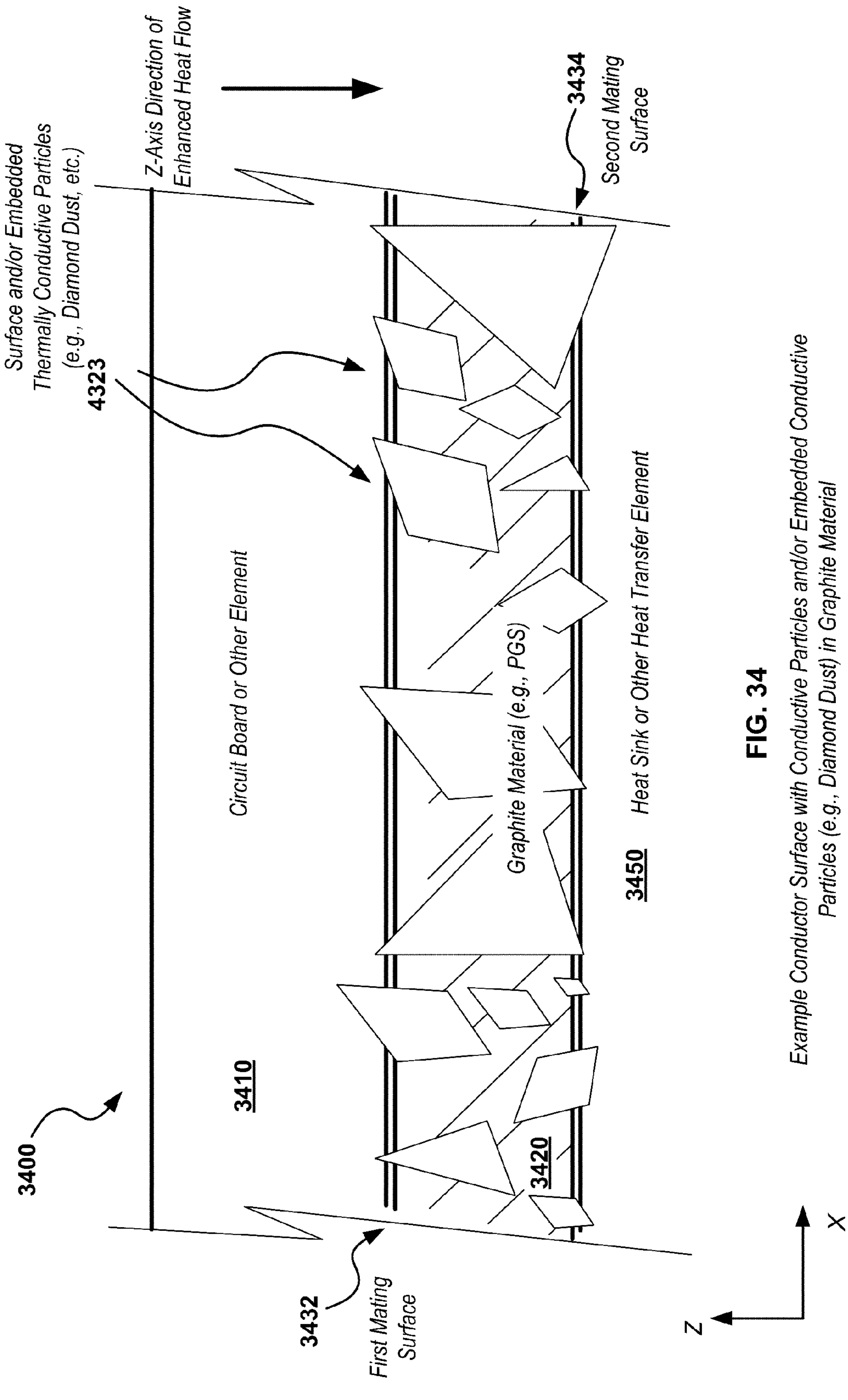
FIG. 34 illustrates details of an embodiment of a sealing and/or heat transfer junction between elements of a lighting element where a graphite material includes surface and/or embedded conductive particles, such as diamond dust, to aid in heat conduction.

FIG. 34 illustrates details of another embodiment of a modification 3400 to aid in heat conduction. In this configuration, thermally conductive spikes or particles 4323, such as, for example, diamond dust or other heat conductive spikes or particles, may be disposed on the mating surfaces 3432, 3434, and/or embedded in the graphite material and/or the mated elements (e.g., the circuit board 3410 and heat sink 3450) to aid in Z-axis heat conduction. In this configuration, different particle sizes may be used depending on the associated parameters such as mating surface preparation, graphite material type and/or thickness, or other related parameters. For example, in some embodiments the conductive particles may be sized on the order of the thickness of the graphite sheet or slightly larger. In other embodiments, smaller particle sizes, such as those shown in FIG. 35, may be used alternately or in addition.

Figure 35:
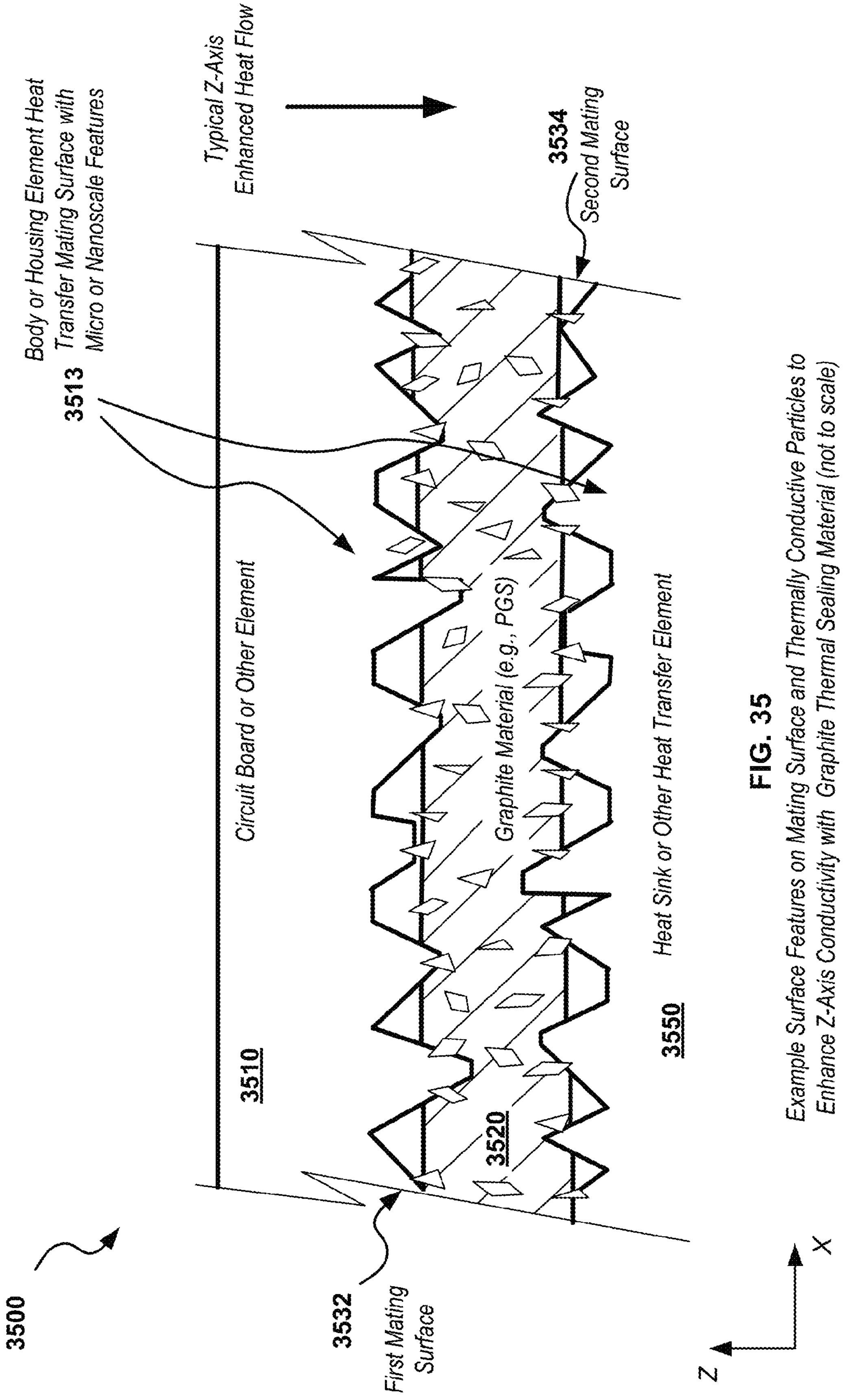
FIG. 35 illustrates details of one embodiment of a sealing and/or heat transfer junction between elements of a lighting element where a graphite material includes surface and/or embedded thermally conductive particles, such as diamond dust, and where mating surfaces include micromachined and/or nanostructured features to aid in heat conduction.

FIG. 35 illustrates another embodiment of a modification 3500 to aid in heat conduction. This configuration may be viewed as a combination of the configurations illustrated in FIGS. 33 and 34 where mating surfaces 3532 and/or 3534 of elements 3510 and 3550 respectively are configured to aid Z-axis heat conduction along with particles 3513 on the surfaces and/or within PGS 3520. Although the particle 3513 sizes shown in FIG. 35 are smaller than those of FIG. 34, in some embodiments they may be same size and/or larger, and/or in combinations of sizes.

Figure 36:
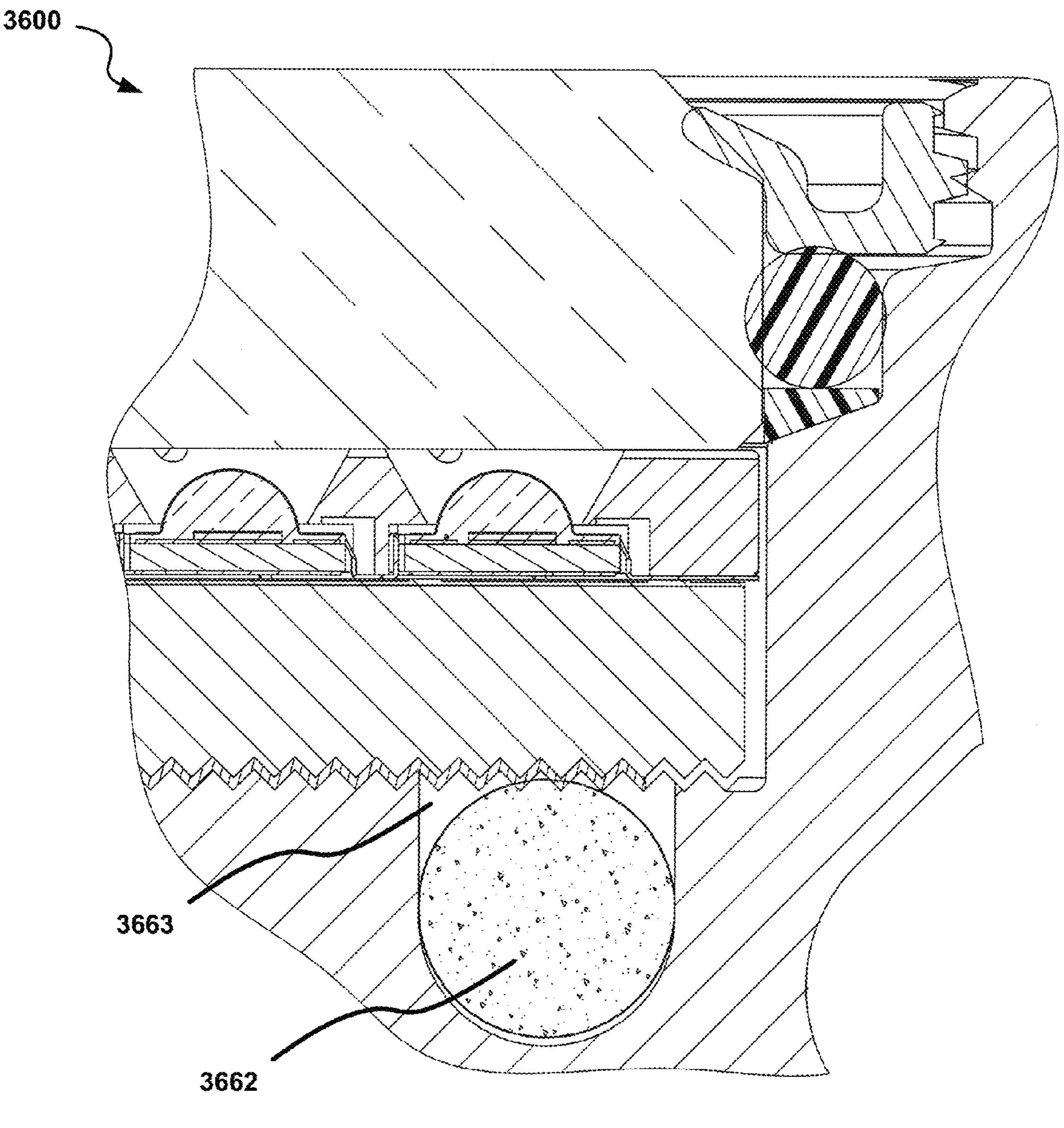
FIGS. 36-39 illustrate details of example embodiments of lighting devices including surface mating configurations and/or graphite materials for increasing heat conductivity in certain dimensional axes.

FIG. 36 illustrates details of another embodiment 3600 of a lighting device that may include graphite materials and/or sequestering agents/browning agent destroyers 3662, which may be disposed in a formed cavity 3663 as shown. Mating surfaces may be roughened or patterned such as through micromachining as shown to further aid in heat transfer.

Figure 37:
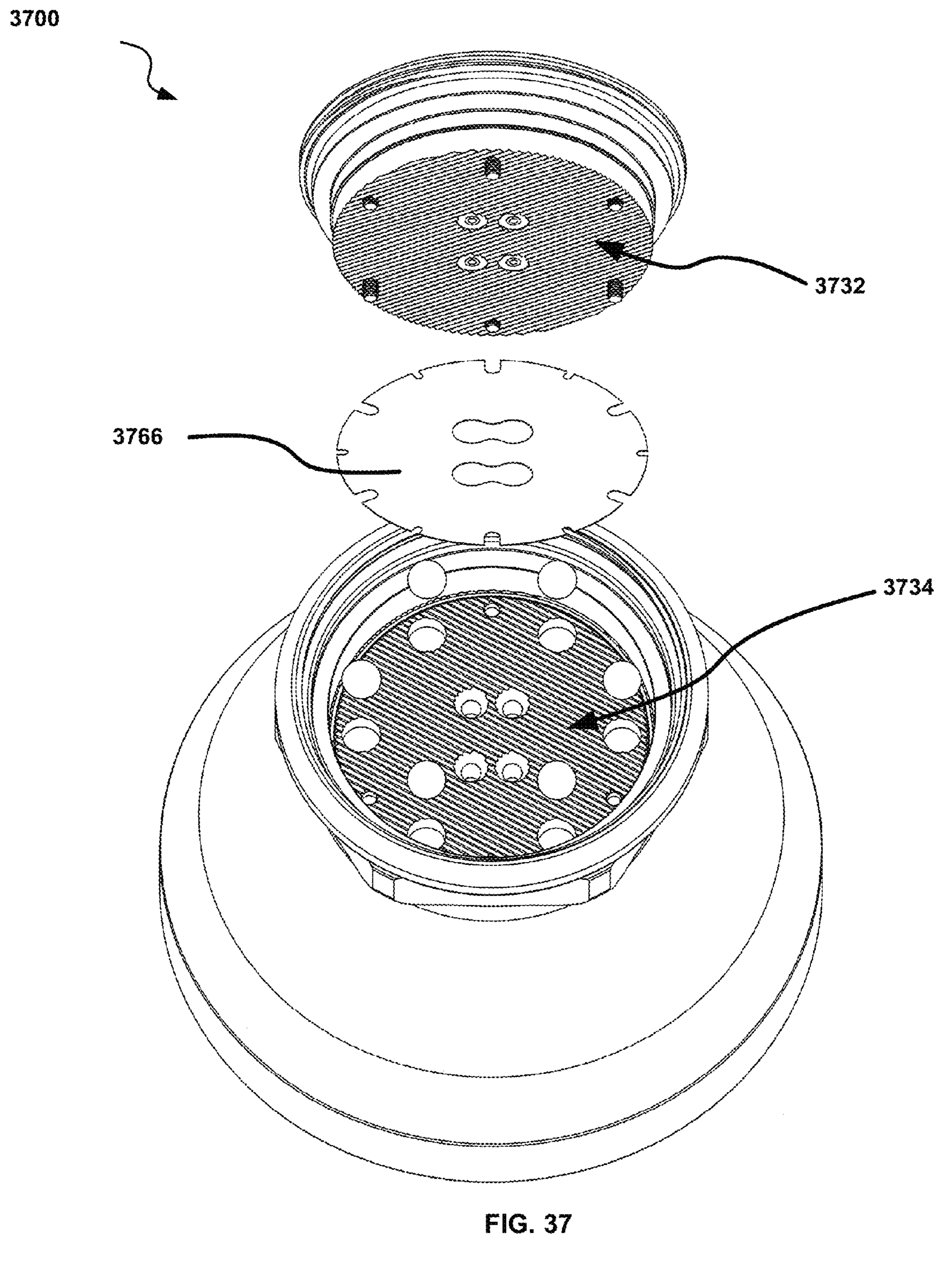
Figure 38:
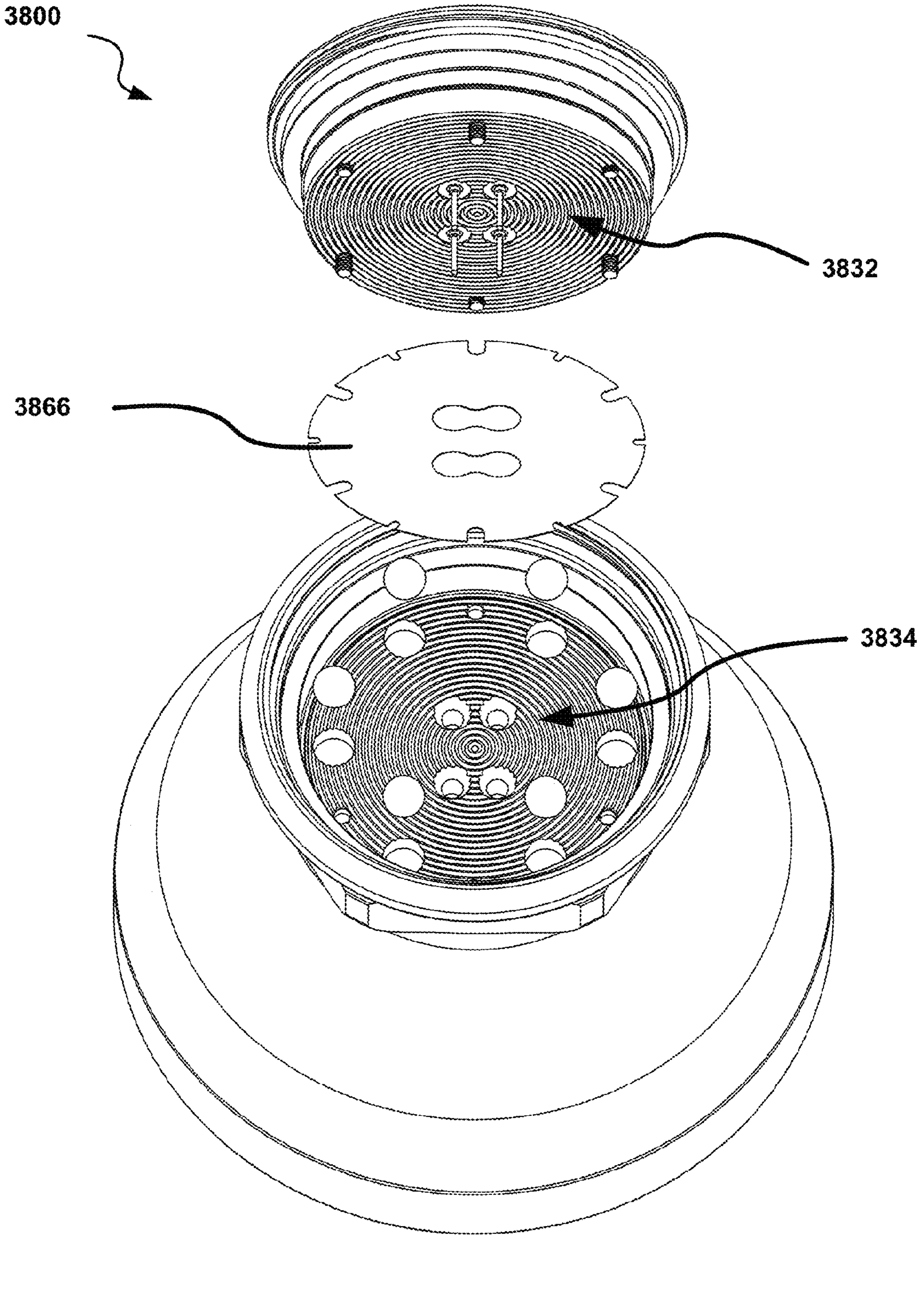
Figure 39:
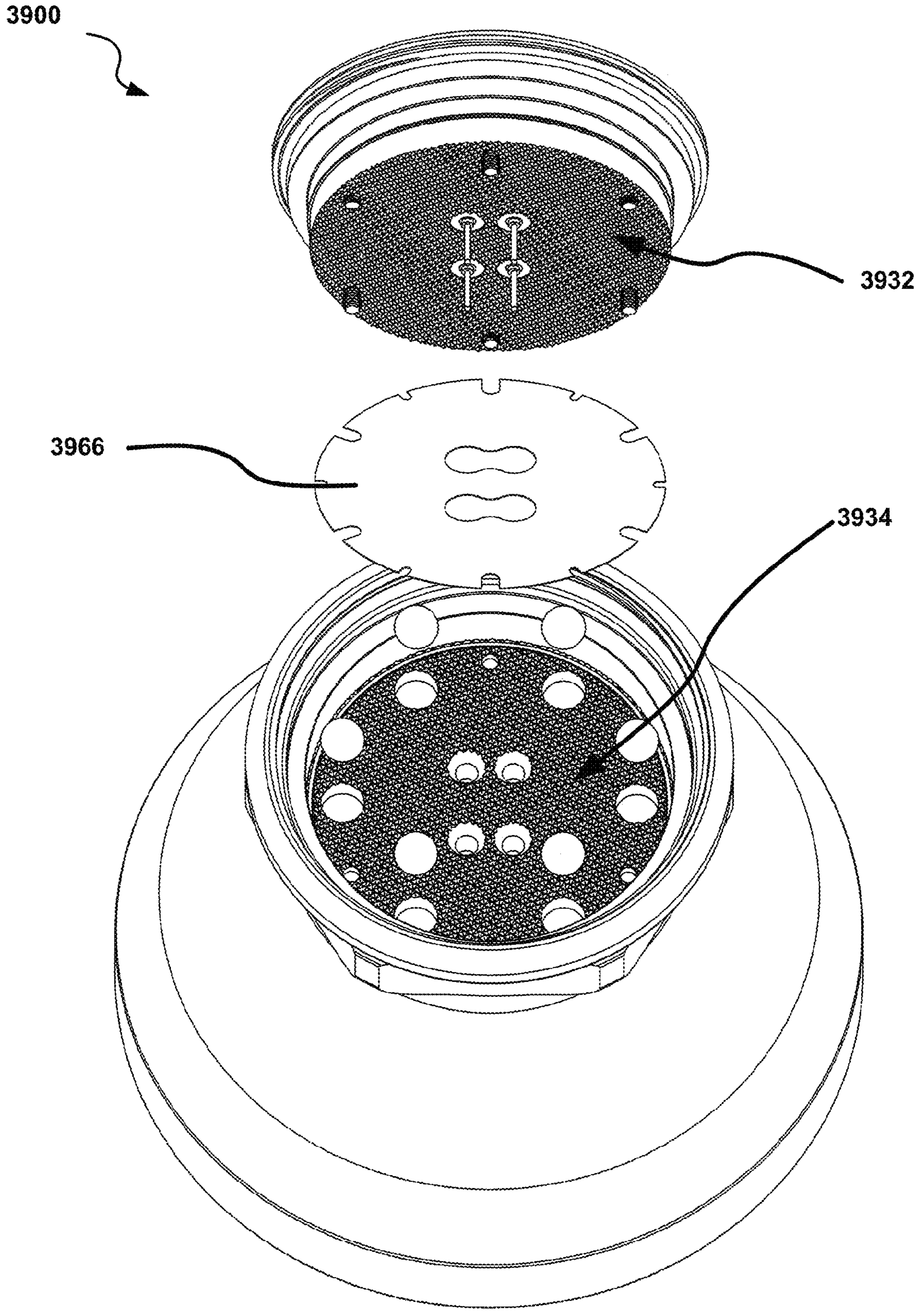

FIGS. 37-39 illustrates details of embodiment 3700-3900 of lighting devices that includes micromachined surfaces to aid in heat transfer, such as was described previously with respect to FIG. 33. In FIG. 37, the micromachined surfaces 3732 and 3734 include straight line ruled features to allow interlocking of the surfaces with a graphite material 3766, which may be a PGS as described previously herein. Surfaces 3832 and 3834 of FIG. 38 include ring line features for interlocking with graphite material 3866, and surfaces 3932 and 3934 of FIG. 39 include pyramid style features for interlocking with graphite material 3966. The features illustrated may include points or tips, which may have, for example, tips of 90 degrees or less. The features may be configured to interlock with each other and/or with the graphite materials.

In some embodiments, graphite materials may be processed prior to or during manufacture to aid in performance. For example, a graphite sheet, such as a sheet of PGS material, may be pre-compressed before or during installation into a lighting fixture to improve heat transfer and/or sealing performance. The pre-compression may be done to reduce the size to approximately ⅓ or ¼ of the initial size in an exemplary embodiment to remove all or substantially all porosity and/or trapped air or other gases. In some lighting devices subject to high external pressure, the material may be installed and then compressed during a testing or initial operational pressurization. Alternately, or in addition, the sheets may be polished with materials such as silicone grease, etc., to aid in performance. In addition, circuit board holes, such as vias in multilayer boards or other holes or cavities, may be filled with a filler material such as grease or other materials to provide a vacuum-tight seal. This may be done to reduce transfer of contaminants between internal volumes of the light. While graphite sheets may be used, the vias or other holes may be separately sealed using materials such as hi-vac grease and the like.

In some embodiments of lighting devices of various types, a selectively permeable barrier element, such as in the form of a membrane, barrier, gasket, o-ring, or other permeable structure may be used to allow diffusion of contaminants from interior volumes of the light to the exterior of the light, such as to an external liquid or gaseous environment. For example, internal volumes in contact with electronic circuitry, such as on printed circuit boards or other substrates, or in contact with lighting elements such as LEDs, or in contact with wiring, plastics, or other materials that give off contaminants that may effect light output as described previously herein may be in contact with the selectively permeable barrier element to allow diffusion of contaminants to the exterior environment. Various configurations of housings with internal volumes and associated electronic circuitry may be configured to use a selectively permeable barrier. For example, in a basic configuration, all or most of the electronic circuitry (e.g., circuit boards and associated electronic components, lighting elements such as LEDs, wiring, and other materials that can generate contaminants may be enclosed in a single interior volume, which may be in contact with one or more selectively permeable barrier elements. Alternately, some lighting devices may include multiple internal volumes, one or more of which may include electronics or other components and one or more of the volumes may be in contact with individual selectively permeable barrier elements. Some representative examples are described subsequently below.

Figure 40A:
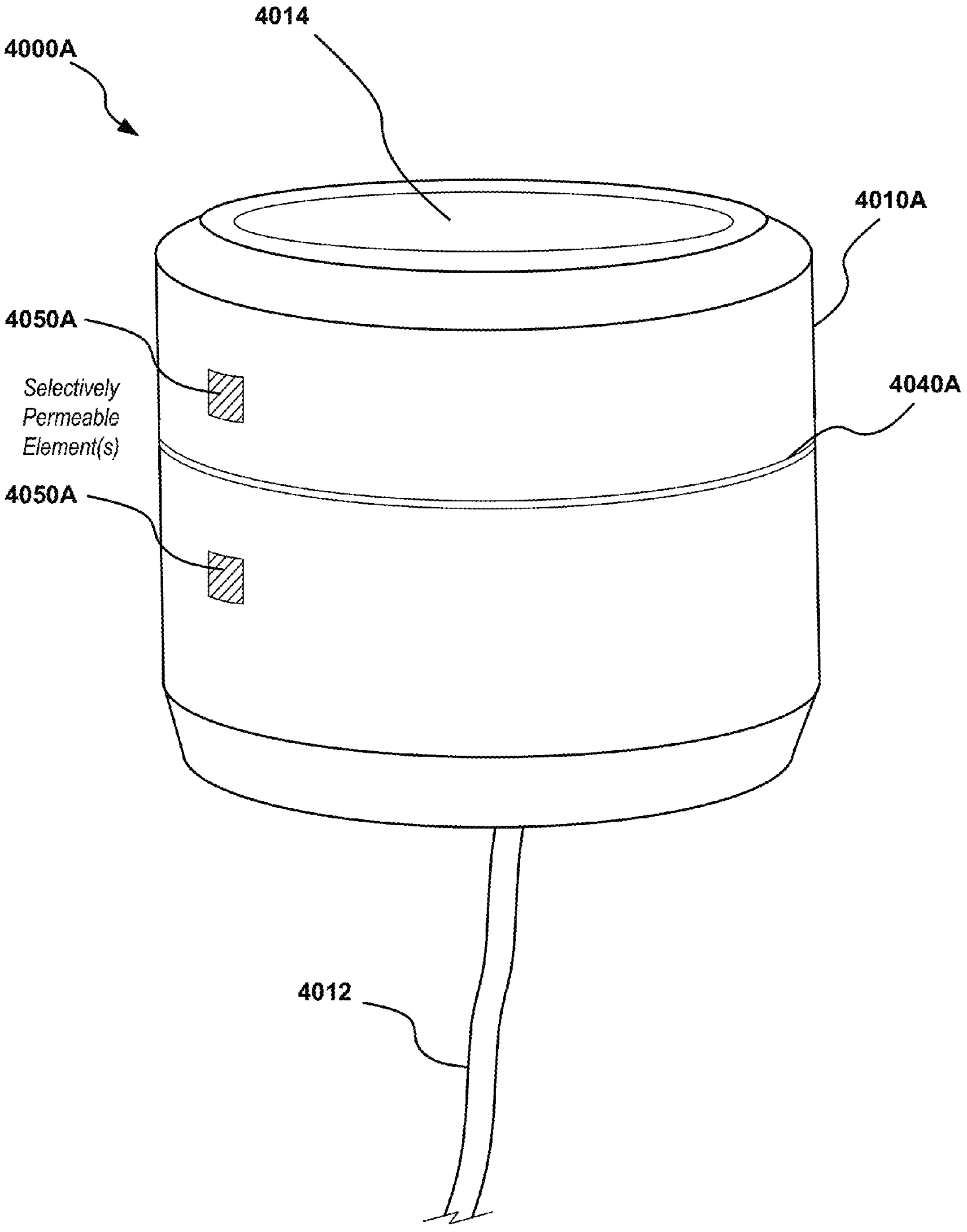
FIGS. 40A-40D illustrate details of example embodiments of lighting devices including selectively permeable barrier element.

For example, FIG. 40A illustrates an example embodiment of a lighting device embodiment 4000A that includes a selectively permeable barrier element 4050A in the form of a window or membrane. In an exemplary embodiment, the selectively permeable barrier element may comprise silicone or another selectively permeable compound or structure that allow transfer of contaminants out of the housing while restricting entry of liquid water or other liquids or solids. For example, silicone or fabrics such as Gore-Tex or other materials such as acoustic vents may be used in various embodiments. In applications where there are not significant pressure differences between the interior and exterior of the lighting device, such as in air above the surface, the selectively permeable material may be configured in a movable or flexible fashion. Alternately, in applications subject to pressure differences, such as for underwater lighting where pressure differences may be substantial, the selectively permeable material may be rigid or semirigid, such as in the form of a silicone gasket, window, membrane, dome, o-ring, and the like.

As is known in the art, certain materials, such as silicones, are generally considered undesirable for use in applications where liquid water sealing is needed, such as in lights subject to water exposure, and in particular in underwater lighting applications, due to its permeability. This is described in, for example, a Rockwell International paper entitled "Rate of Moisture Permeation Into Elastomer Sealed Electronic Boxes," John H. Kolyer, Rockwell International Corporation, June 1986, Advanced Materials, Manufacturing, and Testing Information Analysis Center. These applications normally use materials such as Viton™, a well known brand of synthetic rubber and fluoropolymer elastomer (trademark registered to DuPont Performance Elastomers LLC), which is much less permeable, so as to prevent water ingress. However, this can also act to contain contaminants such as described previously herein within internal volumes. By instead using selectively permeable materials such as silicone materials, gaseous water may diffuse through membranes, o-rings, etc., however, they may also aid in allowing contaminants to diffuse out, thereby improving anti-browning performance.

As shown in FIG. 40A, lighting device 4000A includes a body or housing 4010A, which may comprise one or more pieces. For example, lighting device 4000A includes an upper and lower shell joined by a gasket, o-ring, grease, or other sealing mechanism 4040A. Housing 4010A includes a window or port 4014 allowing light generated internally by lighting elements such as LEDs to project outward into the exterior environment. One or more selectively permeable barrier elements 4050A may be disposed in various ways in or on housing 4010A. For example, as shown in FIG. 40A, two selectively permeable barrier elements 4050A may be used to allow diffusion from two internal volumes (shown in FIG. 40B). Various other configurations of sizes, shapes, positions, and the like for the selectively permeable barrier elements may be used in various other embodiments. A cable 4012 may be used to provide power and/or control signaling to the lighting device 4000A. In applications where sealing is required the cable 4012 may be insulated or sealed to the housing 4010A (not shown) to prevent ingress of water. The sealing may also be made from selectively permeable materials in some embodiments.

Figure 40B:
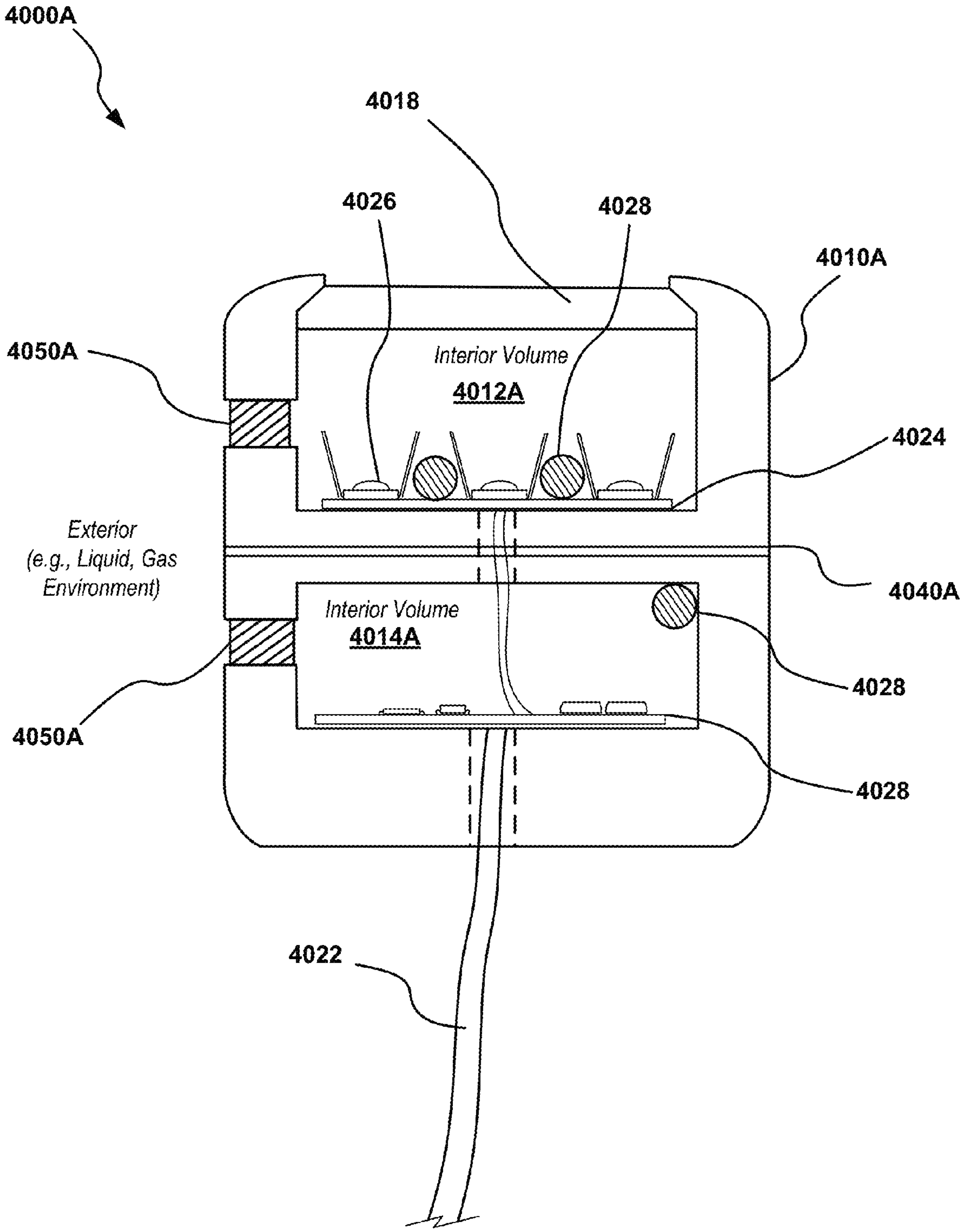

FIG. 40B illustrates additional details of lighting device embodiment 4000A in a cutaway side view. A lighting device may have one or more internal volumes defining internal cavities. For example, lighting device 4000A may have an upper interior volume 4012A and a lower interior volume 4014A. Some devices may have more or fewer volumes, and in some embodiments the volumes may be configured to be in communication so that gases or liquids can flow between them. Alternately, they may be fully or partially sealed with gaskets, o-rings, or other sealing mechanisms. In FIG. 40B, sealing mechanism 4040A may be a gasket or o-ring comprising a material such as graphite as described previously herein.

Upper interior volume 4012A may define a cavity that contains the lighting elements, such as one or more LEDs 4026 as shown. These may be mounted on a circuit board 4024 or other circuit or mounting element. In some embodiments, a sequestering agent/browning agent destroyer element 4028 may be disposed within the volume and/or in one of the components of lighting device, such as described previously herein. One or more selectively permeable barrier elements 4050A may be disposed on or in the housing, such as in the form of a side port or window as shown in FIG. 40B. Alternately, the selectively permeable element may be in the form of an o-ring, gasket, or other structure that is in contact with a portion of one or more of the interior volumes and the exterior of the lighting device. For example, if the lighting device is used underwater, the exterior will be in contact with fresh or salt water, and the selectively permeable element will be in contact with a portion of the fresh or salt water to allow outward diffusion of contaminants from interior volumes defining interior cavities. Alternately, in air or other gaseous environments a portion of the selectively permeable barrier element will be in contact with the exterior air or other gas rather than water.

Lighting device 4000A includes two internal volumes, where the upper volume includes LED lighting elements 4026, optional sequestering agents/browning agent destroyers 4028, and other related electronic and mechanical components such as reflectors, optical lenses (not shown) phosphor elements (not shown), or other components such as described previously herein. Lower interior volume 4014A defines a cavity containing a power and electronics circuit, which may include discrete electronic, optic, and/or mechanical components, as well as components on a printed circuit board 4028 or other substrate. The power and electronics circuit may be configured to provide electrical power and/or control signaling to LED or other lighting elements.

One or more sequestering agents/browning agent destroyers 4028 may also be disposed on or within interior volume 4014A. One or more selectively permeable barrier element 4050A may be positioned on or within the housing to similarly allow diffusion of contaminants from the lower interior volume 4014A. In some embodiments, the upper volume may be merely sealed from the lower volume so that contaminants from the lower volume cannot enter the upper volume and affect light output. In this case, the lower selectively permeable barrier element may not be included. Alternately, the upper and lower volumes may be coupled so that contaminants can flow in-between. In this case, a single or multiple selectively permeable barrier element may be used to allow outward diffusion.

Figure 40C:
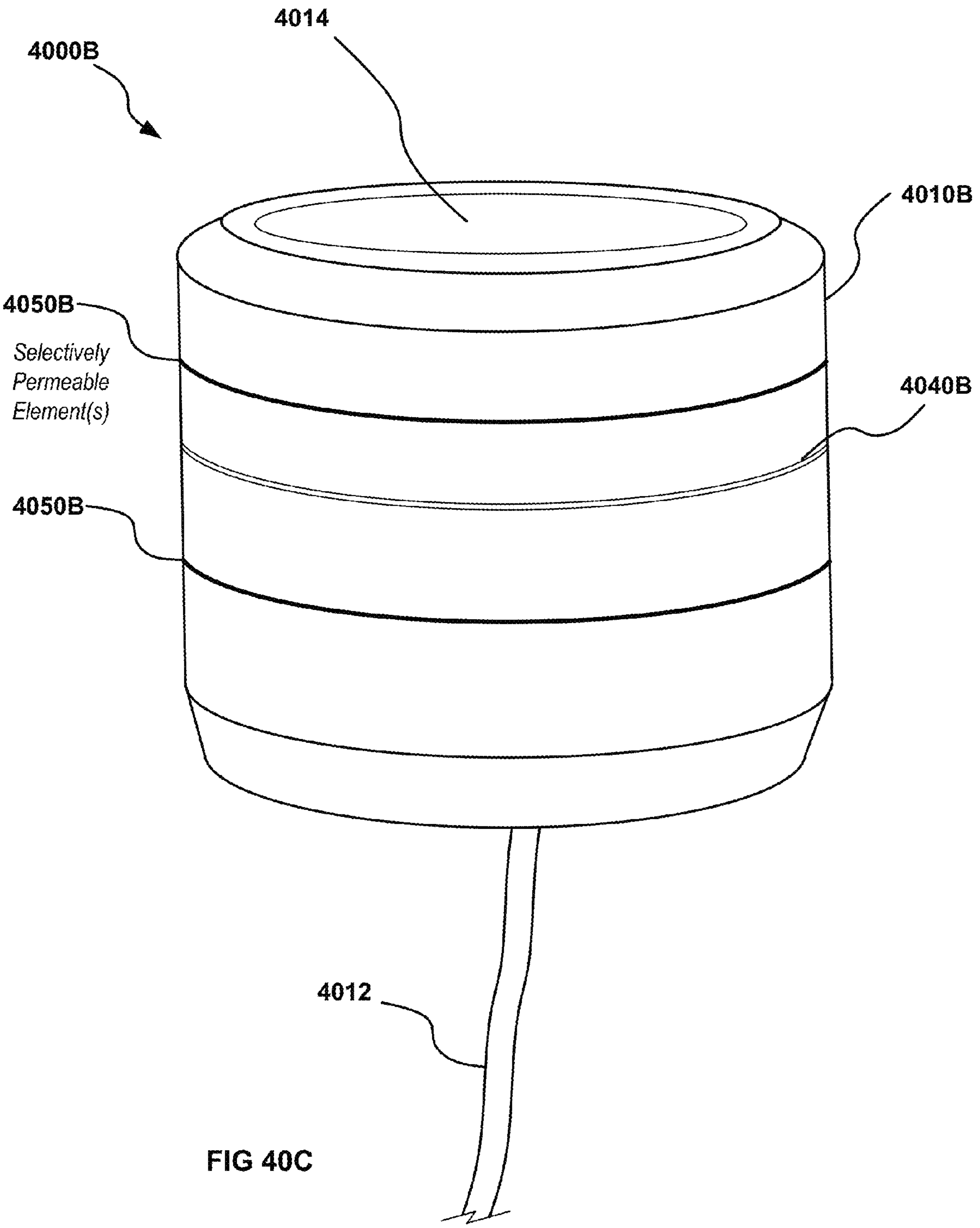
Figure 40D:
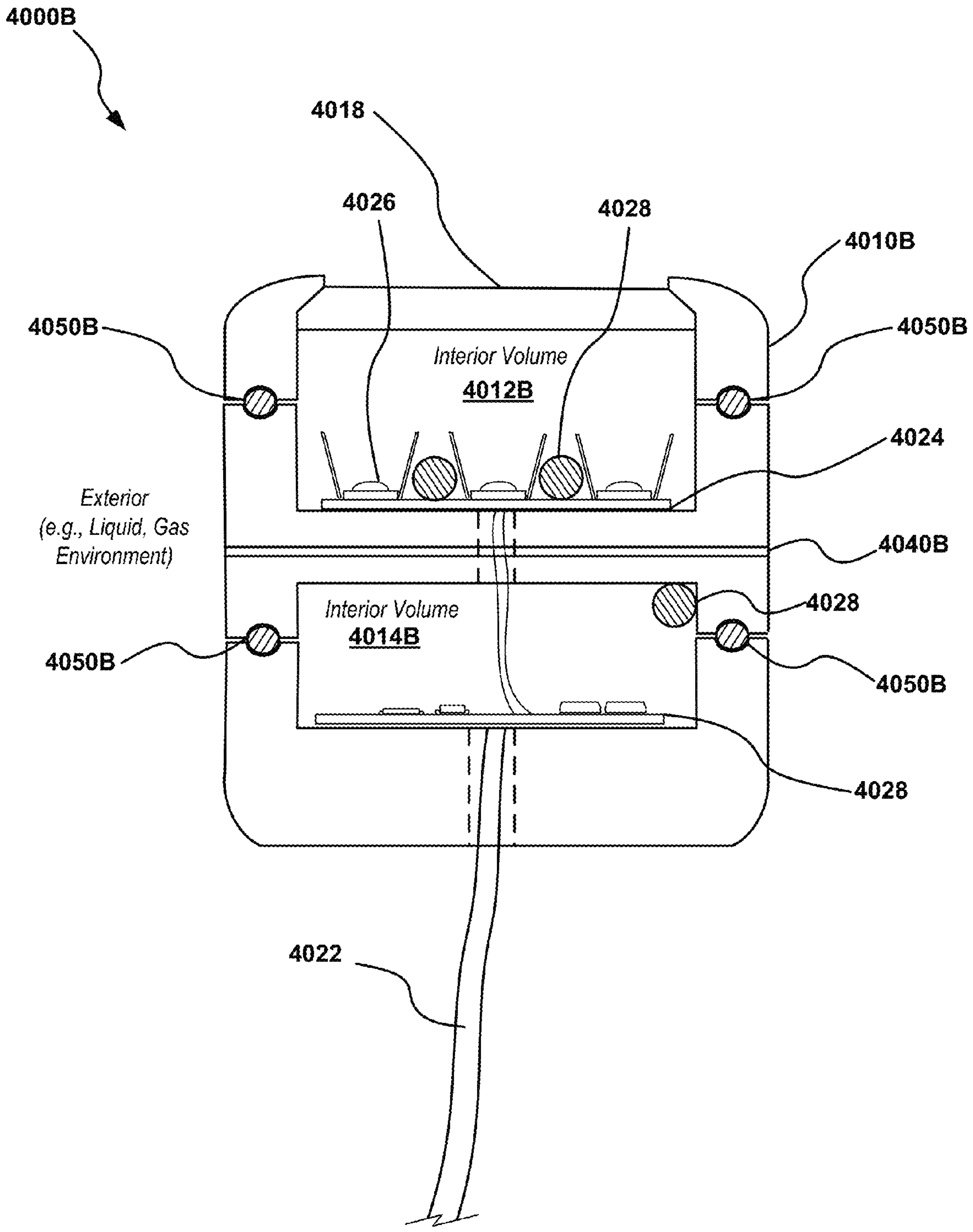

FIGS. 40C and 40D illustrates another embodiment of a lighting device 4000B including a selectively permeable barrier element 4050B. In this case, the selectively permeable barrier element 4050B may be a silicone o-ring or gasket, or other silicone sealer, grease, membrane or other sealing material, or may be an o-ring, gasket, etc., of another appropriate selectively permeable material to allow diffusion of contaminants outward from interior volumes. Similar to lighting device 4000A, there may be two interior volumes 4012B and 4014B containing electronics, lighting elements, wires, sealants, or other materials capable of emitting or generating contaminants. These contaminants may be diffused through one or more of selectively permeable barrier elements 4050B, such as silicone o-rings, gaskets, or other sealing mechanisms, via channels between housing elements. A gasket, o-ring, or other sealing mechanism 4040B may be used to join elements of the housing. In this case, the housing may comprise four elements as shown—two forming the upper half and two forming the lower half, with corresponding o-rings or gasket between. The halves may be fastened together with bolts, screws, clamps, or other connecting mechanisms (not shown).

Figure 41:
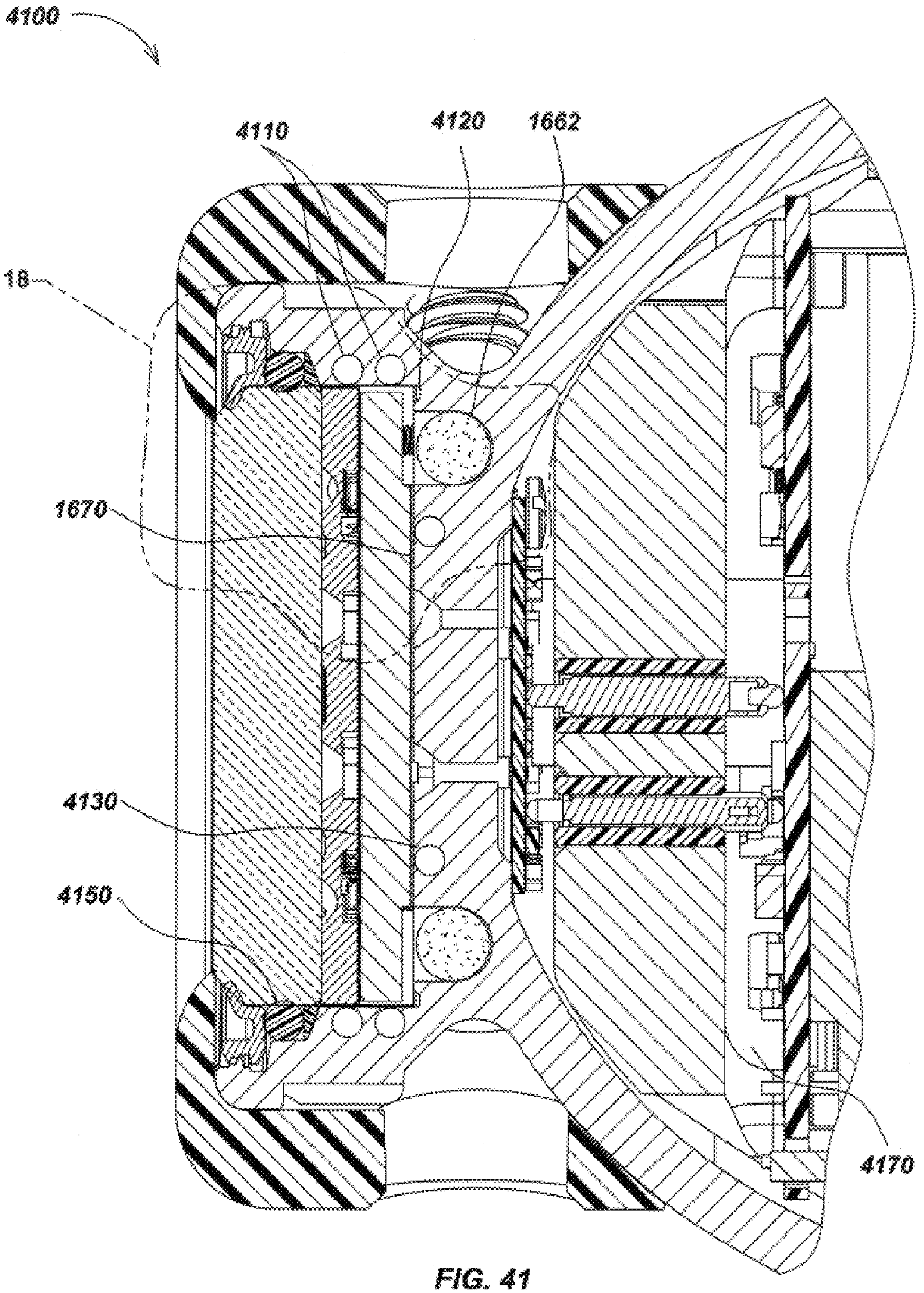
FIG. 41 illustrates details of an example embodiment of a lighting device similar to the device of FIG. 17 with selectively permeable silicone o-rings.

FIG. 41 illustrates details of another embodiment of a lighting device 4100 including selectively permeable barrier elements. This embodiment may be configured similar to the lighting device illustrated previously herein with respect to FIG. 17. For example, lighting device 4100 may include a lower volume 4170 defining a cavity wherein electronics power and/or control circuits are housed. This volume may be fully or partially isolated from other volumes by gaskets or o-rings. For example, internal o-rings 4130 comprising a material such as Viton™ or other low permeability materials may be used to seal upper and lower halves of the light. Secondary o-rings 4110 may be used as selectively permeable barrier elements to allow diffusion of contaminants to the exterior environment. These may be, for example, silicone o-rings with high permeability to gases. One or more formed or punched gaps 4120 may be used to allow transfer of gases from the interior volume to the o-rings 4110. Upper o-rings 4150 may be used to provide a primary seal to the exterior environment. These o-rings may be Viton™ or other low-permeability materials in some embodiments. Alternately, in some embodiments they may be selectively permeable materials such as silicone. One or more graphite sheets, such as graphite sheet 1670, may be used to aid in sealing and/or in providing high thermal conductivity to direct heat away from the upper half of the housing, such as described previously herein. One or more sequestering agents/browning agent destroyers, such as elements 1662, may be used to further capture and contain contaminants.

Lights in accordance with the various aspects described herein may be used in a variety of lighting applications. An exemplary application is for littoral or underwater lighting, however, lights in accordance with various aspects may also be used for other applications subject to exposure to wet or otherwise problematic environments such as on or in aircraft, ground vehicles, boats, submarines, piers or docks, airport lighting, space applications, or similar applications. Alternately, lights in accordance with various aspects described herein may also be used in applications where long light duration, lighting or replacement cost, high lighting output power, or other constraints are important, such as outdoor surface lighting, building or structure lighting, highway lighting, environmental lighting, or other lighting applications.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The present invention is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use various embodiments of the present invention. Various modifications to these aspects will be readily apparent to those skilled in the art, and the generic principles defined herein may be applied to other aspects without departing from the spirit or scope of the invention. Therefore, the presently claimed invention is not intended to be limited to the aspects and details shown herein but is to be accorded the widest scope consistent with the appended claims and their equivalents.

The invention claimed is:

1. A lighting device, comprising:

a housing enclosing one or more interior volumes; the housing comprising;

a forward housing element with a forward opening having a first diameter and an aft opening having a second diameter that is larger than the first diameter;

a transparent, pressure-bearing window positioned inside the forward housing, and having a diameter that is larger than the first diameter and smaller than the second diameter;

a water-tight seal disposed between the window and a surface of the forward housing;

a window support structure positioned in the forward housing behind a portion of the window;

a semiconductor lighting element positioned in the forward housing behind the window;

a sequestering agent and/or a browning agent destroyer disposed behind the window; and a graphite material configured to seal a volume including the semiconductor lighting element from a second volume of the housing;

one or more electronic circuit elements disposed in the one or more interior volumes; and a selectively permeable barrier element disposed in the housing having a first area exposed to one of the interior volumes and a second area exposed to a gas or liquid volume exterior to the housing to allow diffusion of browning contaminants from the one of the interior volumes to the gas or liquid volume exterior to the housing.

2. The lighting device of claim 1, wherein the housing is a submersible pressure bearing housing for withstanding ambient external pressures of at least 50 pounds per square inch (PSI).

3. The lighting device of claim 1, wherein the housing is a submersible pressure bearing housing for withstanding ambient external pressures of at least 1000 PSI.

4. The lighting device of claim 1, wherein the semiconductor lighting element is an LED lighting element is disposed in a first volume of the one or more interior volumes and one of the one or more electronics circuits is a power circuit is disposed in a second volume of the one or more volumes.

5. The lighting device of claim 4, wherein the first side of the selectively permeable barrier element is in contact with the first volume.

6. The lighting device of claim 4, wherein the first side of the selectively permeable barrier element is in contact with the second volume.

7. The lighting device of claim 4, further comprising another selectively permeable barrier, wherein the selectively permeable barrier membrane is in contact with the first volume and the another selectively permeable barrier is in contact with the second volume.

8. The lighting device of claim 1, wherein the selectively permeable barrier membrane comprises a silicone material.

9. The lighting device of claim 1, wherein the graphite material comprises a pyrolitic graphite sheet (PGS).

10. The lighting device of claim 9, wherein conductive particles are embedded in the PGS to increase thermal conductivity.

11. The lighting device of claim 9, wherein the conductive particles include diamond particles.

12. The lighting device of claim 1, wherein the sequestering agent comprises a molecular sieve material.

13. The lighting device of claim 1, agent wherein the sequestering agent comprises an activated charcoal material.

14. The lighting device of claim 1, wherein the absorbent material comprises a clay mineral material.

15. The lighting device of claim 1, wherein the browning agent destroyer comprises a catalyst material.

16. The lighting device of claim 15, wherein the catalyst material comprises one or more of a platinum, palladium, rhodium, cerium, iron, manganese, nickel, and copper material.

17. The lighting device of claim 1, wherein the semiconductor lighting elements are LEDs.

18. The lighting device of claim 17, wherein one or more domes of the LEDs are in contact with the window.

19. The lighting device of claim 18, wherein the window is a sapphire window and the LED domes include a flat surface in contact with the window.

20. The lighting device of claim 1, wherein the sequestering agent is a material for absorbing and containing a gas capable of browning the lighting element and/or a phosphor associated with the lighting element.

21. The lighting device of claim 1, wherein the sequestering agent and/or browning agent destroyer is disposed at least partially within the selectively permeable barrier element.

22. The device of claim 1, wherein the semiconductor lighting elements comprise LEDs having a dome and the housing includes a sapphire window, wherein the dome is in contact with the sapphire window.

23. The lighting device of claim 1, further including a silicone material.

24. The lighting device of claim 23, wherein the sequestering agent and/or browning agent destroyer is disposed on or within the silicone element.

25. A submersible light, comprising:

a housing;

a transparent pressure bearing window positioned at a forward end of the housing;

a window supporting structure mounted in the housing behind the transparent window;

a water-tight seal between the window and the housing;

a circuit element configured and positioned within the housing behind the window supporting structure to bear at least some of the pressure applied to the transparent window by ambient water on the exterior side of the window;

at least one solid state light source mounted on the circuit element behind the transparent window;

a sequestering agent and/or a browning agent destroyer disposed behind the window; and a graphite material configured to seal two surfaces of the light to enhance thermal conductivity from the circuit element to the housing.

26. A submersible LED light fixture, comprising:

A light head made of a thermally conductive material;

A metal core printed circuit board (PCB) thermally coupled to the light head;

A plurality of LEDs mounted on the MCPCB;

A transparent window mounted in the light head, extending across the MCPCB and spaced from the LEDs, the window being sealed around a periphery thereof to the light head;

A multilayer stack of spacers made of a high compressive strength material positioned between the window and the MCPCB for engaging the window and carrying loads exerted by the window;

a sequestering agent and/or a browning agent destroyer disposed behind the window; and a graphite material configured to seal a first volume of the light head including the at least one solid state light source and circuit element from a second volume of the light head.

* * * * *